(12) United States Patent
Mehta et al.

(10) Patent No.: US 9,973,451 B2
(45) Date of Patent: May 15, 2018

(54) SYSTEM AND METHOD FOR PROVIDING ADMINISTRATION COMMAND PROGRESS STATUS IN A CLOUD PLATFORM ENVIRONMENT

(71) Applicant: ORACLE INTERNATIONAL CORPORATION, Redwood Shores, CA (US)

(72) Inventors: Bhakti Mehta, Milpitas, CA (US); Nazrul Islam, Santa Clara, CA (US); Chris Kasso, Los Altos, CA (US); Martin Mares, Prague (CZ)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 56 days.

(21) Appl. No.: 14/476,553

(22) Filed: Sep. 3, 2014

(65) Prior Publication Data

US 2015/0089039 A1    Mar. 26, 2015

Related U.S. Application Data

(60) Provisional application No. 61/880,780, filed on Sep. 20, 2013.

(51) Int. Cl.
*H04L 12/58* (2006.01)
*H04L 12/24* (2006.01)
(Continued)

(52) U.S. Cl.
CPC .......... *H04L 51/04* (2013.01); *G06F 11/0709* (2013.01); *G06F 11/1438* (2013.01);
(Continued)

(58) Field of Classification Search
CPC ..... H04L 41/5041; H04L 51/04; H04L 67/10; H04L 41/5054; H04L 63/08; G06F 15/16; G06F 8/61; G06F 11/0709
(Continued)

(56) References Cited

U.S. PATENT DOCUMENTS 7,228,453 B2  6/2007  O'Brien et al.
7,386,586 B1  6/2008  Headley et al.
(Continued)

OTHER PUBLICATIONS

Rodero-Merino et al., From infrastructure delivery to service management in clouds, 2010, Future Generation Computer Systems 26, pp. 1226-1240 (15 pages).
(Continued)

*Primary Examiner* — Tesfay Yohannes
(74) *Attorney, Agent, or Firm* — Tucker Ellis LLP

(57) ABSTRACT

In accordance with an embodiment, described herein is a system and method for providing administrative command progress status for use with a cloud computing environment. In accordance with an embodiment, a job manager service provides an application program interface which receives administrative commands to be processed within the cloud environment as jobs, wherein each instance of the administrative commands is associated with a unique job identifier. A command line interface allows a user to issue a command to be processed within the cloud environment as a job. During progress of a job associated with an annotated command, a status associated with the progress of the job is determined and provided to the command line interface. For example, the system can provide job progress status during these operations, to reassure the user that the operation is proceeding normally.

17 Claims, 30 Drawing Sheets

(51) Int. Cl.
*G06F 11/07* (2006.01)
*G06F 11/14* (2006.01)
*H04L 29/08* (2006.01)
*G06F 11/20* (2006.01)

(52) U.S. Cl.
CPC ...... *H04L 41/5041* (2013.01); *H04L 41/5045* (2013.01); *H04L 51/24* (2013.01); *G06F 11/2023* (2013.01); *H04L 67/26* (2013.01); *H04L 67/306* (2013.01)

(58) Field of Classification Search
USPC .......... 709/206, 223, 226; 718/105
See application file for complete search history.

(56) References Cited

U.S. PATENT DOCUMENTS

| | | | |
|---|---|---|---|
| 8,095,826 B1 | 1/2012 | Deolasee | |
| 8,620,861 B1 | 12/2013 | Uhrhane et al. | |
| 8,788,461 B2* | 7/2014 | Stewart | G06F 11/1458 707/649 |
| 8,856,807 B1 | 10/2014 | Khapre et al. | |
| 9,223,789 B1 | 12/2015 | Seigle et al. | |
| 9,497,145 B2 | 11/2016 | Mares et al. | |
| 9,634,965 B2 | 4/2017 | Mehta et al. | |
| 9,692,717 B2 | 6/2017 | Mares et al. | |
| 2005/0055351 A1 | 3/2005 | Barton et al. | |
| 2008/0256223 A1 | 10/2008 | Chan et al. | |
| 2009/0327854 A1 | 12/2009 | Chhajer et al. | |
| 2012/0072985 A1 | 3/2012 | Davne et al. | |
| 2012/0266018 A1 | 10/2012 | Tanaka | |
| 2012/0297249 A1 | 11/2012 | Yang et al. | |
| 2012/0311153 A1 | 12/2012 | Morgan | |
| 2013/0227557 A1 | 8/2013 | Pechanec et al. | |
| 2013/0246294 A1* | 9/2013 | Pendyala | G06Q 10/1053 705/321 |
| 2013/0297802 A1 | 11/2013 | Laribi et al. | |
| 2013/0345945 A1 | 12/2013 | Fischer et al. | |
| 2013/0346945 A1 | 12/2013 | Yousouf et al. | |
| 2014/0006129 A1 | 1/2014 | Heath | |
| 2014/0075019 A1 | 3/2014 | Mordani et al. | |
| 2014/0149494 A1* | 5/2014 | Markley | H04L 67/34 709/203 |
| 2014/0173618 A1 | 6/2014 | Neuman et al. | |
| 2014/0188510 A1* | 7/2014 | Samari | G06F 19/322 705/3 |
| 2014/0196054 A1* | 7/2014 | Brochard | G06F 9/505 718/105 |
| 2014/0280975 A1 | 9/2014 | Mordani et al. | |
| 2014/0298091 A1 | 10/2014 | Carlen et al. | |
| 2014/0337405 A1 | 11/2014 | Athas et al. | |
| 2015/0089001 A1 | 3/2015 | Mordani et al. | |
| 2015/0089040 A1 | 3/2015 | Mares et al. | |
| 2015/0089041 A1 | 3/2015 | Mehta et al. | |
| 2015/0089068 A1 | 3/2015 | Islam et al. | |
| 2015/0089274 A1* | 3/2015 | Mares | H04L 41/5041 714/4.11 |
| 2015/0120780 A1* | 4/2015 | Jain | G06F 21/6227 707/783 |
| 2015/0120891 A1* | 4/2015 | Mordani | H04L 41/5041 709/222 |
| 2015/0120937 A1* | 4/2015 | Mordani | H04L 41/5041 709/226 |
| 2015/0120938 A1 | 4/2015 | Mordani et al. | |
| 2015/0120939 A1 | 4/2015 | Islam et al. | |
| 2015/0244775 A1 | 8/2015 | Vibhor et al. | |
| 2015/0286537 A1* | 10/2015 | Klose | G06F 11/1464 707/652 |
| 2015/0379221 A1* | 12/2015 | Yeager | G06F 19/3406 715/771 |
| 2015/0381550 A1* | 12/2015 | Mohammed | H04L 67/10 709/206 |

OTHER PUBLICATIONS

Zhang et al., Securing Elastic Applications on Mobile Devices for Cloud Computing, Nov. 13, 2009, CCSW'09, pp. 127-134 (8 pages).
Office Action issued by the United States Patent and Trademark Office for U.S. Appl. No. 14/476,576, dated Jun. 15, 2016, 10 pages.
Notice of Allowance issued by United States Patent and Trademark Office for U.S. Appl. No. 14/476,568, dated Jun. 30, 2016, 11 pages.
Office Action issued by the United States Patent and Trademark Office for U.S. Appl. No. 14/476,564, dated May 20, 2016, 12 pages.
Office Action issued by United States Patent and Trademark Office for U.S. Appl. No. 14/476,568, dated Jan. 13, 2016 (9 pages).
Office Action issued by United States Patent and Trademark Office for U.S. Appl. No. 14/476,573, dated May 18, 2016 (11 pages).
United States Patent and Trademark Office, Notice of Allowance dated Feb. 23, 2017 for U.S. Appl. No. 14/476,576, 18 Pages.
United States Patent and Trademark Office, Notice of Allowance dated June 20, 2017 for U.S. Appl. No. 14/476,576, 15 Pages.

* cited by examiner

SYSTEM AND METHOD FOR PROVIDING ADMINISTRATION COMMAND PROGRESS STATUS IN A CLOUD PLATFORM ENVIRONMENT

CLAIM OF PRIORITY

This application claims the benefit of priority to U.S. Provisional Application titled "SYSTEM AND METHOD FOR MESSAGING, JOB MANAGEMENT, AND OTHER FUNCTIONALITY IN A CLOUD PLATFORM ENVIRONMENT", Application No. 61/880,780, filed Sep. 20, 2013, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to cloud computing, and providing of services within such environments, and are particularly related to a system and method for providing administration command progress status in a cloud environment.

BACKGROUND

A cloud computing environment enables responsibilities which previously may have been provided by an organization's own information technology department, to be delivered as service layers within a cloud environment, for use by consumers that are either internal (i.e., private) or external (i.e., public) to the organization. In some cloud environments, a user can issue commands and perform operations to manage the environment. However, some operations, such as service provisioning, can be complex and long running. In order for users to be best able to configure and manage the environment, it is important they receive status information promptly and in a manner that suits their particular needs.

SUMMARY

In accordance with an embodiment, described herein is a system and method for providing administrative command progress status for use with a cloud computing environment. In accordance with an embodiment, a job manager service provides an application program interface which receives administrative commands to be processed within the cloud environment as jobs, wherein each instance of the administrative commands is associated with a unique job identifier. A command line interface allows a user to issue a command to be processed within the cloud environment as a job. During progress of a job associated with an annotated command, a status associated with the progress of the job is determined and provided to the command line interface. For example, the system can provide job progress status during these operations, to reassure the user that the operation is proceeding normally.

DETAILED DESCRIPTION

In accordance with an embodiment, a cloud computing environment enables responsibilities which previously may have been provided by an organization's own information technology department, to be delivered as service layers within a cloud environment, for use by consumers that are either internal (i.e., private) or external (i.e., public) to the organization. Described herein are a variety of hardware and/or software components and features, which can be used in delivering an infrastructure, platform, and/or applications to support cloud computing.

Figure 1:
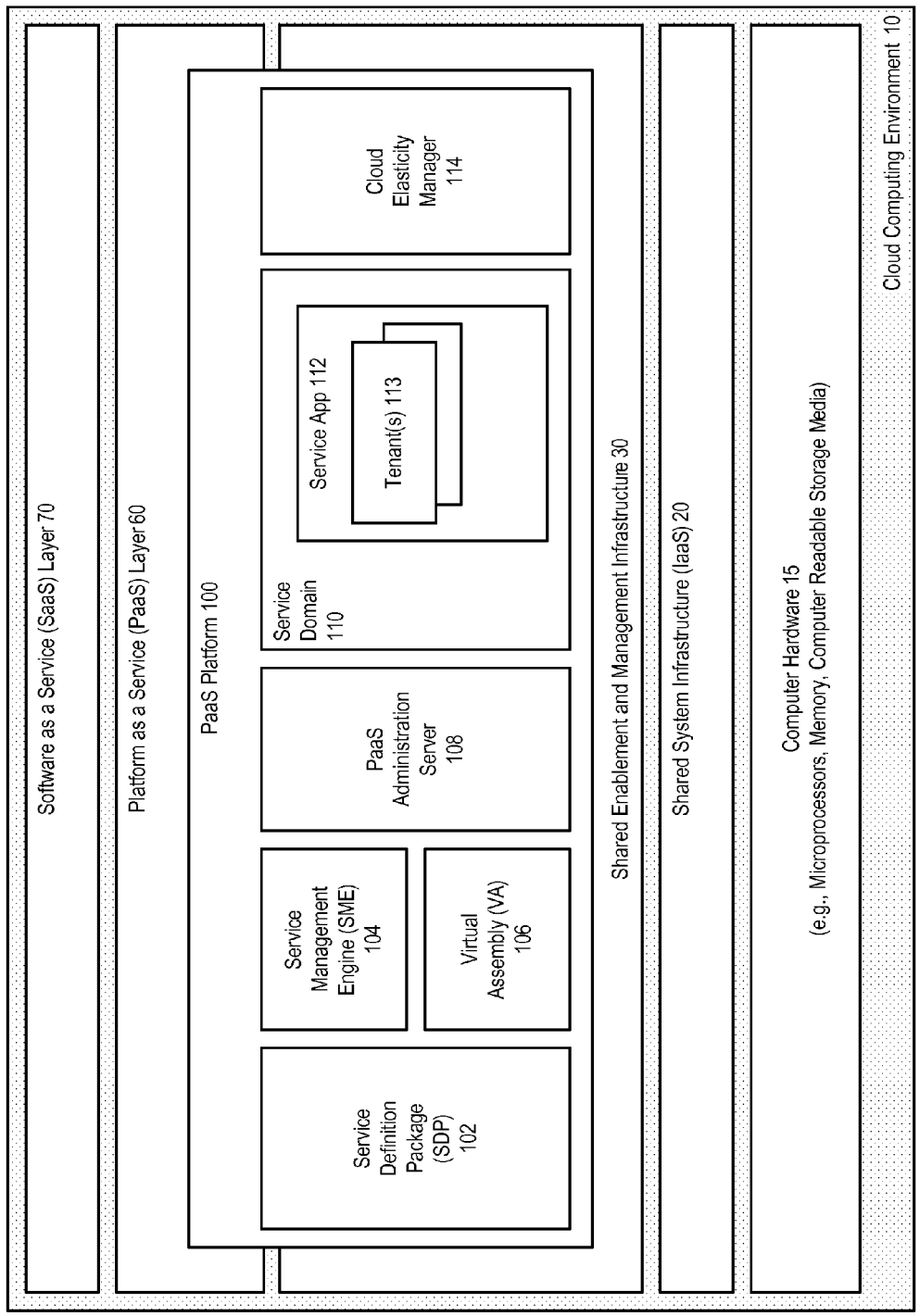
FIG. 1 illustrates an example of a cloud computing environment, in accordance with an embodiment.

FIG. 1 illustrates an example of a cloud computing environment, in accordance with an embodiment. As shown in FIG. 1, a cloud computing environment (referred to herein in some embodiments as a cloud environment, or cloud) 10 can generally include a combination of one or more Infrastructure as a Service (IaaS) 20, Platform as a Service (PaaS) 60, and/or Software as a Service (SaaS) 70 layers, which can be delivered as service layers within the cloud environment. The cloud environment can be implemented as a system that includes a computer hardware 15, such as one or more conventional general purpose or specialized digital computers, computing devices, machines, microprocessors, memory and/or computer readable storage media.

In accordance with an embodiment, each of the IaaS, PaaS, and/or SaaS layers can generally include a variety of components. For example, in accordance with an embodiment, the IaaS layer can include a shared database hardware (e.g., an Exadata machine), and/or shared application server hardware (e.g., an Exalogic machine); while the PaaS layer can include one or more PaaS services, such as a database service, application server service, and/or WebCenter service; and the SaaS layer can include various SaaS services, such as enterprise applications (e.g., Oracle Fusion SaaS), and/or ISV or custom applications. The cloud environment can also include a shared enablement and managing infrastructure 30, which provides enablement and management tools that support the various service layers, for example, identity management, virtual assembly builder, system provisioning, tenant management, or other components.

In accordance with an embodiment, the cloud environment can include a PaaS platform component 100 (referred to herein in some embodiments as a PaaS platform, or CloudLogic), which enables the provisioning of enterprise software applications within the environment. For example, the PaaS platform can be provided as an installable software suite that provides a self-service provisioning experience for enterprise applications such as Fusion Middleware (FMW).

As shown in FIG. 1, in accordance with an embodiment, the PaaS platform can include one or more service definition package (SDP) 102, service management engine (SME) 104, virtual assembly (VA) 106, PaaS administration server 108, service domain 110 including one or more service applications (apps) 112 for use by one or more cloud accounts or tenants 113, and/or elasticity manager 114 components.

The example shown in FIG. 1 is provided as an illustration of an exemplary cloud environment and PaaS platform. In accordance with other embodiments, different and/or other types or arrangements of components can be included.

In accordance with an embodiment, the following terms are used herein.

PaaS Platform Component (PaaS Platform, Platform, CloudLogic):

In accordance with an embodiment, a PaaS platform component is an installable software suite that provides a self-service provisioning experience for enterprise applications, such as FMW or other enterprise applications.

Site:

In accordance with an embodiment, a site is the entity created and configured by the Platform Administrator from a PaaS platform installation, which tenants and Platform Administrators interact with to perform the various operations in the platform. In accordance with an embodiment, a site can be implemented as a WebLogic domain.

Tenant:

In accordance with an embodiment, a tenant (referred to herein in some embodiments as an account) is an entity that is associated with users that consume the platform as a service, and establishes an administrative scope that administrators use to access PaaS services. For example, a tenant can be created for an organization, department, or group. Roles such as Tenant Administrator can be associated with a tenant; and quotas can be assigned to a tenant. A tenant can create one or more environments, and have one or more sub-tenants. Consumed resources, such as services with their virtual machines, databases, DNS entries, load balancer and other configurations, can be associated with a tenant.

Sub-Tenant:

In accordance with an embodiment, a sub-tenant is an entity that exists under a tenant. A sub-tenant has a quota assigned from the overall tenant's quota. For example, a tenant can have one or more sub-tenants, and the Tenant Administrator can assign a quota from the overall tenant quota to each sub-tenant. A sub-tenant can create one or more environments.

Service Definition Package:

In accordance with an embodiment, a service definition package (SDP) is a package that contains the information necessary for a particular type of service to be offered by the PaaS platform. For example, each type of FMW service can provide its own SDP. An SDP can contain custom code that is installed into the cloud platform, and a virtual assembly that contains the topology and configuration of a set of virtual appliances that will comprise a running instance of the service, upon being deployed onto a set of virtual machines (VMs).

Service Management Engine:

In accordance with an embodiment, a service management engine (SME) provides a generic means to plug any service type into the system. For example, an SME takes care of the service-specific provisioning, lifecycle, management, and monitoring support for a service type or provider type.

Service Type:

In accordance with an embodiment, a service type is a representation of software functionality that can be instantiated within the PaaS platform site for a tenant. A service type is created based on an SDP, with additional configuration information supplied by the Platform Administrator.

Some of this configuration information may supply values that are specific to an installation of the PaaS platform product or the enterprise in which it is running; while some configuration information may reflect the Platform Administrator's choices of options supported by the SDP. Multiple service types can be created from a single SDP, by making different configuration choices.

Environment:

In accordance with an embodiment, an environment is a collection of services and their associated providers that are managed together as a group. An environment can be created for the purpose of running an application or providing some higher level service. Environments provide the ability to operate on the collection of services as a whole, with operations such as start, stop, backup, and destroy. An environment provides the functions of an association group, and a management group.

Service:

In accordance with an embodiment, a service is an instantiation of a service type. An environment can be associated with multiple services; and within a particular tenant there can be one or more environments with multiple services for a single service type. Typically, a service provides both a service administration interface, and an end-user interface. A service can be associated with identity, database, or other service features that are required by the service; and with a service runtime that runs on one or more VMs.

Provider Type:

In accordance with an embodiment, a provider type is a special form of service type that supports providers instead of services. Provider types are created by the Platform Administrator in the same way as service types. As with service types, a provider type is created based on an SDP, with additional configuration information supplied by the Platform Administrator. Some of this configuration information may supply values that are specific to this installation of the PaaS platform product or the enterprise in which it is running; while some configuration information may reflect the Platform Administrator's choices of options supported by the SDP. Multiple provider types can be created from a single SDP, by making different configuration choices.

Provider:

In accordance with an embodiment, a provider is a specialization of a service. Unlike services, which are created by explicit action of a Tenant Administrator, providers are created on-demand to satisfy the dependencies of services. A provider is an instantiation of a provider type, and represents the use of the resource managed by the provider type by a particular instance of a service type. Services can be associated with multiple providers. When creating a service, an orchestration engine matches the requirements of a service type with the capabilities of the configured provider types, and then requests the service type to create an instance of a service, and the provider types to create instances of the providers for use by this instance of the service. The orchestration engine then associates the service with the providers.

Association Resource:

In accordance with an embodiment, an association resource (sometimes referred to as a provider resource) enables a service to keep track of configuration information for a particular association. For example, if a Java Service is associated with two different database providers, it may need to create a connection pool for each database. The association resource enables the Java Service to keep track of which connection pool is associated with which database, so that, if the orchestration engine needs to change one of the associations, the Java Service will know which connection pool to change.

Runtime:

In accordance with an embodiment, a runtime is a representation of the installed and operational software that provides the functionality of a service or a provider. Runtimes are managed by the custom code included in an SDP, in some instances using facilities provided by the PaaS platform, such as its virtualization and provisioning support. Runtimes can be layered, with each layer being shared (multi-tenant), or not shared (dedicated). For example, with a Java Service, the runtime layers may include an application server, a Java virtual machine (JVM), a guest operating system (OS), and a host operating system. When unqualified, the expression "service runtime" generally refers to the top-most layer. For example, a multi-tenant service runtime is a runtime that is shared by multiple services; while a dedicated service runtime is a runtime that is not shared among multiple services.

Service Resource Type:

In accordance with an embodiment, a service resource type is a special form of service type that supports service resources instead of services. Service resource types are created by the Platform Administrator in the same way as service types. As with service types, a service resource type is created based on an SDP, with additional configuration information supplied by the Platform Administrator. Multiple service resource types can be created from a single SDP, by making different configuration choices.

Service Resource:

In accordance with an embodiment, a service resource is a specialization of a service. Unlike services, which are created by explicit action of a Tenant Administrator, and providers which are created on-demand to satisfy the dependencies of services, service resources are associated with services to satisfy the dependencies of artifacts/applications deployed to services. A service resource can be associated, or disassociated, with a service after the service has been created. A service resource dependency of a service is optional and may be configured by the Platform or Tenant Administrator based on the needs of the artifacts/applications that would be deployed to the service. For example, a service may indicate support for multiple kinds of service resource dependencies; and the Platform or Tenant Administrator may associate multiple service resources for a dependency. A service resource is an instantiation of a service resource type, and represents the use of the infrastructure managed by the service resource type, by a particular instance of a service type. A Service can be associated with one or more service resources. The association of a service to a service resource can happen at any time in the lifecycle of the service, once the service and service resource have been created.

Quota:

In accordance with an embodiment, a quota provides a mechanism to limit consumption of a resource, by establishing an upper bound on the resource usage. Examples of quota-controlled resources include CPU, disk, and the number of VMs in use. PaaS layer quotas can also be supported, for example the number of services that can be provisioned. Quotas can be assigned to tenants, and a Tenant Administrator can allocate their quota to projects or groups which they manage.

Namespaces:

In accordance with an embodiment, the PaaS platform can use a naming hierarchy, such as a Nimbula-style naming hierarchy and multipart naming scheme. There can be reserved namespaces for SDPs, service-types, provider-types, service-resource-types, service-resources, environments, and services. Namespaces can be defined and reserved at the global level, and per tenant.

Platform Administrator/System Administrator (Role):

In accordance with an embodiment, a Platform or System Administrator is responsible for installing, configuring, managing, and maintaining the PaaS platform infrastructure and environment, including the resources that are made available to applications running in the environment. The Platform or System Administrator is also responsible for downloading and installing SDPs to support additional service types, setting up or configuring virtualization technology for the platform to use, and installing and configuring providers.

Cloud Account Administrator (Role):

In accordance with an embodiment, a Cloud Account Administrator is responsible for the provisioning of new services, management of generic service properties such as their Quality of Service (QoS) settings and their associations, and the locking and termination of services. A Cloud Account Administrator can assign Service Administrators for each service.

Tenant Administrator (Role):

In accordance with an embodiment, a Tenant Administrator is responsible for creating sub-tenants and assigning Tenant Administrator to the sub-tenant groups, and for the provisioning of new services, management of generic service properties, and the locking and termination of services. A Tenant Administrator can assign Service Administrators for each service.

Service Administrator (Role):

In accordance with an embodiment, a Service Administrator is responsible for administering and managing a specific service after it has been provisioned. A Service Administrator interacts with the service's administration interface to perform administration and management operations.

Service Runtime Administrator (Role):

In accordance with an embodiment, a Service Runtime Administrator is responsible for configuring and managing service runtimes.

Application Deployer (Role):

In accordance with an embodiment, an Application Deployer deploys an application to the provisioned service, and is responsible for installing, configuring, and running the application. Once the application is running, it can be made available to an End User.

End User (Role):

In accordance with an embodiment, an End User is the user of the applications that are deployed to the service. The End User interacts with the user interface provided by the application running in the service. If the service itself provides an interface for users to consume the functionality that it exposes, then the End User can use that service's interface.

Figure 2:
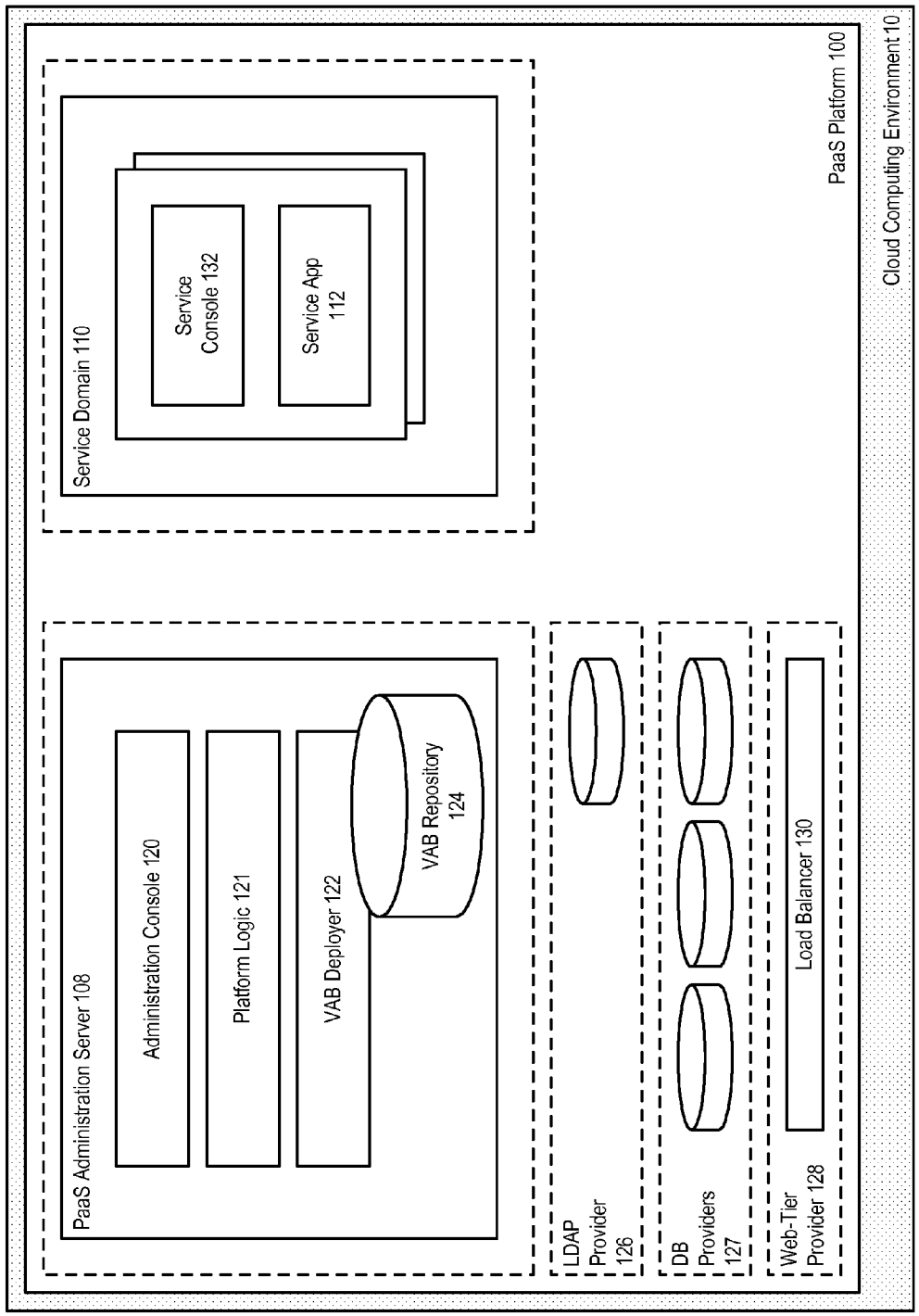
FIG. 2 illustrates a PaaS platform component, including an administration server and a service domain, in accordance with an embodiment.

FIG. 2 illustrates an administration server and a service domain, in accordance with an embodiment. As shown in FIG. 2, in accordance with an embodiment, the PaaS platform (platform) comprises a PaaS administration server 108, which supports an administration console 120, cloud platform provisioning/management logic 121, and virtual assembly builder (VAB) deployer 122, together with a virtual assembly or VAB repository 124. The VAB deployer can be provided by functionality, components, or products such as Oracle Virtual Assembly Builder (OVAB). The VAB deployer (e.g., OVAB Deployer) can then be used by the platform to manage those VMs that will host the servicing applications.

In accordance with an embodiment, the PaaS administration server can be implemented as a WebLogic (WLS) server application, together with, e.g., Glassfish modules embedded therein to provide cloud platform functionality. A service domain, including a service app and service console 132, can be provided for housing enterprise applications, such as FMW applications, that will ultimately service user requests. In accordance with an embodiment, the service domain components may be instantiated multiple times as part of provisioning requests.

In accordance with an embodiment, provider server types that will be used by the PaaS administration server and the service domain, examples of which include LDAP 126, database 127, and Web tier 128 or load-balancer 130 providers, can be provided in pools that are not provisioned by the administration server, but are external services registered with the cloud environment. In accordance with an embodiment, the PaaS platform can make use of a load-balancer provider to forward all incoming, e.g., Web requests, that are directed to the services. For example, each service can be associated with a virtual host name that will be registered with the load-balancer provider during service provisioning.

Figure 3:
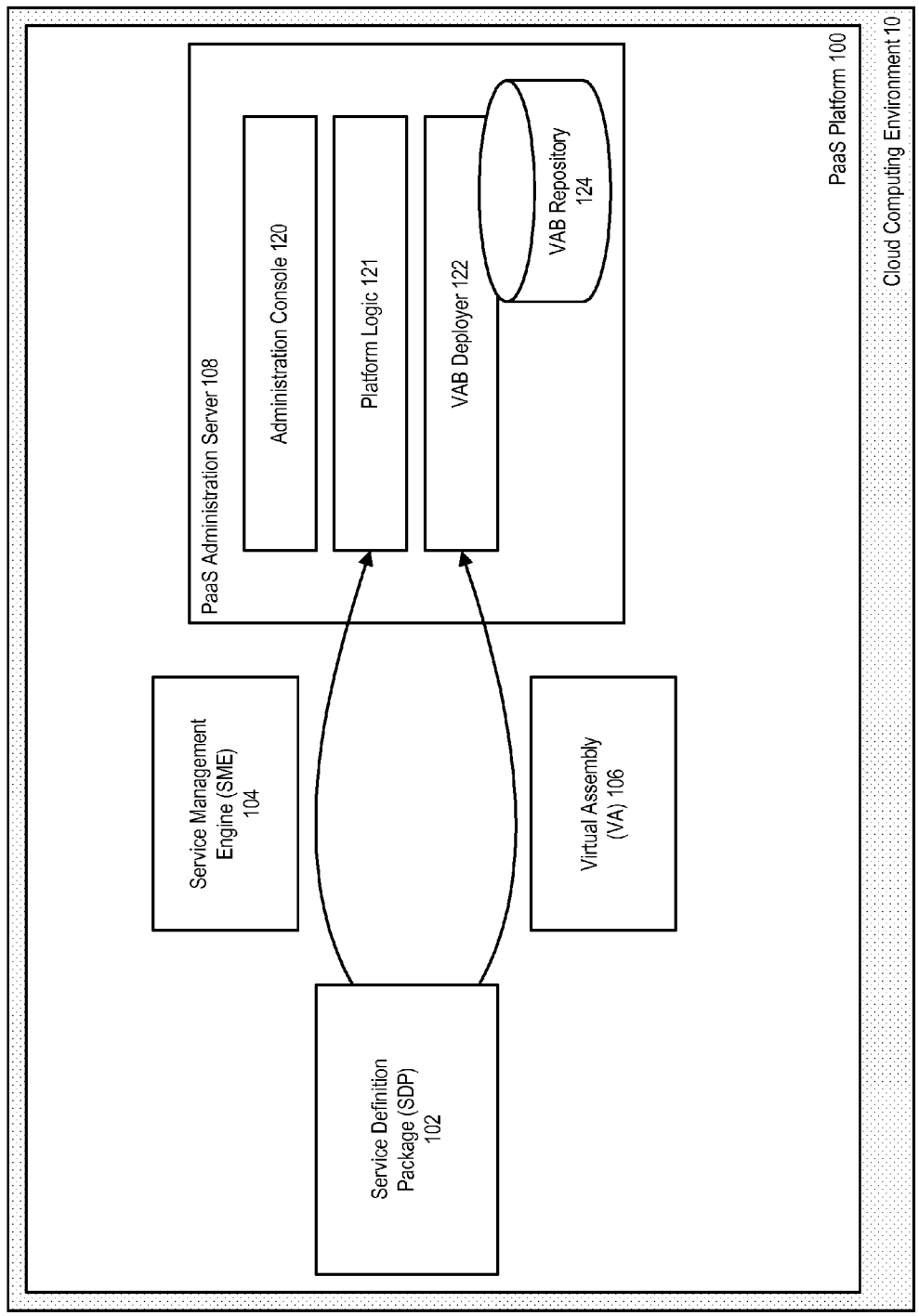
FIG. 3 illustrates the use of service definition packages and service management engines with an administration server, in accordance with an embodiment

FIG. 3 illustrates the use of service definition packages and service management engines with an administration server, in accordance with an embodiment. As shown in FIG. 3, in accordance with an embodiment, new enterprise application service types (e.g., new FMW service types), which the administrator wishes to make available for use within the PaaS platform, can be installed from an SDP. Each SDP contains custom code that can be injected into the platform, for use in supporting, e.g., elasticity and provisioning; together with a virtual assembly (e.g., an OVAB assembly) that contains the topology and configuration of a set of virtual appliances that will comprise a running instance of the enterprise application service, once the assembly is deployed onto a set of VMs.

Figure 4:
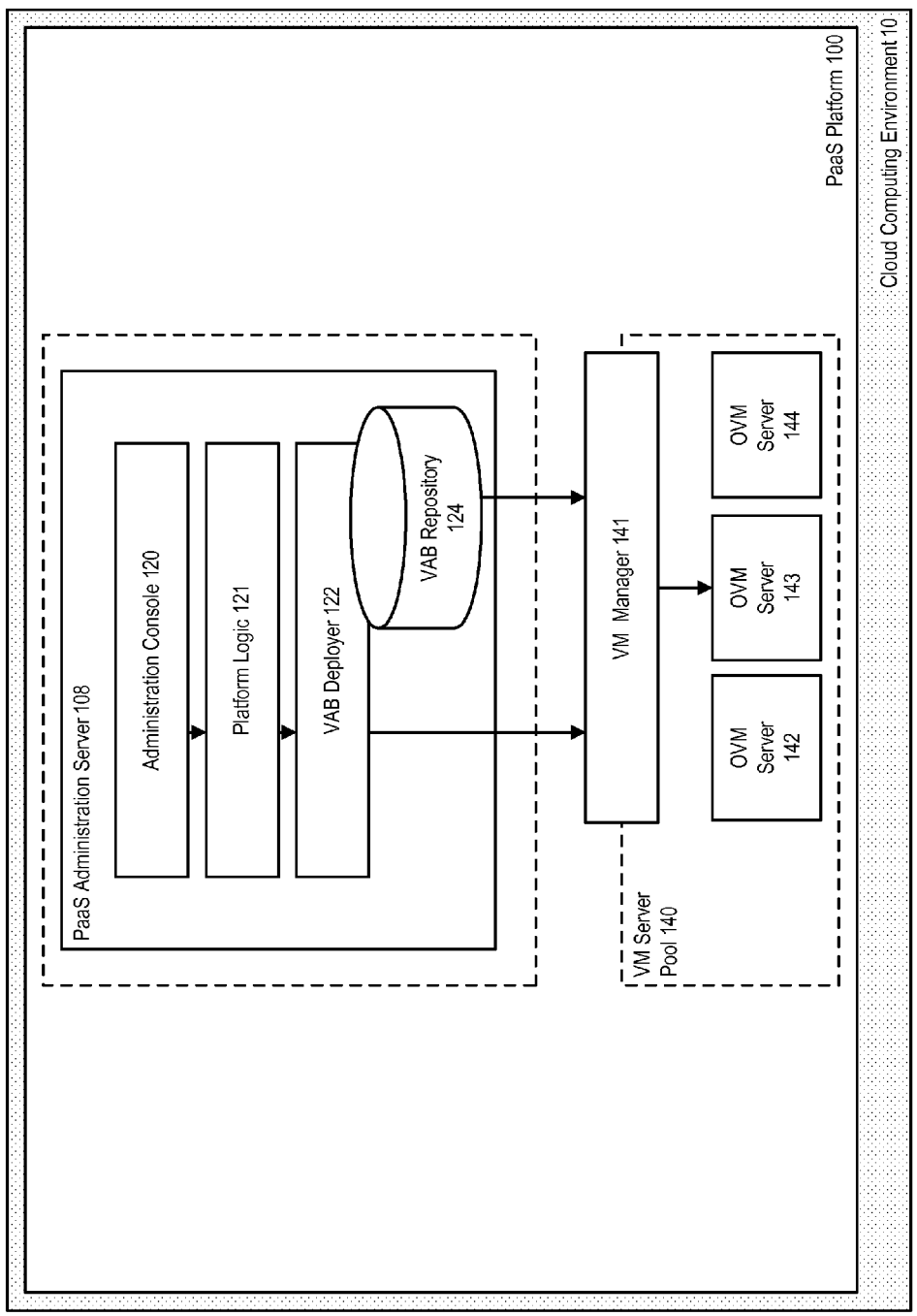
FIG. 4 illustrates the interaction between an administration server and a virtualization manager, in accordance with an embodiment

FIG. 4 illustrates the interaction between an administration server and a virtualization manager, in accordance with an embodiment. As shown in FIG. 4, in accordance with an embodiment, a VM manager component 141 (e.g., Oracle's OVM Manager) can be used by the PaaS platform to manage the pool 140 of VMs 142, 143, 144, which are then used in instantiating a service assembly. When a request is made from a platform module to instantiate an assembly, or a single appliance in the case of a scale-up request, the VAB deployer application (e.g., OVAB Deployer) can interact with the VM manager to fulfill the request. By delegating the infrastructure/virtualization responsibilities to the VM manager and VAB deployer in this manner, the platform can be abstracted from the target deployment platform.

Figure 5:
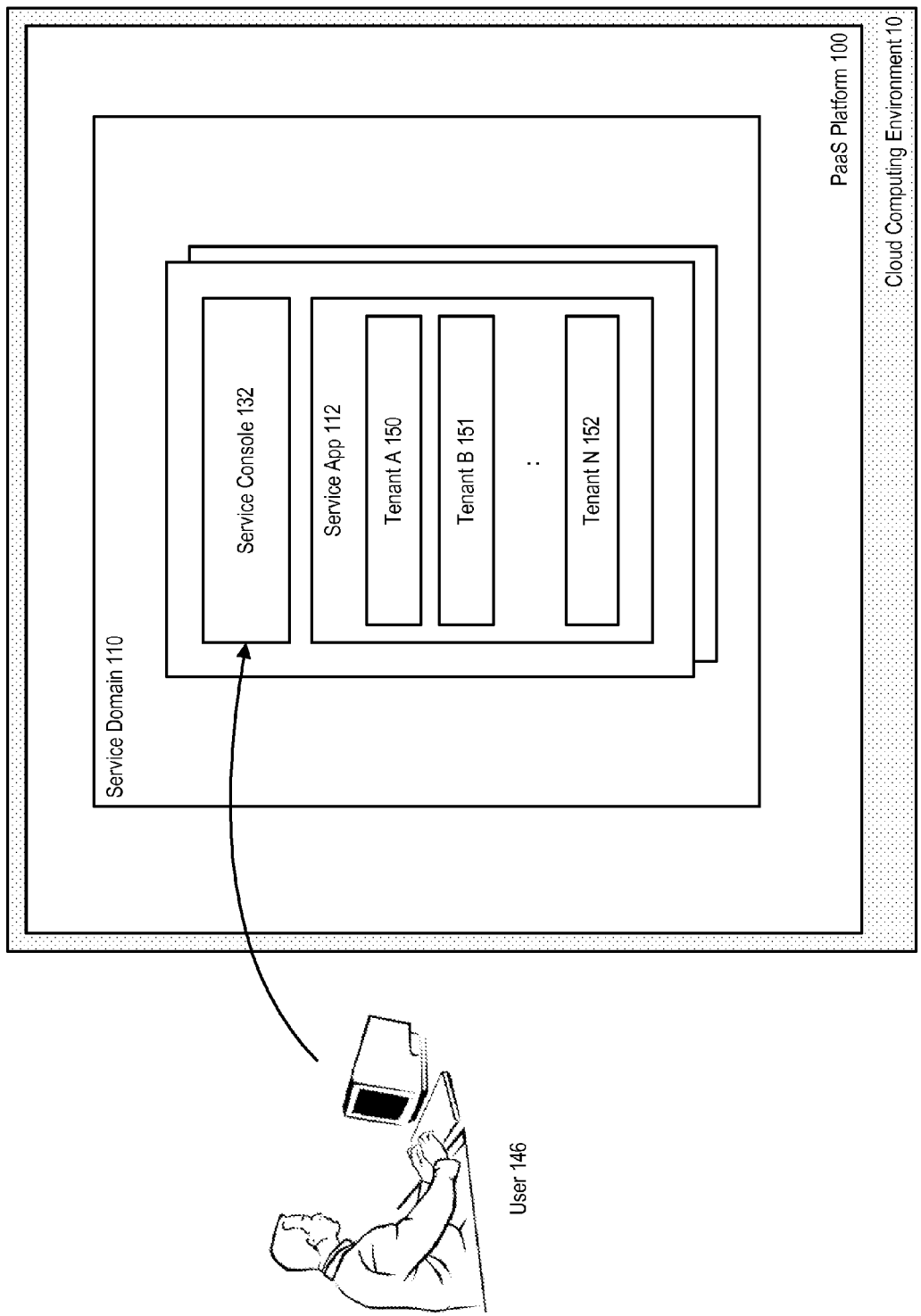
FIG. 5 illustrates a multiple tenant service domain, in accordance with an embodiment.

FIG. 5 illustrates a multiple tenant service domain, in accordance with an embodiment. As shown in FIG. 5, in accordance with an embodiment, a service domain can include multiple tenants 150, 151, 152, that are configurable using the service console. Multi-tenancy, like virtualization, is a density optimization that allows the use of less resources to support more clients and, similar to virtualization, should be transparent to the applications themselves. Although multi-tenancy involves the use of shared resources, the sharing need not be part of the logical model of the applications—these models are instead referred to as using "multitenant" and "dedicated" resources. Alternatively, applications may share resources in a manner that is part of the logical model of the applications; for example, two applications may purposely access a shared database because they intend to operate on the same data—these models are referred to as using "shared" and "unshared" resources.

In accordance with an embodiment, some service types may support both dedicated and multitenant uses, based on their particular configuration. Other service types may support either only dedicated use, or only multitenant use. Service types that are able to support multiple tenants on the same runtime can provision their runtimes in a multitenant manner, during the instantiation process, based on the configuration of the service type. A single instantiated service runtime that has been marked as multitenant-capable will be reused for a finite number of additional service provisioning requests, as determined by the service type and based on its configuration. Generally, it is left to the service application to support a particular tenancy mode; service applications that are not multitenant will only be able to support a single account for each service instance. Once a service has been instantiated from its VM assembly, end users 146 can interact with the system and the instantiated services, in the same manner as they would interact with an on-premise version of that service.

Figure 6:
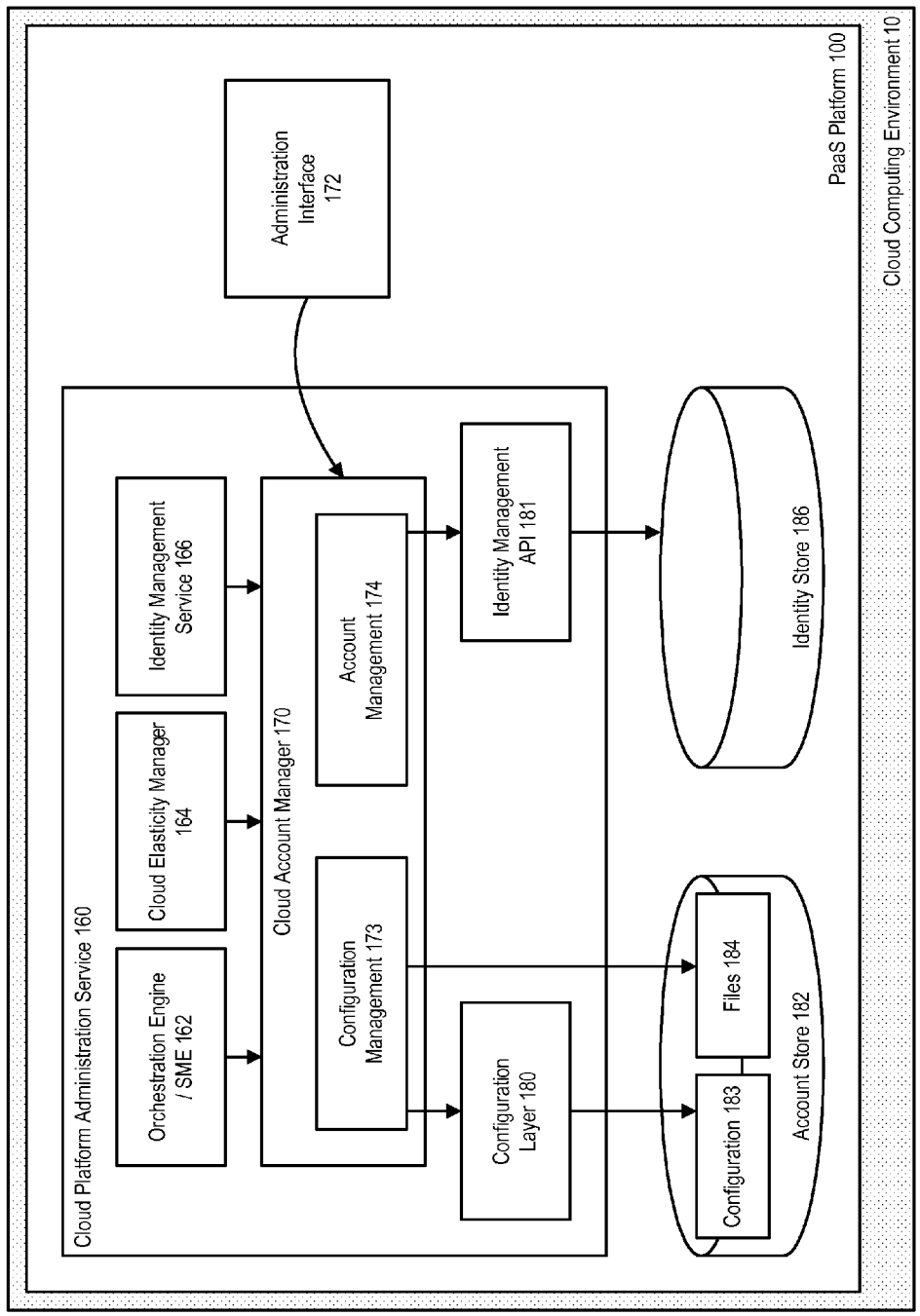
FIG. 6 illustrates a cloud account manager, in accordance with an embodiment

FIG. 6 illustrates a cloud account manager, in accordance with an embodiment. As shown in FIG. 6, in accordance with an embodiment, the PaaS platform can include a cloud platform administration service (CPAS) 160, together with a cloud account manager 170 which supports functions such as account management, and provides a framework that other modules, such as the orchestration engine/SMEs 162, cloud elasticity manager (CEM, referred to herein in some embodiments as an elasticity manager) 164, or identity management service 166), can use to access account-specific data. A configuration management component 173 can use a configuration layer 180 to persist account specific configuration 183 and other files 184 to an account store 182. An account management module 174 provides the ability to manage accounts for a CPAS domain, which can be exposed through the use of a command-line, REST, or other identity management application program interface (API) 181.

In accordance with an embodiment, users can either be managed within an identity store 186 managed by the PaaS platform, or alternatively can be provided from an external, e.g., corporate LDAP, or other means of user identification; and can access the cloud account manager through an administration interface 172. Account and configuration data can also be stored on a file system or other means of storage that is accessible from nodes of a CPAS cluster.

Service Definition Package (SDP)

Figure 7:
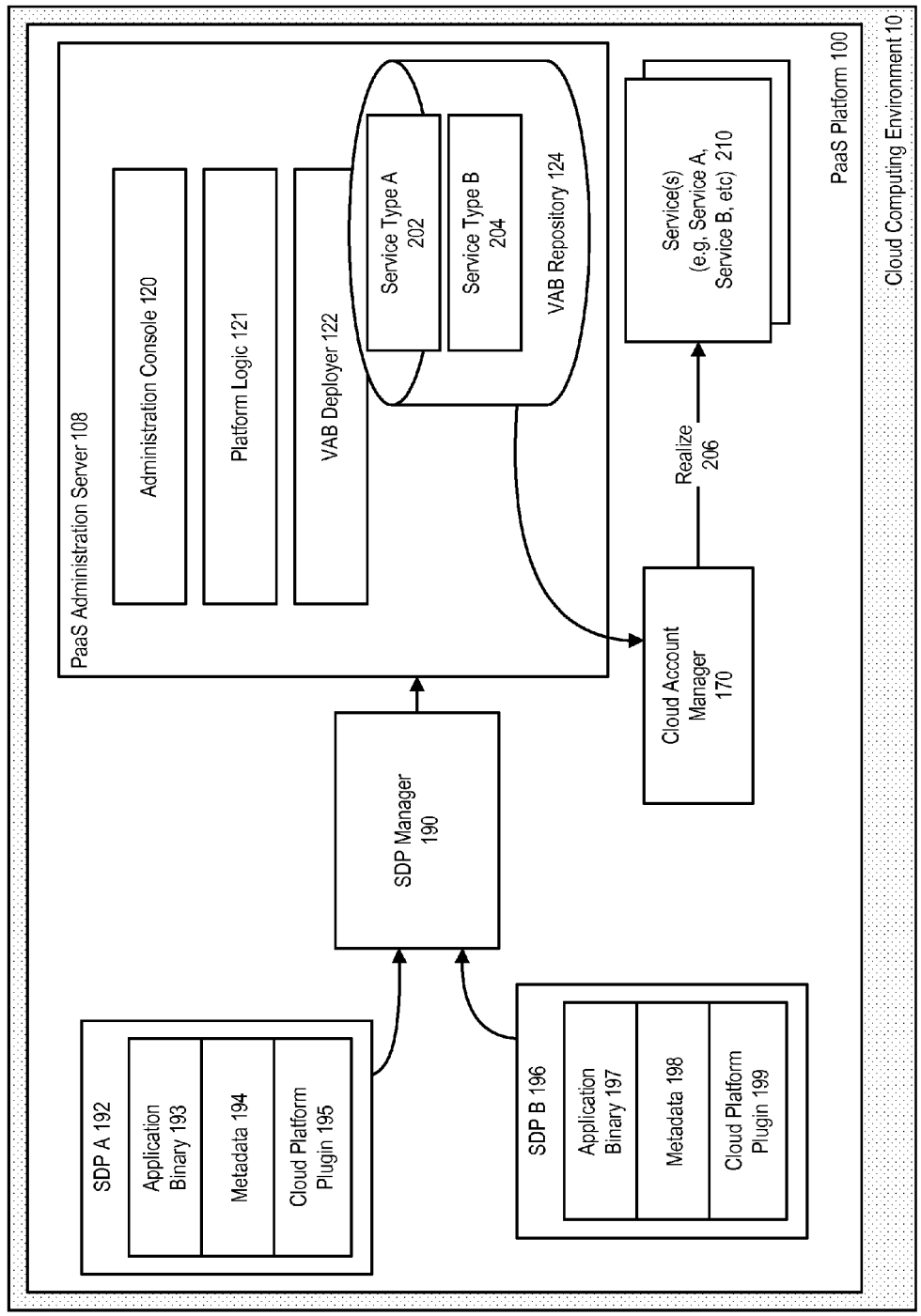
FIG. 7 illustrates the use of a service definition package, in accordance with an embodiment.

FIG. 7 illustrates the use of a service definition package, in accordance with an embodiment. As shown in FIG. 7, in accordance with an embodiment, each SDP 192, 196 can include a binary 193, 197; a metadata 194, 198 (e.g., the SDP name, service type, version, vendor, or virtualization support metadata such as indicating whether the SDP supports OVAB, EC2, or Native); and one or more plugins 195, 199 that enable the SDP to be used within a PaaS platform or cloud environment.

For example, in accordance with an exemplary embodiment, each SDP can include an assembly, reference, package, archive, or template, which can be used to install a service on a particular virtualization provider (e.g., OVAB); an assembly bundled within the SDP or a reference to an assembly (e.g., an EC2-specific reference); a service management engine (SME) plugin for the service type, which enables platform functionality such as elasticity metric gatherers, or alerts to be used with the service; a plugin for use with a VAB deployer (e.g., OVAB Deployer) during its assembly rehydration process; and other dependency and configuration information, such as scalability limits or whether the service is a multitenant or dedicated service.

In accordance with an embodiment, installing an SDP will install, e.g., the OVAB assembly into the OVAB repository; appropriate SME plugins will be registered with the cloud platform; and metric gatherers, alerts and actions will be installed in the PaaS platform. After a System Administrator installs the SDP, a Cloud Account Administrator can then use a cloud account administration interface to request for a service of that type.

In accordance with an embodiment, when an SDP is installed into a PaaS platform domain, it is consumed by an SDP Manager 190, which is responsible for obtaining a list of SDPs available to be installed the local system, downloading an SDP if necessary, installing parts of the SDP into the right places, maintaining a list of those SDPs that have been installed, and, if necessary, uninstalling an SDP by uninstalling all of its parts from the places they were previously installed.

In accordance with an embodiment, the SDP manager can interface with other system components by installing an SME plugin to the CPAS, which can then take responsibility for replicating the SME plugin to other CPAS instances in the cluster, installing the VAB assembly 202, 204 into the VAB deployer, interfacing with other tools such as Enterprise Manager to provide a customized console interface for the service if the service provides one, and installing configuration data for the service into the CPAS. Subsequently, during realization 206 of a service, the service 210 can be realized as an instance of those service types defined by the SDP and installed as assemblies in the VAB repository.

Service Management Engine (SME)

Figure 8:
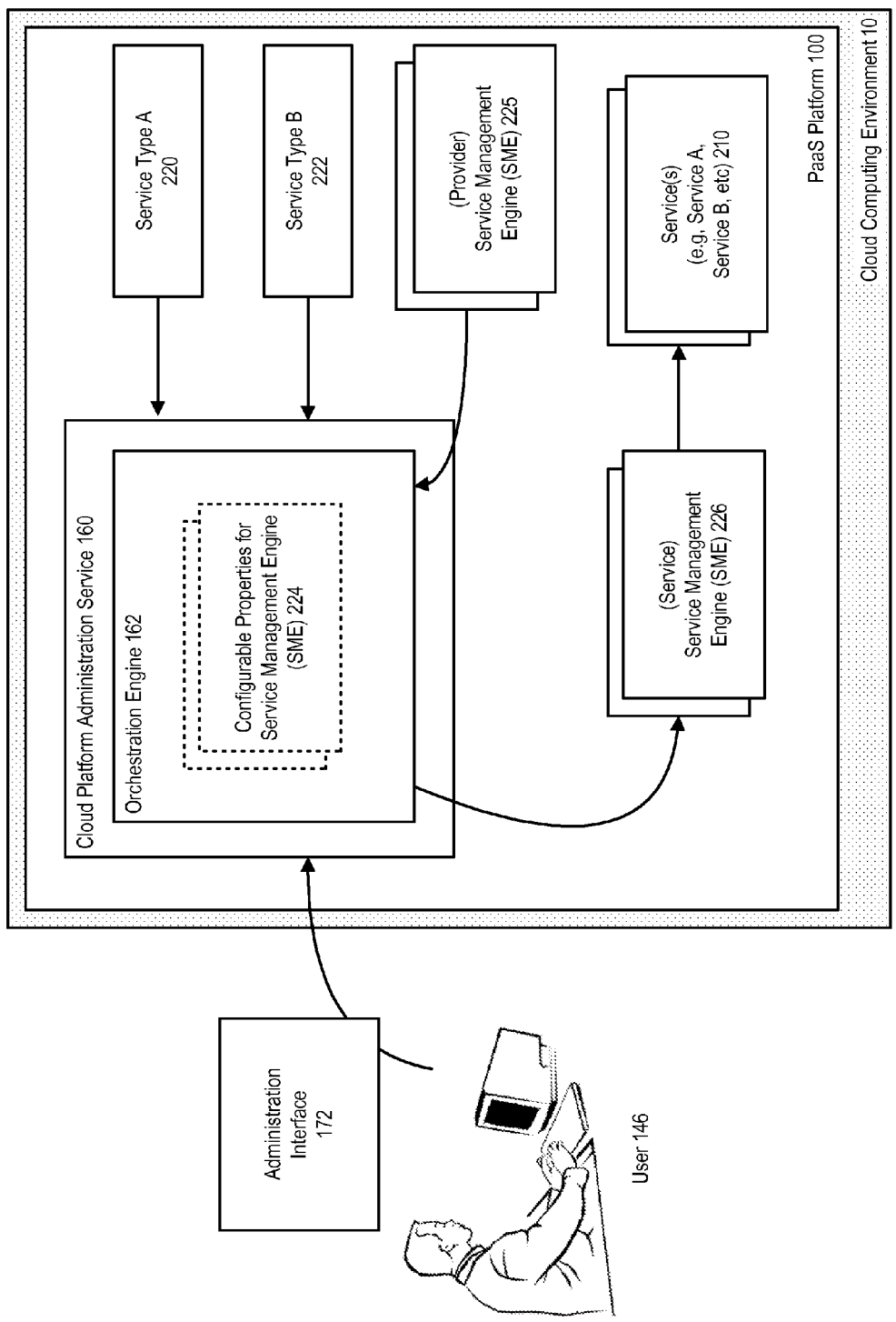
FIG. 8 illustrates the use of a service management engine, in accordance with an embodiment.

FIG. 8 illustrates the use of a service management engine, in accordance with an embodiment. In accordance with an embodiment, a Service Management Engine (SME) provides a generic means to plug any service type into the system. For example, an SME takes care of the service-specific provisioning, lifecycle, management, and monitoring support for a service type or provider type. There can be different classes of SMEs; for example, provider SMEs can be provided to handle different providers. Service SMEs can be dynamically incorporated into the platform domain by installing an appropriate SDP, which are then registered by the SDP manager. The set of registered service SMEs then become the service types that are available to Cloud Account Administrators to create services.

In accordance with an embodiment, each service type supported in the PaaS platform domain maps to a specific service SME. A service SME handles all service-related activities, such as creation, monitoring, management, patching, upgrade, and deletion for that service. In accordance with an embodiment, the contract that is implemented by an SME is referred to as a Service Management Interface (SMI).

Referring to the example shown in FIG. 8, when OVAB is used as a virtualization provider, interaction with the OVAB Deployer can be handled by a virtualization API (e.g., an OVAB client API). In accordance with an embodiment, the orchestration process can then proceed as follows: a Cloud Account Administrator can discover, e.g., SOA service types 220, 222 that are available in the PaaS platform domain, and initiate creation of an, e.g., SOA service. The orchestration engine iterates through the available service SMEs in the system, and determines which service SMEs can handle this service type 224. In this example, the orchestration engine can discover an appropriate SOA SME to handle creation of the SOA service. The orchestration engine can then call into the SME to get all provider dependencies for that SME 225. For example, the SME may return database and load-balancer provider dependencies. The orchestration engine can then call a get-user or similar configurable properties function for the SME, and expose those properties in a user interface, so that the Cloud Account Administrator can edit the properties if desired. User-provided inputs can be supplied to the SME, for example to update an OVAB deployment plan. The orchestration engine then performs any pre-provisioning association between the SME and the provider SMEs upon which it depends. For example, the orchestration engine can perform pre-provisioning association between the SOA SME and a database provider SME, which results in the creation of schema and tables required by the SOA service, in addition to populating the deployment plan with the database provider configuration. When any pre-provisioning association is complete, the orchestration engine can then call into the SME 226 to provision the service.

At this point, the deployment plan is generally complete except for network configurations. In accordance with an embodiment, the deployment plan together with an assembly ID can be pushed, e.g., to the OVAB API, which takes care of filling the deployment plan with the remaining network configurations. Then, the orchestration engine can call, e.g., a Web service API of the OVAB Deployer, to provision the OVAB assembly. Once the assembly is provisioned, the virtual machine information can be retrieved and passed back to the SME, which in turn passes the information back to the orchestration engine. The orchestration engine can then perform any post-provisioning association between the SME and the provider SMEs on which it depends. For example, post-provisioning association between the SOA SME and a load-balancer provider SME may result in the creation of a virtual server to handle and route requests for this SOA service.

Orchestration Engine (OE)

Figure 9:
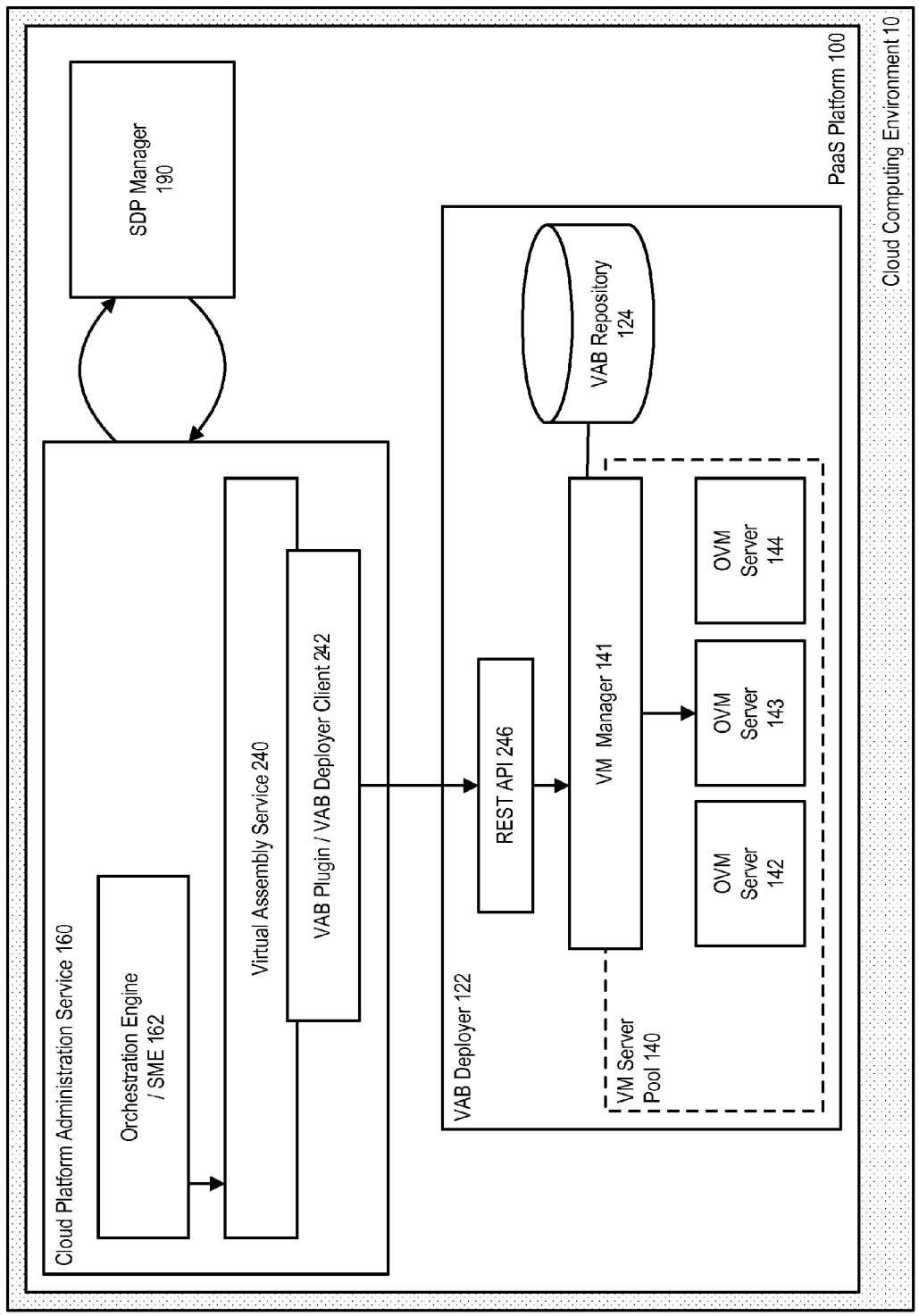
FIG. 9 illustrates the use of an orchestration engine, in accordance with an embodiment.

FIG. 9 illustrates the use of an orchestration engine, in accordance with an embodiment. In accordance with an embodiment, the orchestration engine enables life-cycle management of the services in a PaaS platform. In particular, the orchestration engine coordinates the interactions among various components in the platform domain while creating or managing a service, enables the pluggability of SMEs for various service types in the platform, aids in provisioning the service by selecting appropriate SMEs from among those available in the platform, and helps in managing the configuration of providers such as DB Providers, IDM Providers, and LB Providers.

In accordance with an embodiment, the orchestration engine, as part of creating a service, ensures that dependencies of the service, such as its provider dependencies, are satisfied, by selecting appropriate providers, and coordinating association between the providers and service. The act of association can be performed during pre-provisioning and/or post provisioning-phases. The act of installing and configuring an SME can be performed by the SDP manager as part of registering a pre-packaged service type or a customized service type. The orchestration engine helps expose the deployment plan configuration, which can be configured by the Cloud Account Administrator, including recognizing phases and tasks that match the requirements of the platform for its service creation action, and other life-cycle related activities.

In accordance with an embodiment, the orchestration engine also acts as a gateway for service management, monitoring, scaling actions that could be initiated by other containers in the PaaS platform domain, or by an administrator. For example, the elasticity engine, described in further detail below, can communicate with the orchestration engine to manage, monitor, and scale services based on a service's QoS configuration. The orchestration engine can also play a role in service maintenance actions, such as patching and upgrade, which may require disassociating or re-associating services in a phased manner.

In accordance with an embodiment, services created by a cloud account administrator are visible and accessible only to that particular cloud account (tenant), and are isolated from other cloud accounts in the PaaS platform domain. Such isolation can be provided by the orchestration engine with the help of a cloud account management module.

In accordance with an embodiment, SMEs can be registered with the orchestration engine such that multiple SMEs for a given "family" of service (e.g., "database") can be present in the system. A default SME can also be configured for a particular service family on a per-cloud account basis.

As shown in FIG. 9, in accordance with an embodiment, the orchestration and service management components can interface with the virtualization layer through a virtualization service 240, plugin 242, and virtualization API 246 that abstracts supported virtualization operations. In accordance with an embodiment that uses OVAB, this API can be an OVAB Deployer interface, which enables OVAB Deployer to perform the tasks of assembly creation. In accordance with an embodiment, the orchestration engine/SME can upload and deploys assemblies through the OVAB virtualization API, in addition to managing their lifecycle.

To support developer or demonstration scenarios, in accordance with an embodiment, the system can also implement solutions that run on native OS processes (i.e., with no virtualization). This capability can be implemented by providing a "physical plugin", which implements a portion of the virtualization API.

Elasticity Manager (EM)

Figure 10:
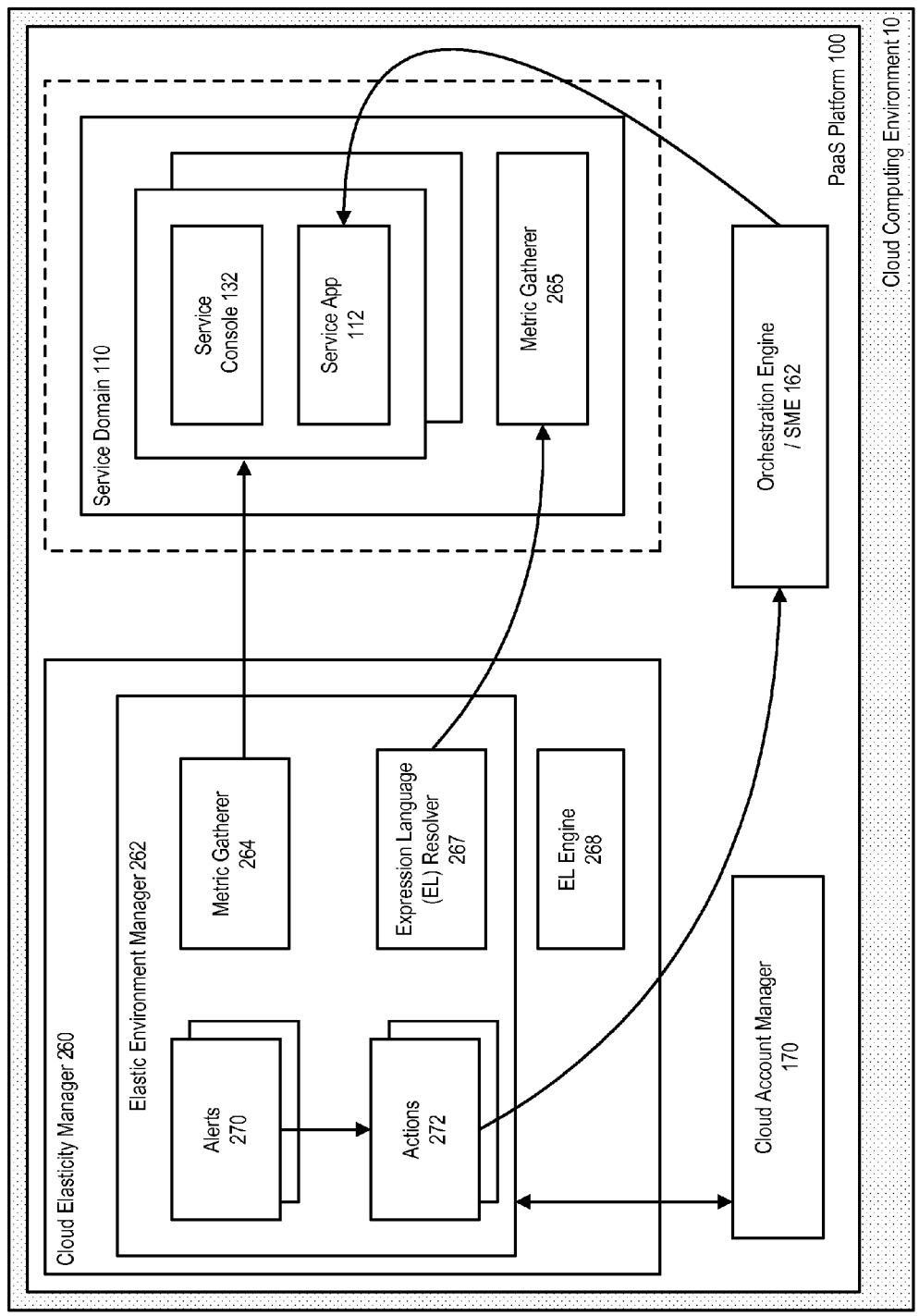
FIG. 10 illustrates the use of an elasticity manager, in accordance with an embodiment.

FIG. 10 illustrates the use of an elasticity manager, in accordance with an embodiment. As shown in FIG. 10, in accordance with an embodiment, the elasticity manager 260, including an environment manager 262, can use metric gatherers 264, 265 and alerts 270, e.g., as HK2 contracts, to determine the health of services running in an environment. Once the state of the environment is determined, the elasticity manager can take appropriate actions 272.

In accordance with an embodiment, a metric gatherer is an object that collects and maintains metric data about a service periodically. For example, a metric gatherer may periodically collect heap statistics such as used or committed memory; or metrics regarding CPU usage. Generally, the metric gatherers provide information about the state of some resource usage. Metrics can also be provided by external monitoring tools, for example by a Java bean component.

In accordance with an embodiment, an alert object periodically checks the health of a service in an environment, by analyzing metric data gathered by one or more metric gatherers over a period of time. For example, an alert may examine CPU usage for a previous several minutes to determine if the environment is under stress. After the alert determines the state of the service or environment, it can execute an action, such as sending an email, logging a message, sending an event, or scaling-up or scaling-down a service. In accordance with an embodiment, an alert can take multiple actions.

In accordance with an embodiment, the elasticity manager can include a unified Expression Language (EL) engine 268, which allows alerts and metric gatherers to be specified as EL expressions. In accordance with an embodiment, the elasticity manager allows external EL Resolver objects 267 to be registered, which enables other types of objects, such as MBeans or POJOs, to be used in an expression.

Update and Patching of SDPs

In accordance with an embodiment, services can be periodically maintained to ensure that they are up-to-date with, e.g., bug fixes, security updates and configuration changes. To help ensure homogeneous environments, services should be updated in a timely manner, with the same set of patches and configuration updates. In accordance with an embodiment, an update is defined to be a change which has to be made to the system; examples of which include application of a security patch, upgrade of a component, or changing of a configuration value. Depending on the type of update, some updates may require a service or system downtime, while other updates may not require a downtime; and each of these scenarios can be taken into account.

User Messaging Service

In accordance with an embodiment, the system can include a user messaging service for use with a cloud environment. The user messaging service allows a cloud account user to indicate a preference that, while operations are being performed within the cloud environment, such as the provisioning of a particular service, status notifications that are intended for that user, such as completion of an operation or operational alerts, should be communicated to that user via one or more preferred channels, for example by email, instant messaging, social media, or another communication medium.

For example, in accordance with an embodiment, the system can utilize a user messaging service such as, for example, Oracle User Messaging Service (UMS), which is provided as a component of Oracle Java Runtime Files (JRF), and which in turn includes a set of libraries and applications that can be used by environments such as Fusion Middleware or other software products. In accordance with other embodiments, other types of user messaging services can be used.

In accordance with an embodiment, the user messaging service integrates a plurality of messaging capabilities that can be used to send notifications to users. For example, the pluggable architecture of UMS allows different drivers to be integrated into UMS, to provide email, XMPP, SMS, and/or instant messaging capabilities.

In accordance with an embodiment, the user messaging service is associated with

A user messaging server, which orchestrates message flow between applications and users, including routing outbound messages from client applications to appropriate drivers, and routing inbound messages to the correct client applications;

User messaging drivers, which connect the user messaging service to various messaging gateways, adapting content to protocols as necessary; and User messaging clients, which implement the business logic of sending and receiving messages.

In accordance with an embodiment, a user communication preferences component such as, for example, Oracle User Communication Preferences (UCP), allows a user who has access to multiple channels to control how, when, and where they should receive messages, including defining filters or delivery preferences that specify which channel a particular message should be delivered to, and under which circumstances.

In accordance with an embodiment, the user communication preferences component can provide a user interface and an API, to provide access by a user to manage that user's channels and delivery preferences, so that the user messaging service can then acquire the user's delivery preferences and send messages accordingly.

For example, as described above, in accordance with an embodiment, the user messaging service and user communications preference can be provided by UMS and UCP respectively.

By sending messages through, e.g., UMS, an application will indirectly use the UCP service. In accordance with other embodiments, other types of user messaging services and user communication preferences components can be used.

In accordance with an embodiment, a PaaS platform component, such as a CloudLogic platform or other cloud environment as described above, can integrate with a user messaging service, such as UMS, to provide messaging capabilities within the cloud environment.

For example, in an environment such as CloudLogic, where operations can be long-running and complex, platform administrators (padmins) and cloud account administrators (cadmins) may wish to be notified when important events occur.

For example, when a service is being provisioned within the cloud environment, if it is likely to take a long time for the provisioning to complete, then, rather than poll to see when the service is provisioned, a cloud account or other user can choose to be notified that the provisioning has completed.

In accordance with an embodiment, the notification of, e.g., the completion of an action, can be provided by the preferred channel for that account or user. Similarly, if a platform-related alert reaches a critical state, a cloud account user can choose to be notified of the alert by their preferred channel.

Notifications from a PaaS or CloudLogic platform, or other cloud environment, can be similarly sent to various users of the platform or environment, using the user messaging service.

In accordance with an embodiment, as referred to herein, a notification can be any mechanism that informs of a particular event. A notifiable is an event that must be conveyed to interested parties, e.g., users. A filter is a message delivery preference rule that controls how, when, and where a user receives messages. A channel generally refers to one of the addresses with which that channel can communicate.

In accordance with an embodiment, as further referred to herein, a business term is a named attribute for a message, such as a subject. Business terms can be extracted from messages or supplied by applications, and can be used to compare with a specified value in a filter condition, to select the filter. A condition is a combination of a business term, an operator and a specified value. A fact about a message can be used to compare against the value to evaluate the truth of the condition. An action is the action to be taken if the specified conditions in a filter are true, for example to not send a message, or to send a message to a first available channel, or to send a message to all selected channels.

Figure 11:
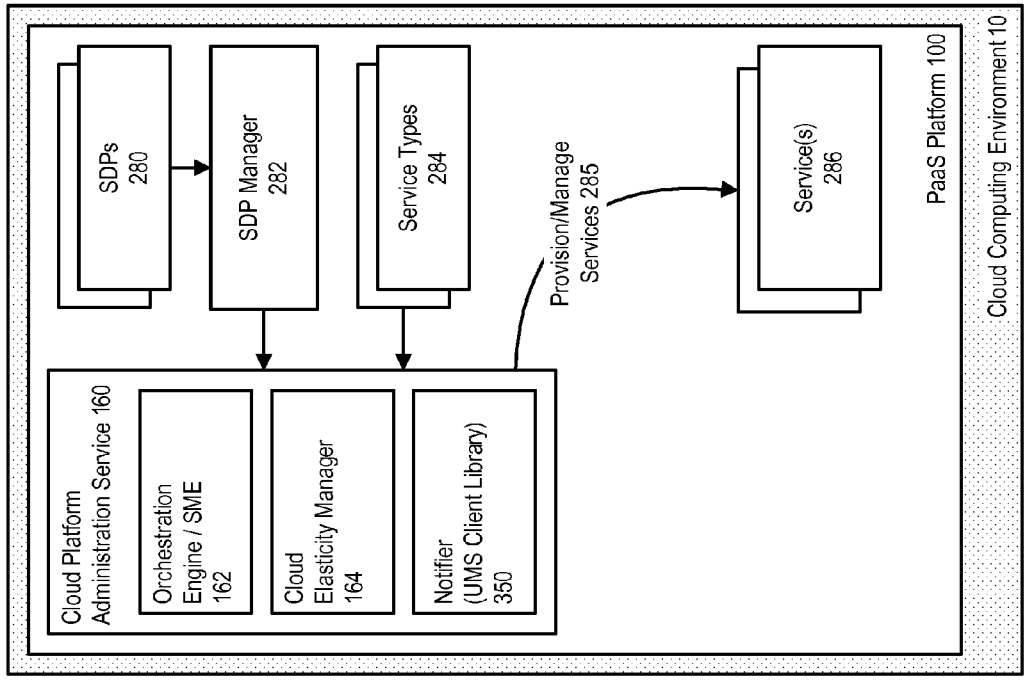
FIG. 11 illustrates the use of a user messaging service with a cloud environment, in accordance with an embodiment.
Figure 11:
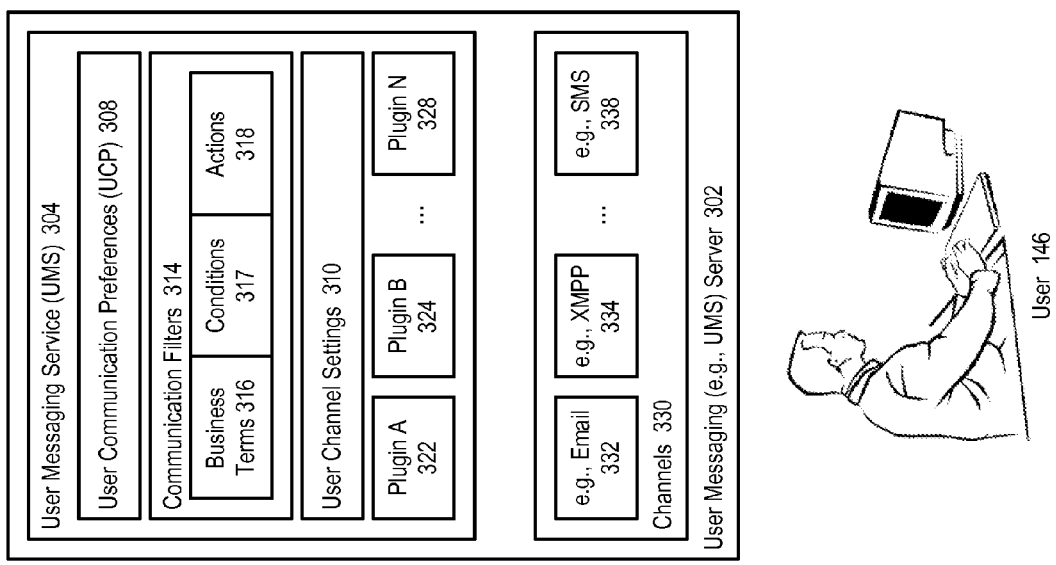

FIG. 11 illustrates the use of a user messaging service with a cloud environment, in accordance with an embodiment. In accordance with an embodiment, to integrate a user messaging service, e.g., UMS, within a PaaS or CloudLogic platform or other cloud environment, the system can include a client library that interacts with the UMS server, that the CloudLogic platform or cloud environment components can then use. In accordance with an embodiment, the client library can be provided by a notifier as further described below, which enables notifications from the various subsystems in the CloudLogic platform or other cloud environment to interact with the UMS server.

In accordance with an embodiment, the system can include a UMS driver-agnostic way of sending notifications, and a UMS driver-specific configuration details as to who will configure this and where it will be stored. Command framework integration, and integration with, e.g., the elasticity manager, is also important to be able to send notifications for commands, and for UMS and hence UCP for alerts and actions to be able to send notifications.

As shown in FIG. 11, in accordance with an embodiment, a user messaging (e.g., a UMS) server 302 hosts a user messaging service 304. In accordance with an embodiment, the user messaging service recognizes user communication preferences (UCP) 308, which determine how communications should be communicated to different users.

In accordance with an embodiment, a plurality of communication filters 314 can be used to filter which, and how, messages should be communicated.

For example, in accordance with an embodiment, the filters can use a combination of business terms 316, conditions 317, and actions 318, as described above, to control the filtering and communication of messages.

In accordance with an embodiment, users can be associated with user channel settings 310. The user messaging service can also support a plurality of plugins 322, 324, 328, that can be used to communicate with different communication channels 330, for example email 332, XMPP 334, or SMS channels respectively.

Within the PaaS platform, or other cloud environment, such as a CloudLogic environment, a notifier 350, for example a UMS client library, can be used to communicate notifications to the user messaging service.

Figure 12:
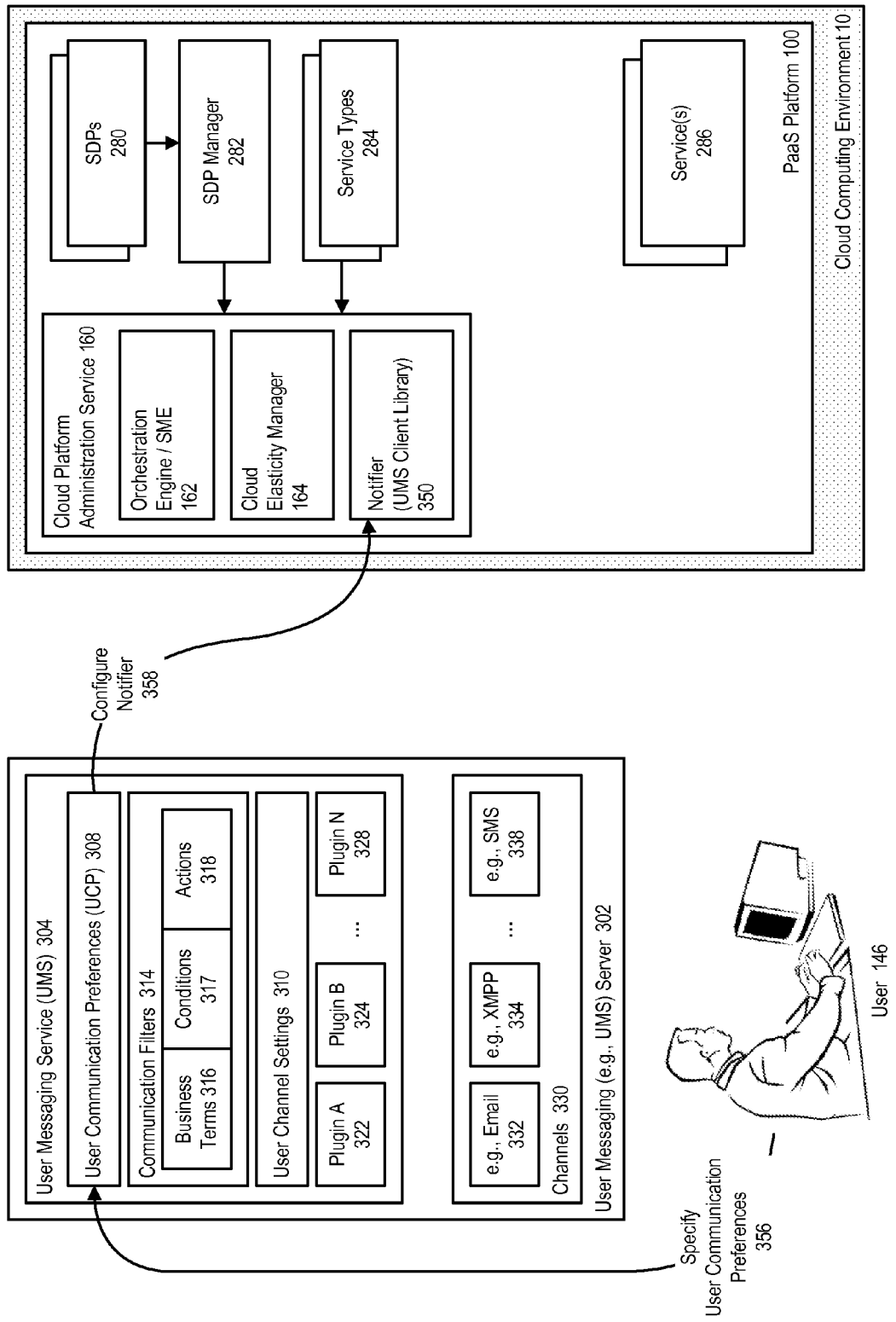
FIG. 12 further illustrates the use of a user messaging service with a cloud environment, in accordance with an embodiment.

FIG. 12 further illustrates the use of a user messaging service with a cloud environment, in accordance with an embodiment.

As shown in FIG. 12, in accordance with an embodiment, a user can specify user communication preferences 356, which will be associated with that user. This user-specified information can then be provided to configure 358 the notifier at the PaaS platform or cloud environment.

Figure 13:
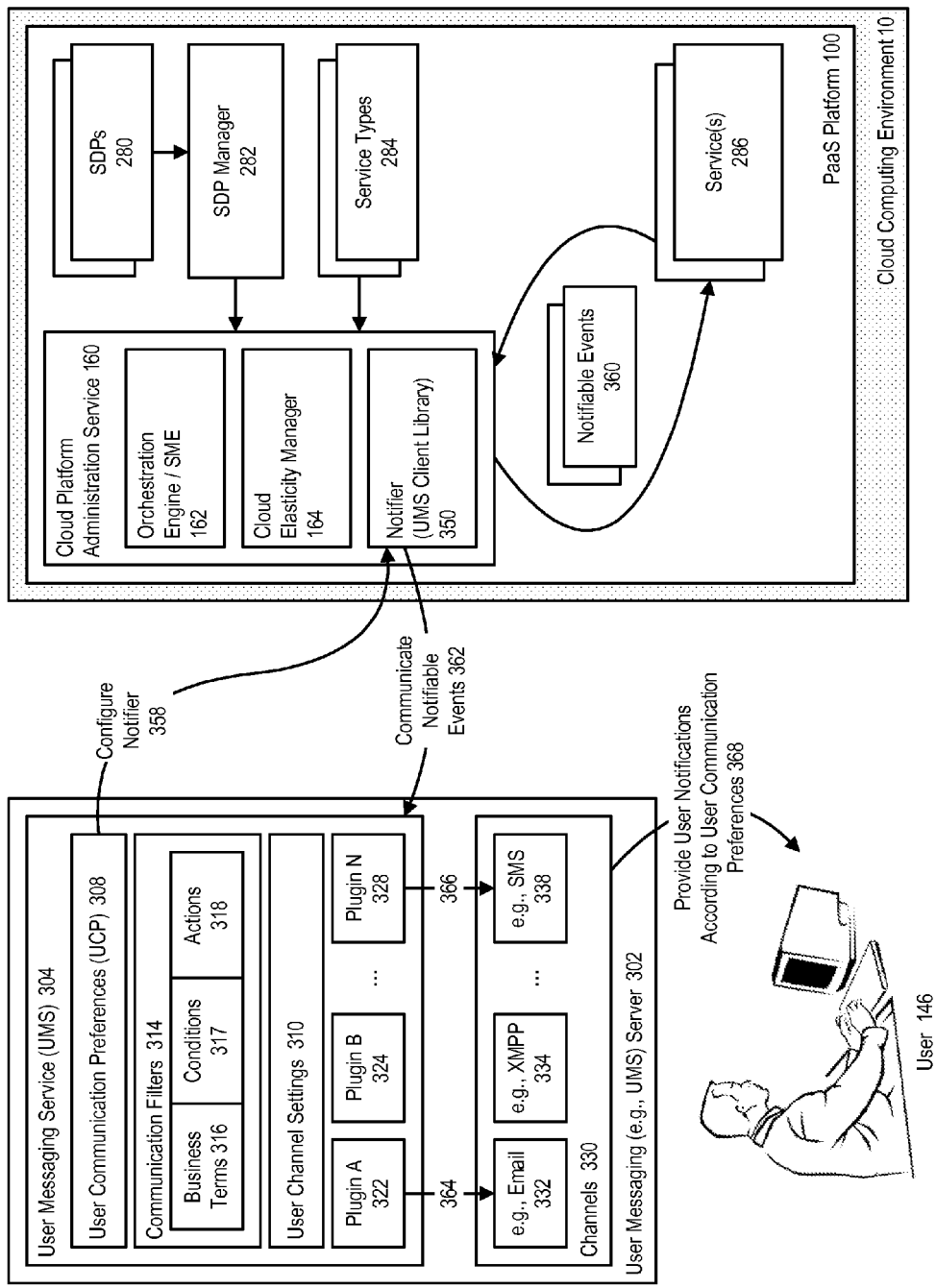
FIG. 13 further illustrates the use of a user messaging service with a cloud environment, in accordance with an embodiment.

FIG. 13 further illustrates the use of a user messaging service with a cloud environment, in accordance with an embodiment.

As shown in FIG. 13, as notifiable events 360 occur within the cloud environment, the notifiable events are communicated 362, via the notifier, to the user messaging service.

In accordance with an embodiment, the user messaging service can then, depending on the user channel settings, utilize an appropriate plugin and communication channel 364, 366, to provide user notifications 368 to users, according to the user-specified communication preferences.

Notifiers

In accordance with an embodiment, the notifier is responsible for loading the notification preferences from a User Communication Preferences (UCP) API for a user, abstracting the notification process, sending notifications, and checking on the status of a notification.

CPAS Configuration

In accordance with an embodiment, the cloud platform administration service (CPAS) must be configured for the communication technologies that are desired to be supported.

For example, in accordance with an embodiment the user messaging service can have an SMTP server available for sending email, and a Twitter account available for sending tweets. Such configuration can be specified, and modified as necessary, for example for SMS, XMPP, and Twitter:

```
driverProperties = SmppDriverProperties( )
driverProperties.SenderAddresses = "SMS:1234"
driverProperties.SmsAccountId = "1234"
driverProperties.RangeSetNull = "true"
driverProperties.SmsServerHost = "127.0.0.1"
driverProperties.TransmitterSystemId = "smppclient1"
driverProperties.ReceiverSystemId = "smppclient1"
driverProperties.TransmitterSystemType = "Logica"
driverProperties.ReceiverSystemType = "Logica"
driverProperties.TransmitterSystemPassword = "password"
driverProperties.ReceiverSystemPassword = "password"
driverProperties.ServerTransmitterPort = "2775"
driverProperties.ServerReceiverPort = "2775"
driverProperties.ExtraErrorCode = " "
driverProperties.LocalAddress = " "
configUserMessagingDriver(baseDriver="smpp", appName="smpp",
driverProperties=driverProperties)
*XMPP
driverProperties = XmppDriverProperties( )
driverProperties.IMServerHost = driverConfigXmppServer
driverProperties.IMServerUsername = hostName
driverProperties.IMServerPassword = "welcome1"
configUserMessagingDriver(baseDriver="xmpp", appName="xmpp",
driverProperties=driverProperties, clusterName)
*Twitter
wls:/base_domain/serverConfig> dprops = TwitterDriverProperties( )
wls:/base_domain/serverConfig> dprops.ConsumerKey ='hej'
wls:/base_domain/serverConfig> dprops.ConsumerSecret='hejigen'
wls:/base_domain/serverConfig> dprops.AccessToken='blaha'
wls:/base_domain/serverConfig> dprops.AccessTokenSecret=
'blahahahahaha'
wls:/base_domain/serverConfig> dprops.AuthenticationMode=
'OAuth'
wls:/base_domain/serverConfig> configUserMessagingDriver
(baseDriver='twitter',
appName='twitter',driverProperties=dprops)
```

User Communication Preferences

In accordance with an embodiment, User Communication Preferences (UCP) allows a user who has access to multiple channels to control how, when, and where they receive messages. For example, users can define filters, or delivery preferences, that specify which channel a message should be delivered to, and under what circumstances.

In accordance with an embodiment, information about a user's channels and filters can be stored in a database supported for use with, e.g., Oracle Fusion Middleware. In accordance with an embodiment, since preferences are stored in a database, this information can be shared across all instances of User Communication Preferences within a domain. Generally, UCP does not provide services for message delivery, rather it provides a user interface and APIs to access and manage a user's channels and delivery preferences.

In accordance with an embodiment, when a message is addressed to a user, the user messaging service (UMS) acquires the user's delivery preferences from a UCP service, and sends the message according to the user's preferences.

For an application developer, User Communication Preferences provides increased flexibility. By sending messages through UMS, an application is indirectly using UCP service. Applications can also directly access UCP services by calling UCP APIs, to access and manage a user's preferences, and by integrating with UCP using a task flow library.

Command Line Interface (CLI) and Per-User Configuration

In accordance with an embodiment, a per-user configuration can be specified, which can indicate the preferences for the notification. A user can specify the default channel for communication. Additionally a user can specify filters and business rules for different channels.

In accordance with an embodiment, all preferences are based per user. For example, in the examples illustrated below the "—channel" parameters provided for the user must match the group of allowed values chosen from: EMAIL; TWITTER; SMS; XMPP. In accordance with an embodiment, this will create a new preference if it does not exist, or else will update the original one using the User Communication Preferences API:

```
padmin/cadmin set-notification-preference --user
<user> --channel <channel>
    --setdefault[=<setdefault(default:true)>] <default:true>
    -- value <value> nameOfPreference
```

For example:

```
padmin/cadmin set-notification-preference --user johndoe
--channel EMAIL
    --value johndoe@oracle.com WorkEmail
padmin/cadmin set-notification-preference --user johndoe
--channel TWITTER
    --value johndoe MyTwitter
```

This command will delete the notification preference as specified by user:
padmin/cadmin delete-notification-preference—user<user>nameofPreference
For example:
padmin/cadmin delete-notifcation-preference—user johndoe WorkEmail
This command will list the preferences specified by user:
padmin/cadmin list-notification-preferences—user<user>
For example:
padmin/cadmin list-notification-preferences—user johndoe may return:

| Name | Channel | Value | Default |
|---|---|---|---|
| WorkEmail | EMAIL | john.doe@oracle.com | true |
| WorkPhone | SMS | 408-888-9999 | false |
| MyTwitter | TWITTER | johndoe | false |

Filters and Conditions for Users

In accordance with an embodiment, a messaging filter defines rules on how to handle incoming messages addressed to a user. For example, messaging filters enable users to build filters that specify the type of messages they want to receive, and also the channel through which to receive these messages. In accordance with an embodiment, a filter is composed of two primary sections, a condition (If) section, and an action (Then) section.

For each incoming message, the filters are evaluated to determine the appropriate filter that must be selected for handling the message. The condition section determines the circumstances under which a filter is selected; while the action section specifies how the message is handled if the filter is selected.

An example of how a user can create filters and add multiple conditions to the filter is illustrated below. For example, to create a filter that will be selected for both conditions "Subject contains create-service" and "Status contains Success", the filter can be selected to MATCH_ALL so that both the conditions are matched:

```
padmin/cadmin create-notification-filter --match=
<MATCH_ANY|MATCH_ALL>
    --action= <PARALLEL|SERIAL|NO_ACTION>
    --description <desc> filtername
```

For example:

```
padmin/cadmin create-notification-filter --match=MATCH_ANY
    --action= PARALLEL --description "success filter" myfilter
```

In accordance with an embodiment, the following parameters can be used to specify what action needs to be taken for a filter: PARALLEL: Send to all selected channels simultaneously from the notification preferences; SERIAL: Send to first available channel in the notification preference; NO_ACTION: Do not send message.

In accordance with an embodiment, a command line interface (CLI) can be used to list notification filters, for example:
padmin/cadmin list-notification-filters
For example:
padmin/cadmin list-notification-filters—user johndoe
In accordance with an embodiment, this is the CLI to delete a notification filter:
padmin/cadmin delete-notification-filter<filter-name>
For example:
padmin cadmin delete-notification-filter myfilter
In accordance with an embodiment, this is the CLI to create a notification condition. A notification condition can be a condition for instance "Subject contains create-service":

```
padmin/cadmin create-notification-condition -business-term <business
term>
    --operand <operand> --operation <operation> --filter <filtername>
condition_name
```

For example:

```
padmin/cadmin create-notification-condition --business-term=Status
    --operand = Contains --operation=Sucess --filter myfilter
statusCondition
```

In accordance with an embodiment, this is the CLI to list the notification conditions:
padmin/cadmin list-notification-conditions
For example:

padmin/cadmin list-notification-conditions \--filtername=myfilter

| CONDITION | FILTER | BUSINESS_TERM | OPERATION | OPERAND |
|---|---|---|---|---|
| statusCondition | myfilter | Status | Contains | Success |

In accordance with an embodiment, this is the CLI to delete a notification condition:
padmin/cadmin delete-notification-condition<condition_name>
For example:
padmin/cadmin delete-notification-condition statusCondition In accordance with an embodiment, commands which need notifications to be turned on, can be referred to as notifiable jobs. Any command which needs to send a notification can be annotated with a @Notifiable annotation. An administrative command context (AdminCommandContext) can then return a notifier (Notifier) which can be used to notify the events. In accordance with an embodiment, this is what the annotation looks like:

public @interface Notifiable

In accordance with an embodiment, by annotating a command with @Notifiable, the command framework will take care of creating a notification event (NotificationEvent) from the action report (ActionReport) of the command; getting the user preferences for this user; and sending the notification based on the user preferences.

```
@Notifiable
public class FakeCommand implements AdminCommand
{
```

In accordance with an embodiment, a command which is annotated with @Notifiable can invoke a notifyEvent( ) method of the Notifier, to send any events to the user:

```
@Inject Notifier notifier;
@Override
public void execute(AdminCommandContext context) {
...
notifier.notifyEvent(new NotifiableEvent.Builder<String>( ).name("Notification for create-service
command").data("Finished creating the service").build( ));
}
```

In accordance with an embodiment, notifications require the JRF and UMS API to be available, and will not work in the case of a standalone CPAS. An example NotifiableEvent class and API is provided below:

```
/**
* This is a event class for all notifications.
* A <code>NotifiableEvent</code> can be triggered during the following cases
* 1. Commands which are annotated with <code>@Notifiable</code> can
* automatically send notification once the command is completed*
* 2. When an alert are triggered
* 3. Changes to service lifecycle
* The <code>NotifiableEvent</code> can be sent via the UMS API
* to the channel registered by the user. Additionally there can be
* listeners which can subscribe to the events
*/
public class NotifiableEvent<T> {
/**
* The name of the event
*/
private String eventName;
/**
* The account associated with the event
*/
private String accountName;
/**
* The serviceName associated with the event
*/
private String serviceName;
/**
* The environment associated with the event
*/
private String environmentName;
/**
* The user associated with the event
*/
private String subject;
/**
* The timestamp for the event
*/
private long timestamp;
/**
* Additional information about the event.
* This can be an ActionReport which can be added to the event
* or a Metric Gatherer which contains data about the alerts
* See <code>MessageFormatter</code>to provide implementations
* of serializing this data
*/
```

```
private T data;
public static class Builder<T> {
private String eventName;
private String tenantName;
private String serviceName;
private String environmentName;
private String subject;
private T data;
private long timestamp;
...
}
```

In accordance with an embodiment, notifiable events (Notifiable Events) can be of varioustypes, for example resource/provider lifecycle events; sensor events; user defined events; and service lifecycle events. Exemplary events included service created, service deleted, service started, service stopped, service modified, service scale up started, service scaled up service scale up failed, service scaled down, service scale down stated, service scale down failed, service maintanence started, service maintainence ended service locked, and service unlocked.

In accordance with an embodiment, a—notify qualifier can be used to enable the notification for commands which are not annotated with @Notifiable. This will add the notification feature for some command which has not been annotated with @Notifiable by default.
padmin some-command—user johndoe—notify
For example, the above CLI will add notification support to the command, and send notifications based on user "johndoe's" preference.

Media Format Definitions

In accordance with an embodiment, the system can provide a way for a command implementor to define different message formats for different requirements, e.g., email vs Twitter (which has a 140 character limitation), for example:

```
@Contract
public interface MessageFormatter {
/**
* This method identifies if NotifiableEvent can be handled
* by this MessageFormatter
*
*/
public boolean handles( NotifiableEvent c);
**
* This method will customize a long message for a particular
* event in the format required for the Notification Type.
* @param e The type of event this formatter can handle
* @return an Object which can be used by the MessageProvider to
* send the message using UMS
*/
public Object formatLongMessage(NotifiableEvent e);
**
* This method will customize a short message for a particular
* event in the format required for the Notification Type.
* @param e The type of event this formatter can handle
* @return an Object which can be used by the MessageProvider to
* send the message using UMS
*/
public Object formatShortMessage(NotifiableEvent e);
}
```

In accordance with an embodiment, if the implementation of a message formatter (MessageFormatter) can handle the NotifiableEvent based on the data, it will be asked to compose a specific long and short message for that type of data and event. For example, the long messages can be used for, e.g., Email and IM; while the short messages can be used for, e.g., Twitter and SMS channels. There can be different implementations for this class, for example:

ActionReportMessageFormatter: In accordance with an embodiment, this is a MessageFormatter that will handle NotifiableEvents which have an ActionReport associated with it, and can format a long message regarding the status of a command, and a short message which will contain only the significant details from the ActionReport.

MetricGatherlMessageFormatter: In accordance with an embodiment, this is a specialized MetricGatherFormatter, which will handle NotifiableEvents which have a Metric-Gatherer and a MetricConfiguration associated with it, and can be used to format an email message regarding the state of a Metric and a short message containing some relevant information for a metric. Users can plug in their implementation for a MessageFormatter, which will implement the handles method to identify the type of notification, and then provide an implementation for the best way to format the event.

Interaction with Elasticity Manager

In accordance with an embodiment that provides information to an elasticity manager, a user can create sensors and add actions to sensors, for example:

```
cadmin create-sensor --tenant acme --service my-java-service
    --alert-type ServiceMonitorAlert
    -- properties ServiceMonitorName=jvm_heap_service_monitor
    HeapServiceMonitorAlert
```

For example, to define a new Notify action:

```
cadmin create-sensor-action --account acme --service my-java-service
    --action-name=notify HeapSMCriticalNotifyAction
```

Add this action to the sensor:

```
cadmin add-action-to-sensor-state --account acme --service my-java-service
    --state CRITICAL --alert-name HeapServiceMonitorAlert
    HeapSMCriticalNotifyAction
```

In accordance with an embodiment, when an alarm state is reached and the Notifier action is executed, a NotifiableEvent containing the ActionContext will be generated. The ActionContext should have details of the subject, from which the Notifier can get the user's preferences. From the ActionContext of the NotifierAction, it is also possible to get the ServiceMonitor associated with the action based on EL expressions, and get details from the ServiceMonitor on what triggered the alert.

In accordance with an embodiment, an example NotifierAction can be:

```
@Service(name="notify")
public class NotifierAction extends AbstractAction {
@Inject
Notifier notifier;
@Override
public void execute(ActionContext context) {
String account = (String) context.getContextData( ).get("account");
String envName = (String) context.getContextData( ).get("envName");
String serviceName = (String) context.getContextData( ).get("serviceName");
notifier.notifyEvent(new
NotifiableEvent.Builder<String>( ).name(context.getActionName( ))
.accountName(account)
.serviceName(serviceName)
.environmentName(envName)
.data(context).build( ));
}}
```

Template Support for Email

In accordance with an embodiment, emails can be customized by specifying templates to control the content. Templates can be provided per account, for example by using a folder relative to the tenants folder which can specify the directory of the templates. The template can be an HTML file with CSS for images and headers. Templates can be added per tenant by the administrator.

Below is an example of how the CLI can be used to add template files. The template can control the images and headers, and the data can be presented by the message formatters. Just as tenant admins can support adding templates, there can similarly be support to add templates for padmin related commands. Before the messages are composed for email, the Notifier service can check if there is any template file provided, and if so use that:

cadmin/padmin load-notification-template—name<name>template-file

In accordance with an embodiment, if a user is a padmin and cadmin then the cadmin's template will be used. Only one type of template will be allowed per tenant, which the load-notification-template CLI can validate. In accordance with an embodiment, if any other template exists for the tenant, then it will overwrite it with the latest one specified. This command will list the notification templates for the user:

cadmin/padmin list-notification-templates for example:

| TEMPLATE_NAME | DATE_CREATED |
|---|---|
| acme | 20013-07-20-12:12:30 |

Notification Listeners and Callbacks

In accordance with an embodiment, Notification Listeners can be added to listen for specific events. For example, an EM Cloud Control team may like to be notified by a REST Endpoint when a Service Lifecycle event occurs or alerts happen. In accordance with an embodiment, to provide support for this use case, NotificationListeners can be registered for specific events, and then the events can be published to the subscribers. Example implementations of the subscriber can be a REST endpoint, or a JMS queue. For example, in the case of EM Cloud Control, a REST endpoint can be deployed on the server where the EM Cloud Control resides. The Notifier will then send event-related information to the REST endpoint:

In accordance with an embodiment, this will configure an event listener specified by the name which will listen for events at the url specified by URL.

padmin configure-event-listener—url URL [name]

In accordance with an embodiment, this will delete the event listener specified by the name:

padmin delete-event-listener name

User Messaging Service Process

Figure 14:
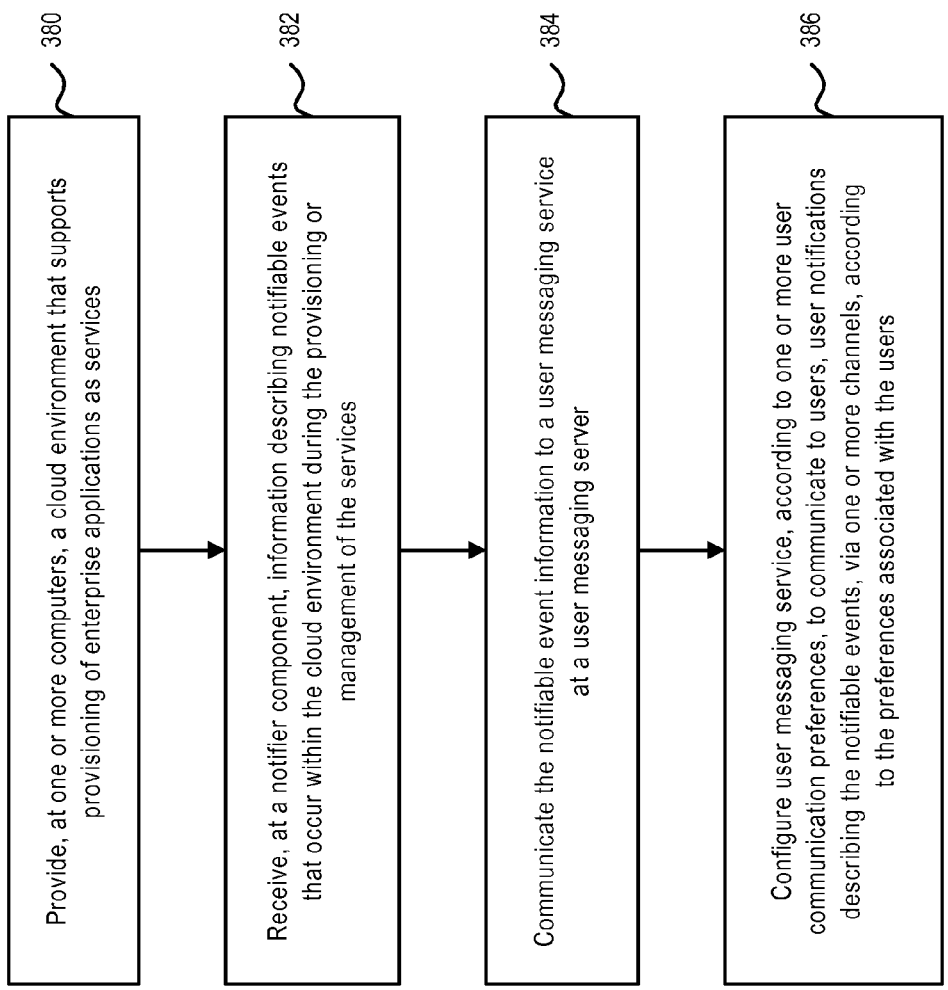
FIG. 14 is a flowchart of a method of providing a user messaging service, for use with a cloud environment, in accordance with an embodiment.

FIG. 14 is a flowchart of a method of providing a user messaging service, for use with a cloud environment, in accordance with an embodiment.

As shown in FIG. 14, at step 380, a cloud environment that supports provisioning of enterprise applications as services is provided at one or more computers.

At step 382, information is received, at a notifier component, describing notifiable events that occur within the cloud environment during the provisioning or management of the services.

At step 384, the notifiable event information is communicated to a user messaging service at a user messaging server.

At step 386, the user messaging service is configured, according to one or more user communication preferences, to communicate to users, user notifications describing the notifiable events, via one or more channels, according to the preferences associated with the users.

Job Manager

In accordance with an embodiment, the system can include a job manager (Job Manager) for use with a cloud environment. For example, a cloud account user may use commands to perform operations within the cloud environment, such as the provisioning of a particular service. In accordance with an embodiment, commands can be associated with jobs. A job manager can then perform housekeeping tasks, such as purging jobs according to a retention policy, and performing any necessary cleanup. In accordance with an embodiment, command line and other interfaces can be provided that enable a user to list jobs started by users, and to perform security checks to ensure tasks are authorized.

In accordance with an embodiment, a job can be considered an entity that refers to an administration command. For example, any administration command (administrative command) annotated with @ManagedJob or @Progress annotation, or started by the client using—detach option, can be associated with a job, which is then managed by the job manager.

In accordance with an embodiment, the job manager's responsibilities include generating ids for the jobs; cleaning up for jobs which are done; serving as a registry for jobs; prroviding security validation for which users are authorized to access already running commands; storing the results for a specific configurable period of time; providing APIs for persisting jobs; triggering who will take over orphan jobs in case the cluster shape changes; and providing a thread pool for executing commands.

Figure 15:
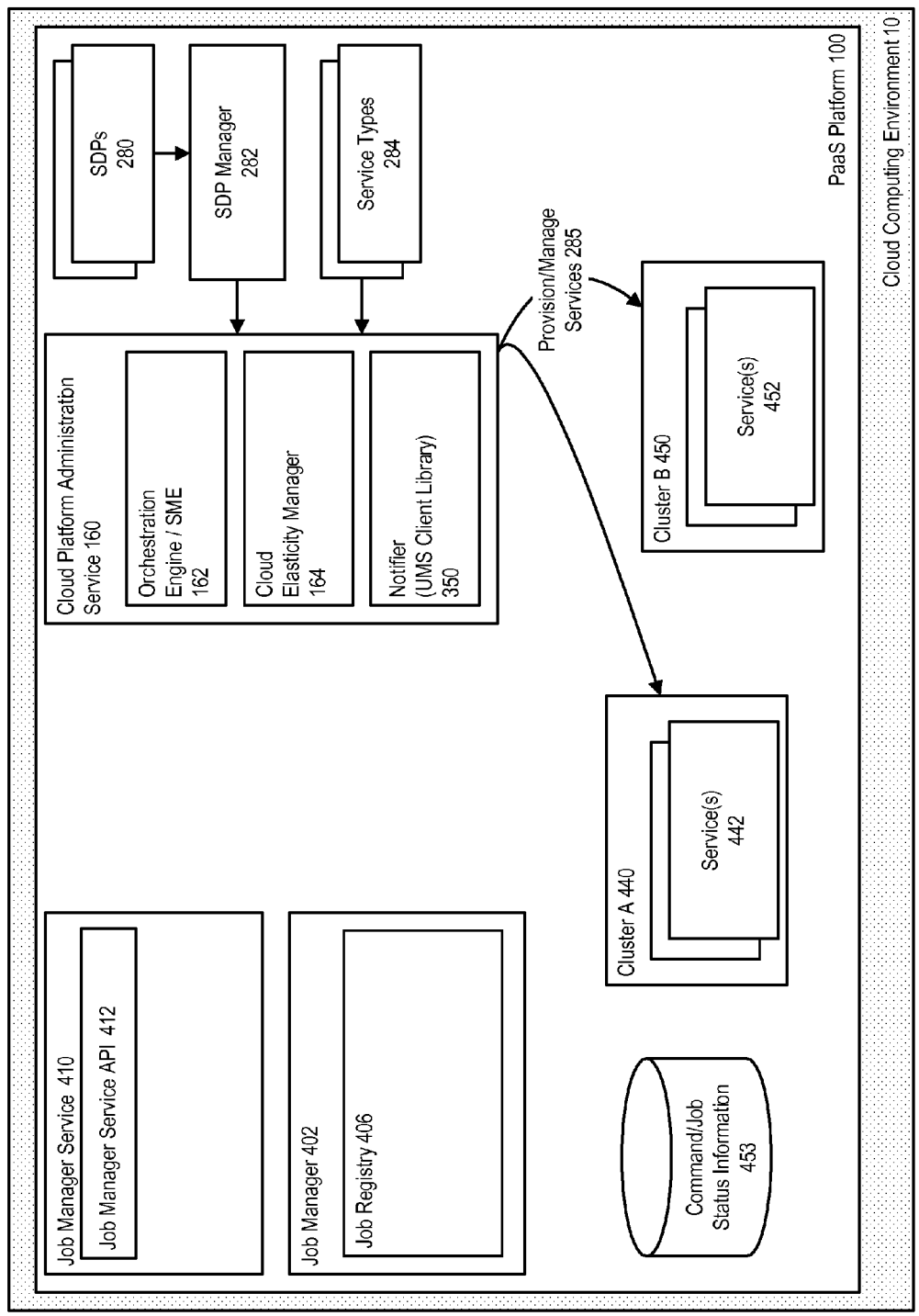
FIG. 15 illustrates a job manager, for use with a cloud environment, in accordance with an embodiment.

FIG. 15 illustrates a job manager, for use with a cloud environment, in accordance with an embodiment.

As shown in FIG. 15, in accordance with an embodiment, a job manager 402 can include a job registry 406. A job manager service 410, together with a job manager service API 412, provides access to the job manager.

In accordance with an embodiment, the job manager can be used to provision or manage services 442, 452 to a plurality of clusters within the cloud environment, including a first cluster A 440, and a second cluster B 450.

In accordance with an embodiment, administrative command or job status can be stored in a command/job status database 453, for use during processing of the jobs. For commands that take longer to execute, the system must store information related to progress status, and results. Additionally, a retention policy can be employed to save the results after the command is executed so that they can be retrieved later. For example, a housekeeping task can purge the jobs according to the retention policy, for example using a policy that is time based so in specified intervals the purging tasks will operate in to take care of the cleanup.

CLIs can also be provide to list the jobs started by a user, and perform security checks to ensure who is authorized for the various tasks.

Figure 16:
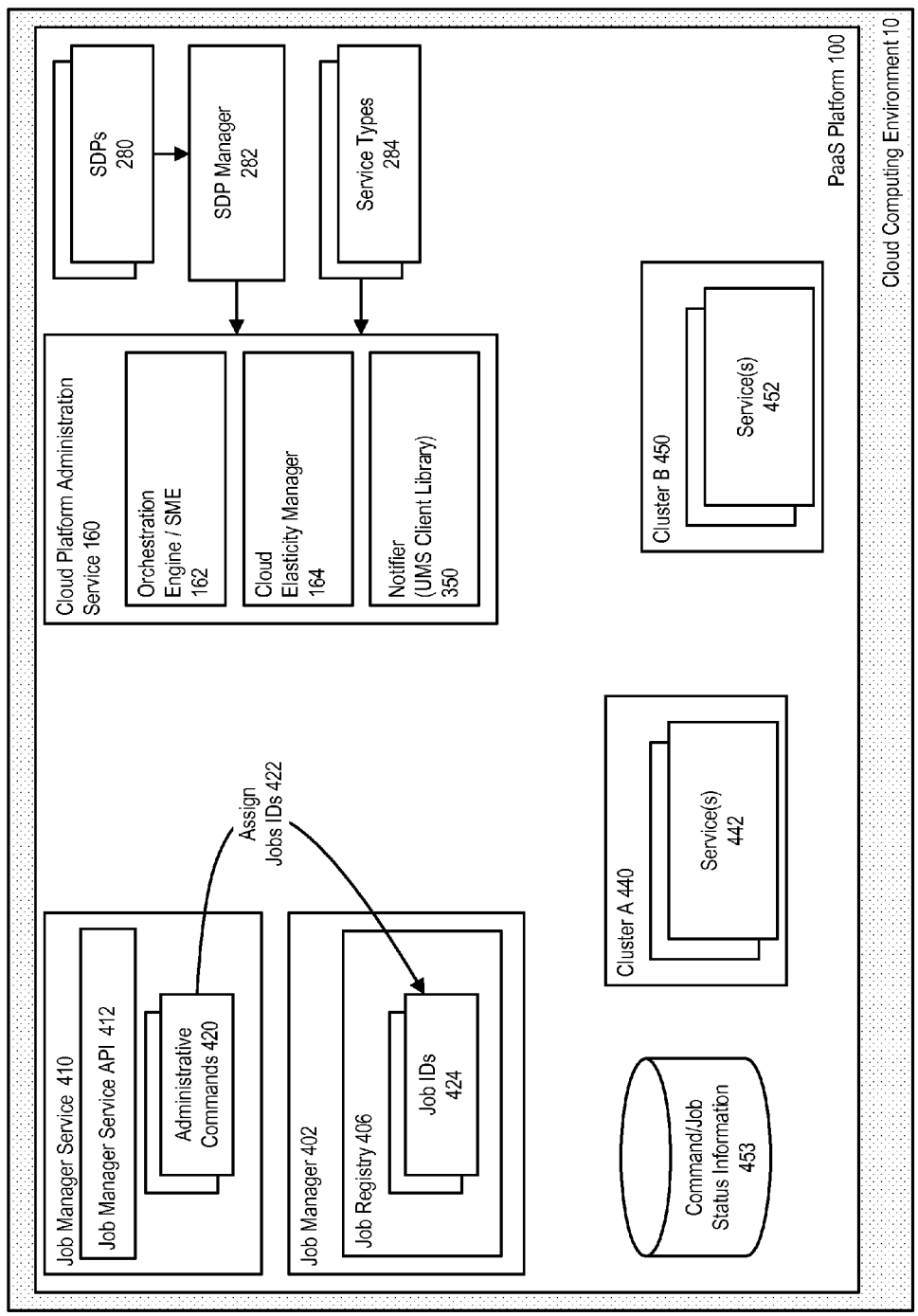
FIG. 16 further illustrates the use of a job manager with a cloud computing environment, in accordance with an embodiment.

FIG. 16 further illustrates the use of a job manager with a cloud environment, in accordance with an embodiment.

As shown in FIG. 16, in accordance with an embodiment, when an administrative command 420 is received at the job manager service, the service can assign 422 job ids 424 to those administrative commands or related tasks.

Figure 17:
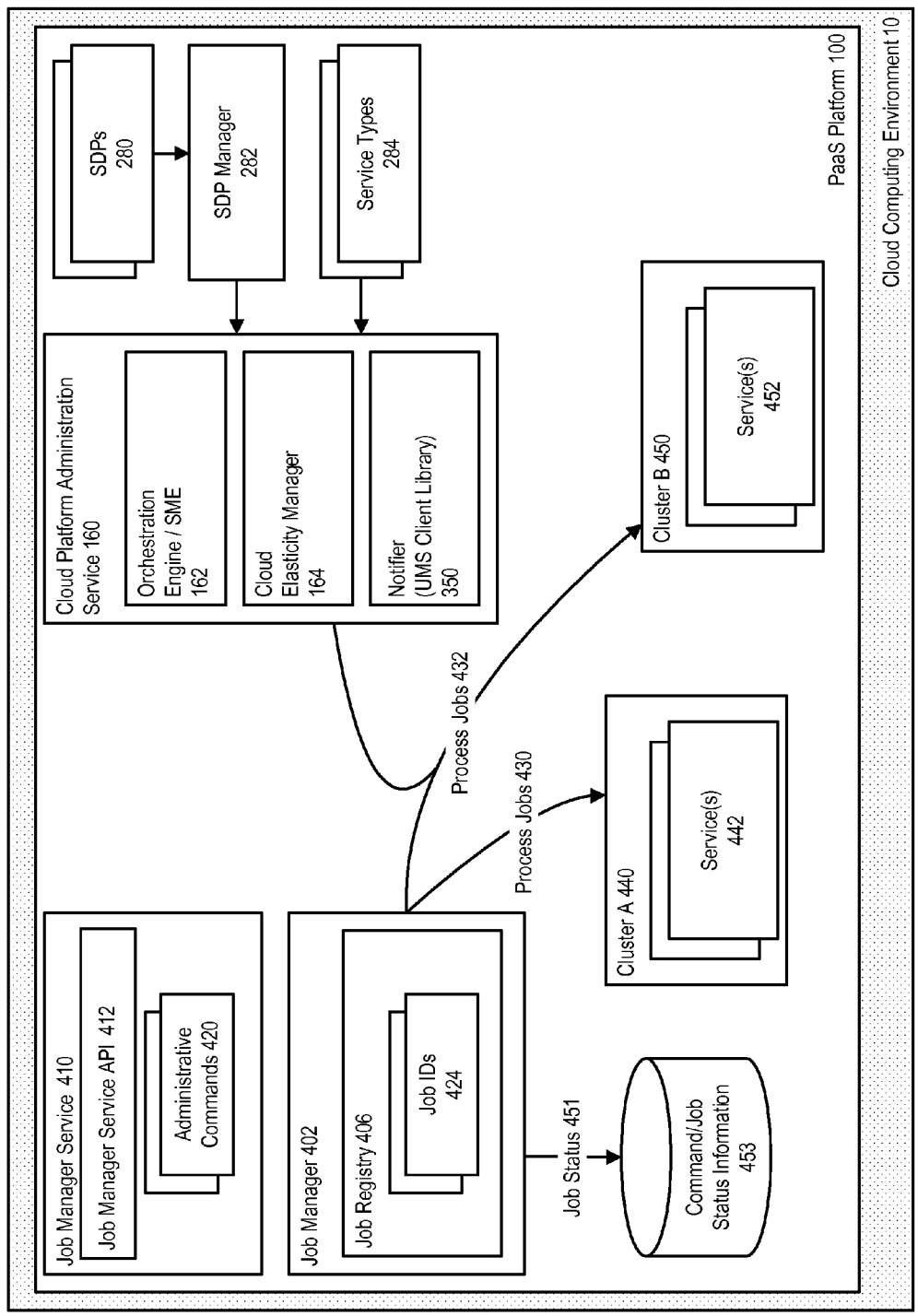
FIG. 17 further illustrates the use of a job manager with a cloud environment, in accordance with an embodiment.

FIG. 17 further illustrates the use of a job manager with a cloud environment, in accordance with an embodiment.

As shown in FIG. 17, in accordance with an embodiment, the job manager can control, in combination with the cloud platform administration service, the processing of, e.g., administrative commands, as jobs 430, 432 to provision the services at the clusters, or to otherwise perform actions on the platform or cloud environment.

In accordance with an embodiment, a job status information 451 can be stored in the command/job status database, for use during processing of the jobs, and to support additional functions, such as administrative command progress status, and detachable administrative commands.

Job Registry

In accordance with an embodiment, a job manager service (Job Manager Service) is responsible for generating unique, atomic, human readable ids for jobs which are executed. The job ids can be similar to unix process ids, for example ranging from 1 to a max value. When an id is requested, the Job Manager will check if the id is not in use, or else allocate the next one. When the max ids are reached, the Job Manager will start from 1 and find the next non-allocated id to issue.

In accordance with an embodiment, a housekeeping task can clear the jobs from the Job Manager when the retention limits time has elapsed, and free the allocated ids.

Job States

In accordance with an embodiment, a command can be in one of the states EXECUTING—the job is currently executing; or COMPLETED—the job has completed execution.

A completed job can also have an exit code, which will identify if the administrative or other command has succeeded, failed or succeeded with warnings, for example SUCCESS—the command is successfully completed; FAILURE—the command is completed and execution failed; or WARNING—the command is completed and there was a warning When a command is first started by the client, it is in an EXECUTING state. If the command has finished execution of the command then its state is changed to COMPLETED state, and the exit code is set to SUCCESS, FAILURE or WARNING. The time the command finished execution is stored for later housekeeping.

In accordance with an embodiment, a command action report can be persisted to a file. The Job Manager will purge the jobs, job ids, action reports after a defined period (retention_period) has elapsed from the time the command completed.

Job Manager Configuration

In accordance with an embodiment, CLIs can be defined for use with the job manager. The job manager can be configured as a configuration element at the domain level, for example using:

```
configuremanagedjobs
    --jobretentionperiod
    --cleanupinitialdelay
    --cleanuppollinterval
    --persist
    --inmemoryretentionperiod
``` wherein the example configuration parameters can include: job-retention-period—the time period to store the jobs (defaults to 24 hours); cleanup-initial-delay—after the server starts up this is the initial delay after which the cleanup service should start purging the job (defaults to 5 minutes); cleanup-poll-interval—the time interval after which the Job-CleanupService should poll for expired jobs (defaults to 20 minutes); persist—which controls if Job Manager contents should be persisted to disc (defaults to true); and in-memory-retention-period—the time period for which a completed job is retained in memory, the job will be persisted as soon as a job is finished (defaults to 1 hour).

In accordance with an embodiment, the time periods can be specified in Hh|Mm|Ss for hours, minutes, or seconds, for example:

```
asadmin configuremanagedjobs
    --jobretentionperiod=36h
    --cleanupinitialdelay=2m
    --cleanuppollinterval=10m
    --inmemoryretentionperiod=1h
```

Retention Strategy

In accordance with an embodiment, the Job Manager is configured to retain results once the command is finished for a specific duration of time. After the duration of time has elapsed for the job and associated results, the progress statuses should be removed by the Job Manager Service.

Security

In accordance with an embodiment, security can be configured that allows the administrator to control whether jobs are accessible by just the owner, or by other members of the owner's account, as well as the sys-admin. The default is to allow cloud account admins for the same account to view each others' jobs, and to allow system admins to view system admin jobs and account jobs.

Persistence

In accordance with an embodiment, the Job Manager can provide APIs to persist its contents to a file based storage, so that if the server restarts the jobs related information is not lost. Additionally if there are other jobs which were executed successfully before the server crashes, the system can retrieve information about those jobs.

CPAS Commands

In accordance with an embodiment, for every job for an account in a /cloud scope there can be an entry in a CAM store jobs.xml file. All the jobs for all users in that account are stored in the same file. All CPAS commands can take a 'user' parameter that represents the user executing the command. All of the commands operating on account specific data can also take a parameter that specifies which 'account' to target.

Most of the time, the 'user' will be the account admin for the target account, and may be only associated with one account. If the 'user' is associated with more than one account and 'account' is not explicitly specified, then the command will terminate with an error and can be executed explicitly specifying an 'account' parameter. Thus, for a given cadmin long running command, the system can find the account the user is associated with, and persist the job in that corresponding jobs.xml.

Asadmin Commands

In accordance with an embodiment, there can be one jobs.xml for the asadmin commands (in default scope) for all users in admin realm, with a location in path relative to domain1/config, and including information such as, for example, a Job Id Command name; time of start execution; time of end of execution; results (Messages from Action report); exit code (Success or failure); User; and Account.

In accordance with an embodiment, information can be removed from memory for old jobs after a certain period once it is persisted.

It is likely that users will look for status update on recent jobs. For example, the system can choose to purge from memory, and to persist, if a job is old (default: more than 1 hour has passed since completion), and no one has requested for progress status in a while (default: more than 1 hour). This can be configured by in-memory-retention-period. When the server restarts, the Job Manager can populate this information from the account.xml files and jobs.xml file for cadmin and asadmin commands respectively.

```
<xsd:schema attributeFormDefault="unqualified" elementFormDefault="qualified"
    version="1.0" xmlns:xsd="http://www.w3.org/2001/XMLSchema">
    <xsd:element name="jobs" type="jobsType" />
    <xsd:complexType name="jobsType">
        <xsd:sequence>
            <xsd:element maxOccurs="unbounded" name="job" type="jobType" />
        </xsd:sequence>
    </xsd:complexType>
    <xsd:complexType name="jobType">
        <xsd:sequence>
            <xsd:element name="id" type="xsd:string" />
            <xsd:element name="name" type="xsd:string"/>
            <xsd:element name="timestartexecution"
                type="xsd:dateTime"/>
            <xsd:element name="timeendexecution"
                type="xsd:dateTime"/>
            <xsd:element name="exitcode"
                type="exitcodetype"/>
            <xsd:element name="subject" type="xsd:string"/>
            <xsd:element name="results" type="xsd:string"/>
        </xsd:sequence>
    </xsd:complexType>
    <xsd:simpleType name="exitcodetype">
        <xsd:enumeration value="SUCCESS"/>
        <xsd:enumeration value="FAILURE"/>
        <xsd:enumeration value="WARNING"/>
    </xsd:simpleType>
</xsd:schema>
```

Restart of Server

In accordance with an embodiment, the Job Manager can load the information from the jobs.xml files on demand at server restart.

Additional CLIs

In accordance with an embodiment, a list-jobs command can be an asadmin or cadmin command. In accordance with an embodiment, the following snippets below shows how the sample output will look like for cadmin command list-jobs:

```
cadmin listjobs -account john
JOB ID  COMMAND       STATE         EXIT CODE    TIME OF COMPLETION
1       createservice COMPLETED     SUCCESS      20120815 16:16:16 PDT
Command listjobs executed successfully.
```

The following snippet shows how the sample output will look like for asadmin command list-jobs:

```
asdmin listjobs
JOB ID  COMMAND        STATE         EXIT CODE    TIME OF COMPLETION
1       loadsdp        COMPLETED     SUCCESS      20120815 16:16:16 PDT
2       samplecommand  COMPLETED     FAILURE      20120815 18:26:30 PDT
Command listjobs executed successfully.
```

The following snippet shows how the sample output will look like for list-jobs with—terse:

```
asadmin listjobs -terse 1
JOB ID  COMMAND    STATE         EXIT CODE    TIME OF COMPLETION
1       loadsdp    COMPLETED     SUCCESS      20120815 16:16:16 PDT
```

In accordance with an embodiment, if both—terse and—long is specified together, then the system will use the long output which is the default for list-jobs. The following snippet shows how the sample output will look like for list-jobs with job id:

```
asadmin listjobs 1
JOB ID  COMMAND    STATE         EXIT CODE    TIME OF COMPLETION
1       loadsdp    COMPLETED     SUCCESS      20120815 16:16:16 PDT
Command listjobs executed successfully.
```

The following snippet shows how the sample output will look like for list-jobs with job id and—terse:

```
asadmin listjobs -terse 1
JOB ID  COMMAND    STATE         EXIT CODE    TIME OF COMPLETION
1       loadsdp    COMPLETED     SUCCESS      20120815 16:16:16 PDT
```

The following snippet shows how the sample output will look like for list-jobs with—echo:

```
asadmin -echo listjobs
asadmin -host --localhost port 4848 --user admin --interactive=true
   --echo=true --terse=false listjobs
JOB ID  COMMAND    STATE         EXIT CODE    TIME OF COMPLETION
123     loadsdp    COMPLETED     SUCCESS      20120815 16:16:16 PDT
Command listjobs executed successfully.
```

Progress Status Integration to AdminCommand Instance Class Role

In accordance with an embodiment, the Job Manager enables management of long running executed commands on a JVM instance.

For example, when a long running command is executed, an AdminCommandInstance context identifier can be registered, along with the job id, in the Job Manager. This id can be used in future to fetch command instance information, such as actual progress status or resulting payload, in the case that the command was finished and is still in a retention period.

Job Manager Process

Figure 18:
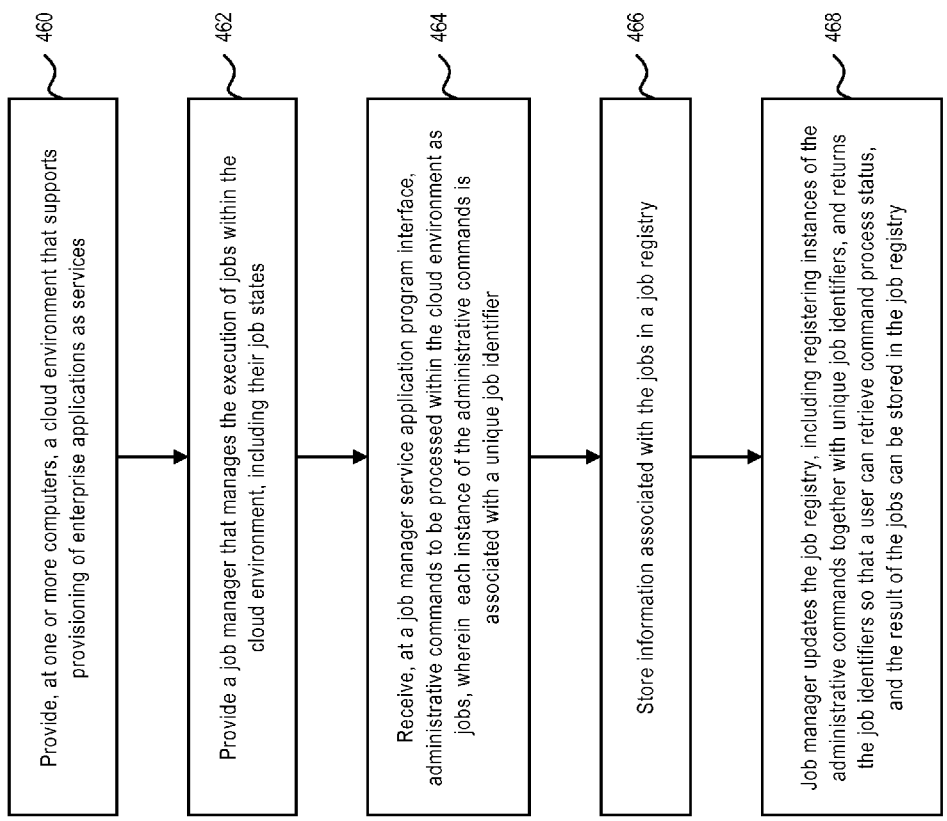
FIG. 18 is a flowchart of a method of providing a job manager, for use with a cloud environment, in accordance with an embodiment.

FIG. 18 is a flowchart of a method of providing a job manager, for use with a cloud environment, in accordance with an embodiment.

As shown in FIG. 18, at step 460, a cloud environment that supports provisioning of enterprise applications as services is provided at one or more computers.

At step 462, a job manager is provided that manages the execution of jobs within the cloud environment, including their job states.

At step 464, administrative commands are received, at a job manager service application program interface, to be processed within the cloud environment as jobs, wherein each instance of the administrative commands is associated with a unique job identifier.

At step 466, information associated with the jobs is stored in a job registry.

At step 468, the job manager updates the job registry, including registering instances of the administrative commands together with unique job identifiers, and returns the job identifiers so that a user can retrieve command process status, and the result of the jobs can be stored in the job registry.

Fault Tolerant Job Management

In accordance with an embodiment, the job manager can support fault tolerant job processing including associating the jobs with checkpoints, recognizing a failover command for the jobs, and associating the jobs with work units of the administrative commands, and storing a state for each job upon processing each work unit of the command.

For example, in accordance with an embodiment, commands can be associated with jobs. A job manager can support fault tolerant execution of jobs in a clustered manner, including transaction support, and support for checkpoints. In accordance with an embodiment, a mechanism can be provided especially for long-running commands, to deal with several kind of failures.

Failover supportcan be divided into three layers, wherein each layer provides some level of support or automation for failover process:

Checkpoints—which provides an API for store and retrieve command instance as a state;

FailoverAdminCommand—which provides an abstract command implementation which covers state store and load process and separates execute and revert business logic; and WorkUnitsAdminCommand—which provides an infrastructure for defining list of work units where each unit is represented by separated object and hold implementation of discrete part of command's logic. The infrastructure provides state storing after each work unit. In this case, the business logic of each command is fully separated from state store and load process.

Figure 19:
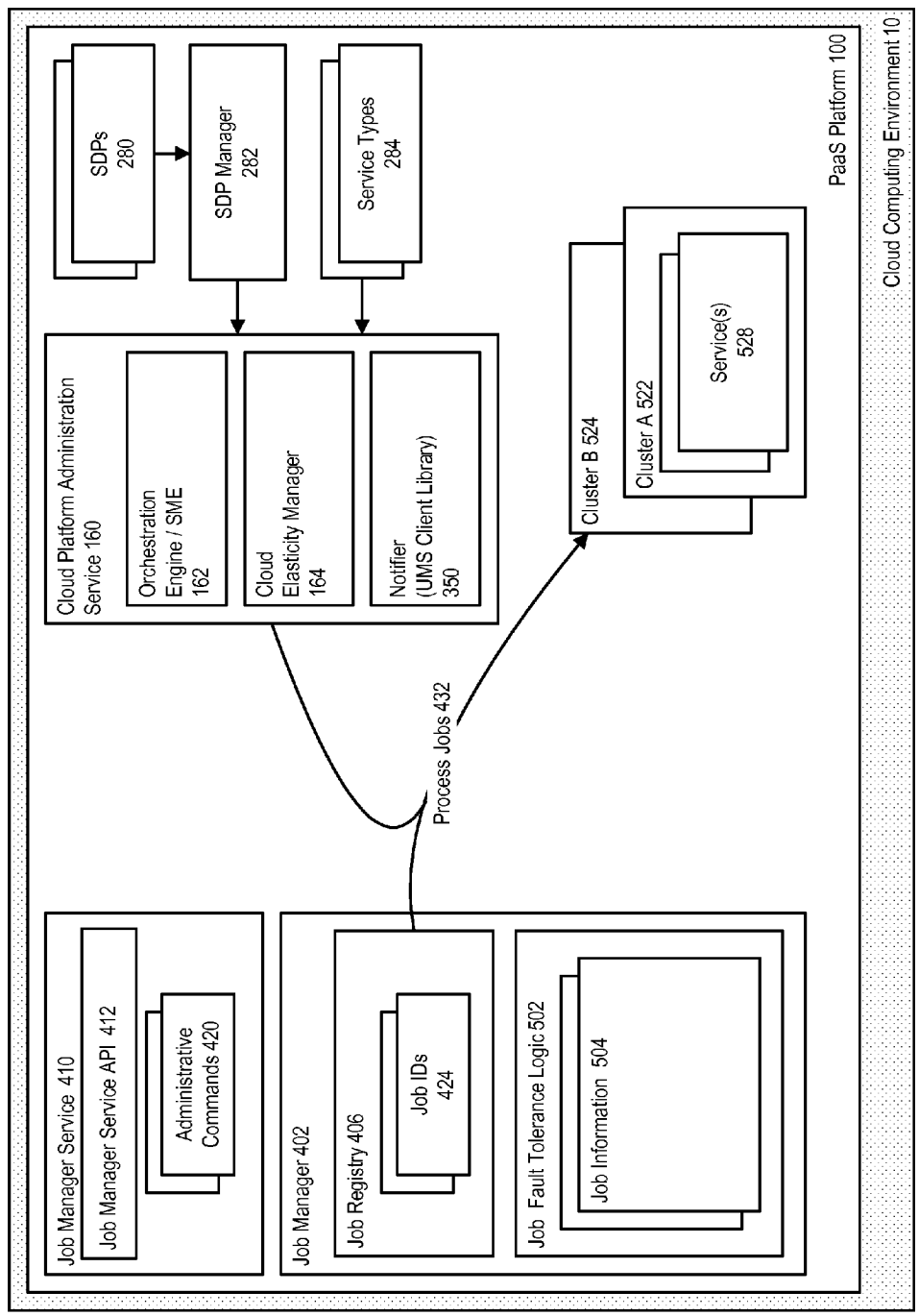
FIG. 19 illustrates a system which supports fault tolerant job management in a cloud environment, in accordance with an embodiment.

FIG. 19 illustrates a system which supports fault tolerant job management in a cloud environment, in accordance with an embodiment.

As shown in FIG. 19, in accordance with an embodiment, the job manager can include a job fault tolerance logic 502, which maintains job information 504, including information as jobs are being processed to provision services 528, at one or more clusters 522, 524, or to otherwise interact with the platform or cloud environment.

Figure 20:
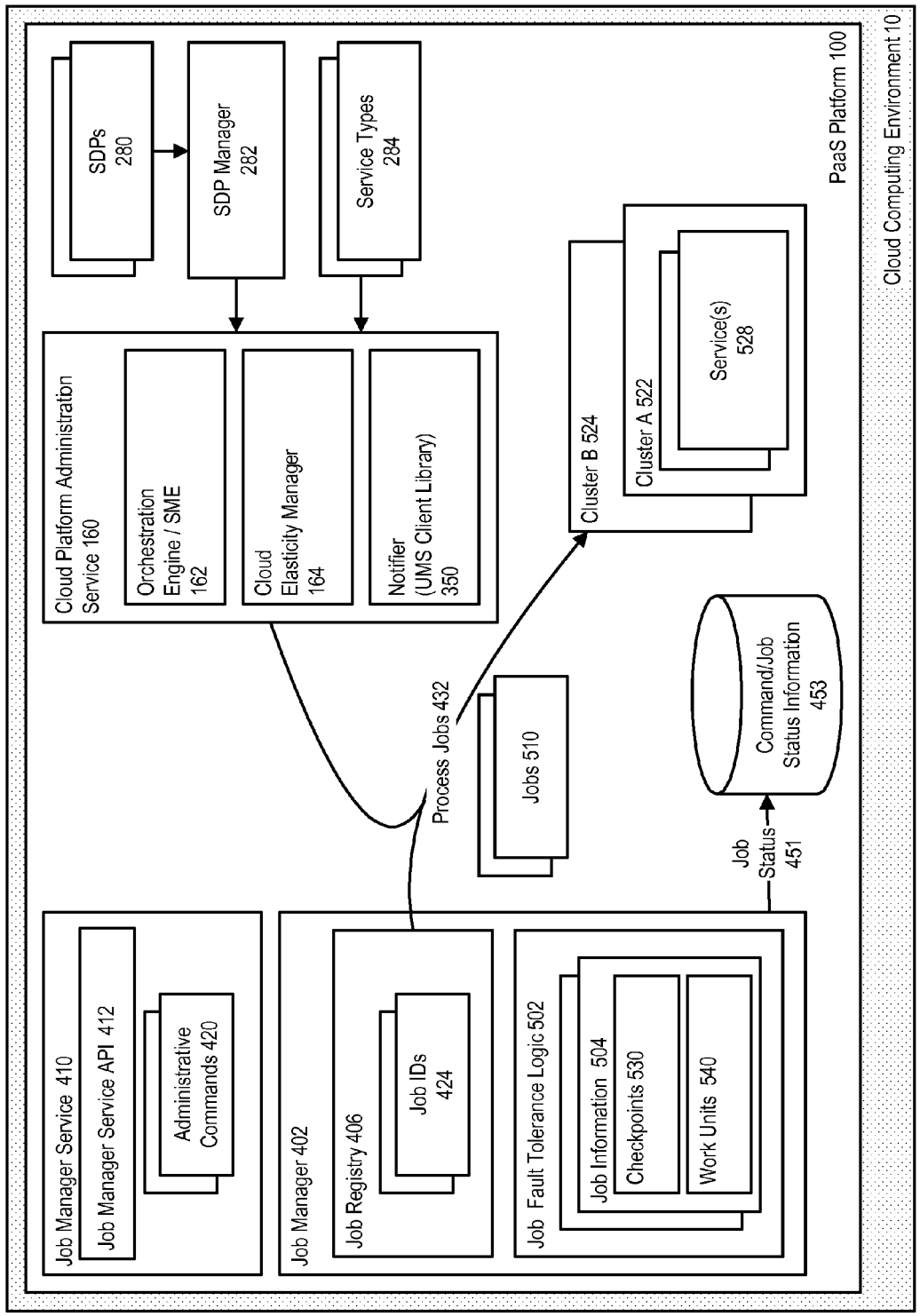
FIG. 20 further illustrates a system which supports fault tolerant job management in a cloud environment, in accordance with an embodiment.

FIG. 20 further illustrates a system which supports fault tolerant job management in a cloud environment, in accordance with an embodiment.

As shown in FIG. 20, in accordance with an embodiment, the information associated with the jobs 510 can include checkpoints 530 and work units 540. The job manager can write information, including job status, to the command/job status information database, for use in the event of a job failure.

Figure 21:
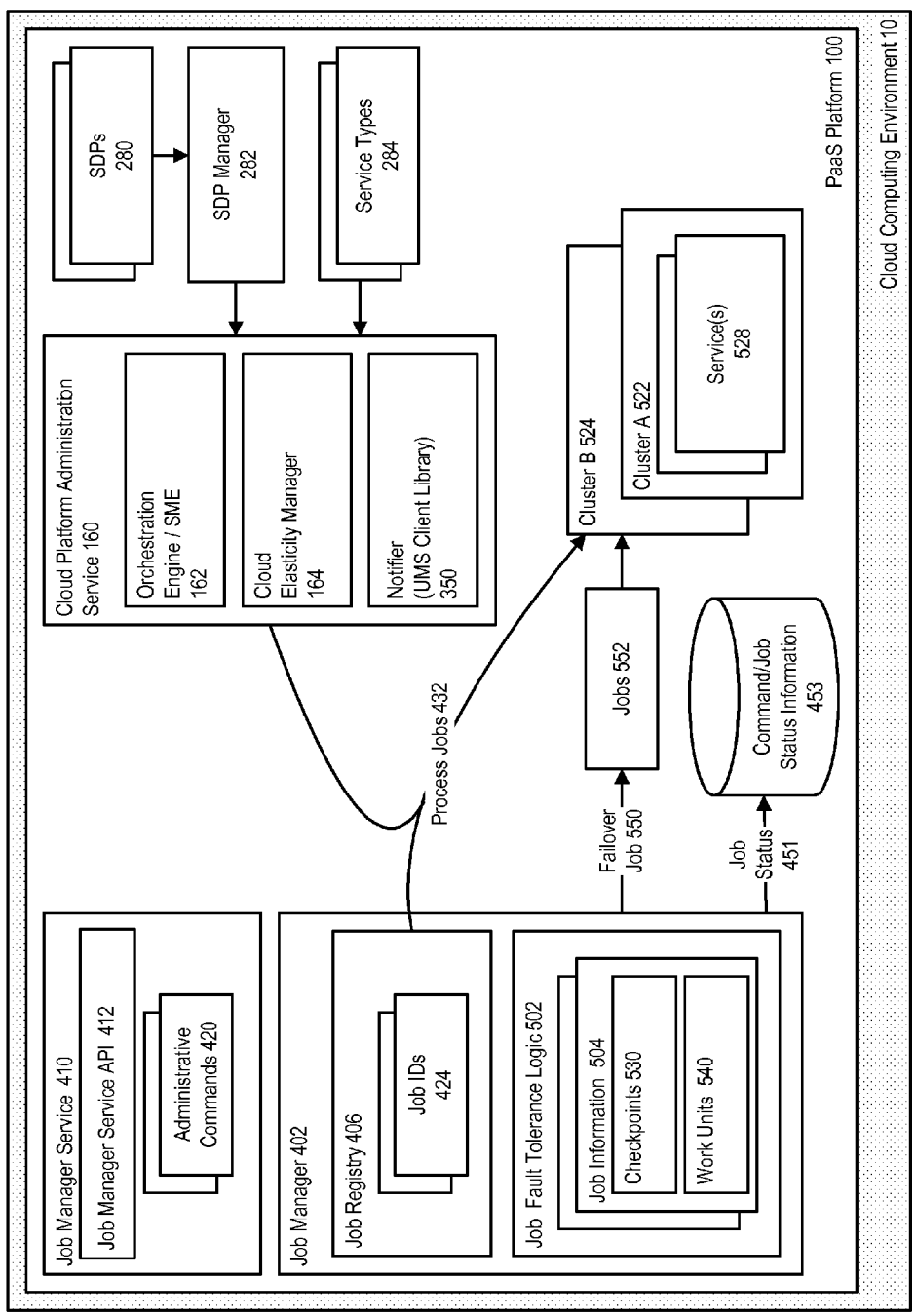
FIG. 21 further illustrates a system which supports fault tolerant job management in a cloud environment, in accordance with an embodiment.

FIG. 21 further illustrates a system which supports fault tolerant job management in a cloud environment, in accordance with an embodiment.

As shown in FIG. 21, in the event of a failure or failover of a particular job 550, the job manager can create a new job 552, using the previously-stored job information, including the checkpoints and work units.

In accordance with an embodiment, commands from all of the fault tolerance layers can use a variety of functionalities or services, such as:

User message—which sends message to the user through server sent events (SSE). This message will be immediately printed to the CLI user on the new line. If there is progress status support, it will continue on the next line. This message will be stored in a job record (JobRecord) and can be fetched using an attach command for detached commands;

Continue on startup service—which will try to execute all jobs with a stored checkpoint which were terminated by domain process termination. It covers issue with crashed process instance. Each command execution can switch on/off this functionality for each command instance; and Continue and revert commands—which provides a CLI user interface for not-running commands with stored checkpoint. Functionalities can be defined on a domain instance, rather than server instances, which makes it suitable in platforms and cloud environments such as CloudLogic environments which may not have server instances.

Checkpoint Layer (1st Layer)

In accordance with an embodiment, each checkpoint describes a saved Job with several attributes such a command instance or admin command context (AdminCommandContext). In accordance with an embodiment, the JobManagerService can be used for this functionality. A checkpoint file can be used for checkpoint data, to avoid read/write conflicts (lock waiting) on jobs file, including one file for each instance.

In accordance with an embodiment, to support clustered usage, checkpoint information can also be supported as an "object" or "record" in any suitable information system or shared data in cluster solution, including, e.g., a distributed cache or database. The Job Record must be stored when the first version of checkpoint is stored. This record is connected with necessary lifecycle functions, like cleaning after retention period.

In accordance with an embodiment, use of the Job and JobRecord can include a variety of job states, as required by a particular implementation. For example, in accordance with an embodiment, one state can represent the case where the command actually running, but has a stored checkpoint. Another state can represent the case where the command is finished, or actually failed, but can continue after some user activity. If a Job is in such a state, then its CHECKPOINT will not be deleted by admin framework at the end of activity; otherwise it will be deleted. Another state can represent the case where the command is actually reverting (asked for revert).

In accordance with an embodiment, a checkpoint is supported only for @PerLookup commands—otherwise the command will be considered as failed.

In accordance with an embodiment, the checkpoint can also store payload data, which can be large—it can take care to store only once per change of this data. The payload can be stored separately (in separated file) from other checkpoint data.

Workflow Example

1. User executes command on cli: asadmin some-command.
2. CLI knows from CommandModel that the command is @ManagedJob—Use SSE to execute.

3. CLI executes remote command on domain using SSE.

4. Command is @ManagedJob, so Job instance is created: Job.state==PREPARED.

5. CommandRunner executes command: Job.state==RUNNING.

6. Command periodically store checkpoint: Job.state==RUNNING-RETRYABLE.

7. Command finish—OK (or common FAIL): Job.state==COMPLETED.

8. Checkpoint data file is removed.

9. CLI receive state change message and prints ActionReport.

Command Detects Fixable Infrastructure Issue Example

1. User executes command on cli: asadmin some.

2. CLI knows from CommandModel that the command is @ManagedJob—Use SSE to execute.

3. CLI executes remote command on domain using SSE.

4. Command is @ManagedJob, so Job instance is created: Job.state==PREPARED.
5. CommandRunner executes command: Job.state==RUNNING.
6. Command periodically store checkpoint: Job.state==RUNNING-RETRYABLE.
7. Command discover fixable infrastructural issue.
8. Command insert description of the issue into ActionReport.
9. Command updates Job.state==FAILED-RETRYABLE.
10. CLI receive state change message and prints ActionReport followed by instruction how to continue or revert (drop checkpoint) this job: use "asadmin continue 123" to continue this job or "asadmin revert 123" to drop this job.

API Usage Example

```
@Service(name = "some")
@PerLookup
@ManagedJob
public class SomeCommand implements AdminCommand, Serializable {
    private boolean continueTag = false;
    private String somedata;
    @Inject
    private transient JobManager jobManager;
    @Override
    public void execute(AdminCommandContext context) {
        if (continueTag) {
            if (jobManager.get(context.getJobId( )).getState( ) ==
                AdminCommandState.State.REVERTING) {
                revert(context);
                return;
            }
            //It is continue do some skip
        } else {
            continueTag = true;
        }
        try {
            //...
            somedata = "SOMETHING";
            jobManager.storeCheckpoint(this);
            //...
        } catch (ConnectDBException ex) {
            context.getActionReport( ).setMessage(
                "Can not use mandatory DB connection. Try to restart DB
                and continue this command.");
            context.getActionReport( ).setActionExitCode(ActionReport.ExitCode.FAILURE
            );
            // This state will not be removed after job finish as FAILURE
            jobManager.storeFinalCheckpoint(this);
        }}
        private void revert(AdminCommandContext context) {
            //...
        }
}
```

FailoverAdminCommand Layer (2nd Layer)

In accordance with an embodiment, a2nd fault tolerance layer can be provided by an abstract class which implements the AdminCommand interface:

abstract execute(AdminCommandContext, boolean continueExecution) throws

NeedRevertException, CanBeFixedException, RetryException - Where continueExecution is true for re-executing.

abstract revert(AdminCommandContext)

In accordance with an embodiment, the class provides implemented methods protected final void store Checkpoint( ) provides support for command from command invocation; and provides support for "instance isolation". An implementation can choose if there must not be any saved checkpoint for other instances of the same command.

API Usage Example

```
@Service(name = "someother")
@PerLookup
public class SomeOtherCommand extends FailoverAdminCommand implements
Serializable {
    enum Step {
    FIRST, SECOND, THIRD;
    }
    private Step lastStep;
    private String firstData;
    @Override
    public void execute(AdminCommandContext context, boolean continueExec)
        throws NeedRevertException, CanBeFixedException, RetryException {
        if (continueExec) {
            // It is continue do some skip
        }
        try {
            //...
            // Command is responsible to store enough data in own fields
            // to be able to determine how to continue
            firstData = "SOMETHING";
            lastStep = Step.FIRST;
            storeCheckpoint( );
            //...
        } catch (ConnectDBException ex) {
            context.getActionReport( ).setMessage(
            "Can not use mandatory DB connection. Try to restart DB and
            continue
            this command.");
            throw new CanBeFixedException(ex);
        }}
    @Override
    public void revert(AdminCommandContext context) {
        //Revert logic
    }
}
```

```
@Override
    public void execute(AdminCommandContext context, boolean
continueExec) {
    //Choose sequence of command here base on dynamic algorithm
    }
```

In accordance with an embodiment, while the 3rd layer will support for chain of work units, if automated checkpointing and other features are found too restrictive, the 2nd layer can be used for custom work unit chain implementation, which helps organize the business logic of the command, but the developer can still choose variety of chain driving details:

```
public class WUAdminCommand extends FailoverAdminCommand
{
    public interface WorkUnit {
        public void execute( ) throws WorkUnitException;
        public void revert( );
    }
    Deque<WorkUnit> revertStack = new ArrayDeque<WorkUnit>(
);
    protected <T extends WorkUnit> T exec(T aWorkUnit) throws
WorkUnitException {
        revertStack.add(aWorkUnit);
        aWorkUnit.execute( );
        return aWorkUnit;
    }
```

```
@Override
    public void revert(AdminCommandContext context, boolean
continueExec) {
    //Rewert can be done as simple as is in this example or
reflecting
    some
        // inner logic of the command. Skipping of unrevertable work
units.
        // Retry some groups of work units. ...
        for (WorkUnit workUnit : revertStack) {
            workUnit.revert( );
        }}
    }
```

WorkUnitsAdminCommand (3rd Layer)

In accordance with an embodiment, a 3rd fault tolerance layer provides a list of classes implementing work units (WorkUnit), each of which executes one-by-one and stores checkpoint after each execution. This can be changed using an extension list which is also used to define command model (parameters) for CLI, a combination of all params in WorkUnits.

In accordance with an embodiment, WorkUnits can contains @Param annotated parameters, which can be injected. If any WorkUnit in list implements @ProgressStatus, then it will be supported by the whole command, and will be automatically implemented based on WorkUnit count and its progress. Both continue and revert execution will start from the last failed work unit.

API Usage Example—Simple Example

```
public class OneWorkUnit implements WorkUnit<ComplexCommand> {
    //...
}
    public class TwoWorkUnit implements WorkUnit<ComplexCommand> {
    @Param(optional = true, defaultValue = "value")
    private String some;
    public void execute(ComplexCommand sharedData, AdminCommandContext
context, boolean reexecuted) {
    //...
    sharedData.setSomethingUsable(usable);
}
    //...
}
@Service(name = "three")
@PerLookup
public class ThreeCommand extends FailoverAdminCommand implements
WorkUnit<ComplexCommand> {
//...
}
@Service(name = "complex")
@PerLookup
public class ComplexCommand extends WorkUnitsAdminCommand {
    private static final List<Class<? extends WorkUnit>> WORK_UNITS;
    static {
        List<Class<? extends WorkUnit>> wus = new ArrayList<Class<?
    Extends
        WorkUnit>>(3);
        wus.add(OneWorkUnit.class);
        wus.add(TwoWorkUnit.class);
        wus.add(ThreeCommand.class);
        WORK_UNITS = Collections.unmodifiableList(wus);
    }
    @Override
    protected List<Class<? extends WorkUnit>> getWorkUnits( ) {
        return WORK_UNITS;
    }
}
```

API Usage Example—Dynamic Example

```
public class OneWorkUnit implements WorkUnit<ComplexCommand> {
    //...
    public void execute(ComplexCommand sharedData, AdminCommandContext
context,
    boolean reexecuted) {
    //...
        sharedData.setNext(TwoWorkUnit.class);
    }
}
public class TwoWorkUnit implements WorkUnit<ComplexCommand> {
    @Param(optional = true, defaultValue = "value")
    private String some;
    public void execute(ComplexCommand sharedData, AdminCommandContext
context,
    boolean reexecuted) {
        //...
        if (something) {
        sharedData.setNext(ThreeCommand.class);
    } else {
        sharedData.setNext(null); //End of job
    }}
    //...
}
public class ThreeCommand implements WorkUnit<ComplexCommand> {
    //...
}
@Service(name = "complex")
@PerLookup
public class ComplexCommand extends WorkUnitsAdminCommand {
    //We will provide dynamic order of work units but list off all
    // alternatives is still provided to be used for command parameter model
    // generation for CLI work units can define parameters
    private static final List<Class<? extends FailoverAdminCommand>>
```

```
    WORK_UNITS;
        static {
        List<Class<? extends WorkUnit>> wus =
        new ArrayList<Class<? extends FailoverAdminCommand>>(3);
        wus.add(OneWorkUnit.class);
        wus.add(TwoWorkUnit.class);
        wus.add(ThreeCommand.class);
        WORK_UNITS = Collections.unmodifiableList(wus);
    }
    private Class<? extends WorkUnit> next = OneWorkUnit.class;
        void setNext(Class<? extends WorkUnit> next) {
        this.next = next;
        }
        @Override
        protected List<Class<? extends WorkUnit>> getWorkUnits( ) {
            return WORK_UNITS;
        }
        @Override
        protected Class<? extends WorkUnit> getNextWorkUnitClass(List<WorkUnit>
        finishedWorkUnits) {
            return next;
        }
    }
```

User Message

In accordance with an embodiment, a job-related user message can be a simple string which is printed to the CLI user terminal during command execution. A @ManagedJob can be stored in JobRecord and printed before Action Report message when attach is used.

Usage Example

```
class SomeOtherCommand extends FailoverAdminCommand {
    public void revert(AdminCommandContext context, State state) {
    //...
        sendMessage(strings.getString("someother.reverting"));
}}
class SomeCommand implement AdminCommand {
    public void execute(AdminCommandContext context) {
    //...
        context.getEventBroker( ).getUtils( ).sendMessage(strings.getString
        ("some.reverting"));
    }
}
```

Continue on Startup Service

In accordance with an embodiment, recovery of long running commands after server crashes can be supported, making it possible to switch on/off for server startup. This feature restarts only those commands which actually are running when a domain crashes. The feature can also respect job hierarchy, so that no commands executed from commands will be automatically re-executed. Execution will start after the server is up and running.

Workflow Example

1. User executes command on cli: asadmin some.
2. CLI knows from CommandModel that the command is @ManagedJob—Use SSE to execute.
3. CLI executes remote command on domain using SSE.
4. Command is @ManagedJob, so Job instance is created: Job.state==PREPARED.
5. CommandRunner executes command: Job.state==RUNNING.
6. Command periodically store checkpoint: Job.state==RUNNING-RETRYABLE.
7. Domain freeze and user decide to kill it.
8. CLI discovers that http connection drops before final state change message comes
9. CLI knows from previews state change message that job was in RUNNING-RETRYABLE state and inform user: _ Server connection is lost. If it is network issue then command probably continues in execution and you can check it using "asadmin attach 123" command. If domain is because domain is down your command will continue after domain will be back in operational state.
10. User first try "asadmin attach 123" but it shows that server is probably down.
11. User starts the server.
12. Server automatically continue in running command from the last checkpoint.
13. It freeze again—user must kill it.
14. User starts the server using switch to NOT continue in running jobs.
15. User lists jobs (asadmin list-jobs) and decide which one was source of the crash (if any).
16. User call rever on this job "asadmin rever 123". Or fix the reason (external system) and continue in that job "asadmin continue 123".

Continue and Revert Commands

In accordance with an embodiment, the system can support the use of continue and revert commands which "executes" job (command) from a last checkpoint.

In accordance with an embodiment, a revert command can be used just once. If it fails, then all checkpoint data of the command are removed.

Commands must implement a revert method to revert all changed entities into their original state. A return code on CLI and message can be similar to the attach command pattern. If a command is connected, then its return code is used as CLI return code. Messages from connected commands are printed first, while any message from continue/revert command is printed next.

Workflow Example

1. User decide to revert: asadmin revert 123.
2. Revert command is executed.
3. It loads data from checkpoint using JobManager.

4. Change Job state from CHECKPOINT-FAILD to CHECKPOINT-REVERT (revert is only for ONE try. If fail then fail).
5. Execute command.
6. Remove checkpoint data (file).
7. Return Action Report to the user continue is similar but can ends again in CHECKPOINT-FAILED state.

AdminCommandContext

In accordance with an embodiment, a string getJobId( ) can be added to AdminCommandContext. The value will be null for non-managed commands.

Job and JobManager

In accordance with an embodiment, job related entities and interfaces can include a New Job. State enumeration valuescan include RUNNING-RETRYABLE—command has saved checkpoint and running; FAILED-RETRYABLE—command failed but it is possible to re-execute it (or revert); and REVERTING—command is running in revert mode. Any checkpoint will be removed after any result.

In accordance with an embodiment, a command can change Job.state to CHECKPOINT-FAILED value before exits, which can cause a checkpoint to be left persisted. A Job.state can also be transferred to client using SSE, and the client can provide information how to re-execute or revert.

Job Hierarchy

In accordance with an embodiment, a Job hierarchy supports command to command invocation cases.

For example, when a command invokes other commands, it is possible to provide a parent jobld to CommandInvocation. The ChildJob lifecycle (retention period, . . . ) is fully driven by parent job; will not be on any list (attach command result, . . . ); and its checkpoint will not be directly re-executed by a server startup job or by a continue or revert command.

Checkpoint

In accordance with an embodiment, a checkpoint contains all mandatory data for command resurrection.

Payload

In accordance with an embodiment, a payload covers large data (files) in AdminCommandFramework. There can be two payload instances, for incoming and outgoing data, both of which have a few special behaviors, including containing data as a streams, or containing data as a file. The incoming payload is never changed by command logic, and the outgoing is changed only sporadically. Payloads can be stored separately from the checkpoint and updated only when is changed. In accordance with an embodiment, a zip format can be used for storing.

File Format

In accordance with an embodiment, each Job can store its payload in a separated file in the same directory with its job.xml file. For example, filename: <jobid>.checkpoint; filenames for payloads: <jobid>.inpayload and <jobid>.outpayload. The files can be removed as soon as Job record will be removed from the job.xml file.

Resurrection

In accordance with an embodiment, when a command is loaded from a stored state, it will be represented as a deserialized command instance.

FailoverAdminCommand

In accordance with an embodiment, a failoveradmincommand can be based on job hierarchy support. A getCommandInvocation( ) method provides a CommandInvocation which is ready for "sub-Job" execution, and will be executed as @ManagedJob. Continue(jobId) and revert(jobId) methods can execute a child job in relevant state with last checkpoint.

Command Instance Isolation

In accordance with an embodiment, a saved command instance can be executed when exist checkpoint for other "same" command. Command implementation can choose its isolation level, for example:

COMMAND_NAME: Do not execute current command instance if exists checkpoint for command of the same name COMMAND_PARAMETERS—Do not execute current command instance if exists checkpoint for command of the same name and with equals parmeters (ParameterMap)

NONE—Command will execute.

In case of a command isolation conflict, information can be writted to an Action Report as a FAILED Action Report message, and/or the user can be asked to continue or revert the conflicted job (jobId).

Workunits Support

In accordance with an embodiment, the command must be implemented as WorkUnitAdminCommand and provide list of WorkUnits, which can be used to create command logic.

In accordance with an embodiment, by default, this list is accepted as a chain and executed one by one. In accordance with an embodiment, before and after each execution a checkpoint is taken. The default revert is provided as a backward revert of each already executed work unit. If a command is re-executed, it starts from the last unfinished (or failed) work unit.

In accordance with an embodiment, a List of WorkUnits can be provided as a list of class. Instantiation is done by framework and @Params are injected. If WorkUnit is @Service, then HK2 is used to instantiate it.

In accordance with an embodiment, the List of WorkUnits is also used to define overal command model. A set of params are based on @Param declaration in WorkUnits.

In accordance with an embodiment, ProgressStatus is also driven by list of WorkUnits. If any work unit is annotated @ProgressStatus then whole command supports @ProgressStatus.

In accordance with an embodiment, by default each WorkUnit has weight 1 and can be also changed. If some of WorkUnits does not support progress status it is also compute with weight 1. Name of actual WorkUnit will be printed only if this name is part of @ProgressStatus annotation.

In accordance with an embodiment, an execute and revert WorkUnit method contains WorkUnitAdminCommand as a parameter. It can be used to get/set shared data based on a current command logic. Selecting of execution order can be customized using nextWorkUnitClass( ) method and its instantiation using nextWorkUnit( ) method. This also works for revert, and can be used for very complex workflow definition. Easy workflow customization can be done directly from WorkUnits.

In accordance with an embodiment, WorkUnits can be also implemented as specialized AdminCommands. This pattern can be used to provide fine grain tool for solving special situations for the CLI user.

CommandModelProvider

In accordance with an embodiment, a provider can be used to compile all models of work units. Parameters with same name are consider to be same; if it has a different type then a RuntimeException is thrown.

@ManagedJob

In accordance with an embodiment, this annotation will be applied to command also when command implements or extends @ManagedJob interface or class. FailoverAdmin- Commands will also be annotataed @ManagedJob. A Job instance with ID will be created and SSE will be used for its remote execution.

Utility Class for AdminCommandEventBroker

In accordance with an embodiment, this class can be used to cover common events used in AdminCommandEventBroker, for example user messages.

Continue and Revert Commands

In accordance with an embodiment, commands for continue and revert job with checkpoint can be provided.

Continue on Startup Service

In accordance with an embodiment, the job service re-executes commands with checkpoint which was running when server crashed. This will not block server startup state while server is probably operational during such period. Messages and Action Report result will be logged into the server.log file.

Public Interfaces

In accordance with an embodiment, different public interfaces can be provided, for example FailoverAdminCommand: Basic support class for potential failing commands; WorkUnitsAdminCommand: More complex support for potential failing commands; and Utility class in admin event broker for user messages.

Fault Tolerant Job Management Process

Figure 22:
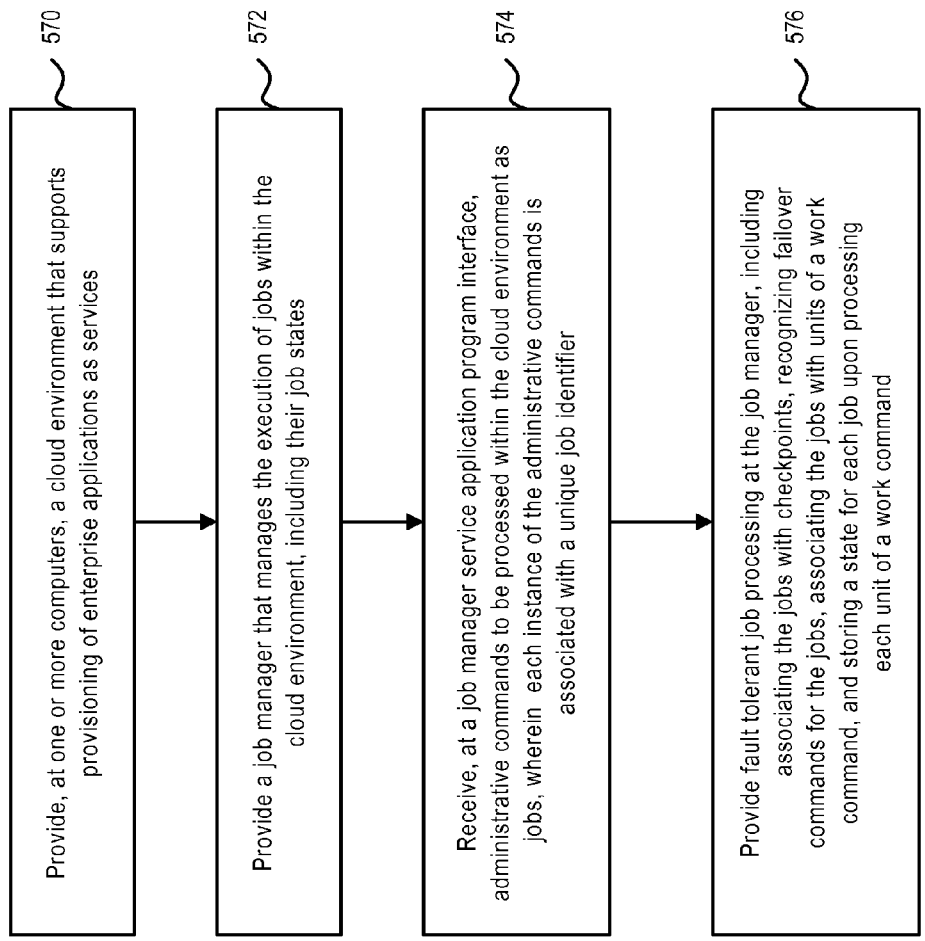
FIG. 22 is a flowchart of a method of supporting fault tolerant job management, in a cloud environment, in accordance with an embodiment.

FIG. 22 is a flowchart of a method of supporting fault tolerant job management, in a cloud environment, in accordance with an embodiment.

As shown in FIG. 22, at step 570, a cloud environment that supports provisioning of enterprise applications as services is provided at one or more computers.

At step 572, a job manager is provided that manages the execution of jobs within the cloud environment, including their job states.

At step 574, administrative commands are received, at a job manager service application program interface, to be processed within the cloud environment as jobs, wherein each instance of the administrative commands is associated with a unique job identifier.

At step 576, a fault tolerant job processing logic is provided at the job manager, including associating the jobs with checkpoints, recognizing failover commands for the jobs, associating the jobs with units of a work command, and storing a state for each job upon processing each unit of a work command.

Administrative Command Progress Status

In accordance with an embodiment, the system can include a means for providing administration command progress status in a cloud environment. In accordance with an enodiment, a command line interface allows a user to issue a command to be processed within the cloud environment as a job. During progress of a job associated with an annotated command, a status associated with the progress of the job is determined and provided to the command line interface. For example, the system can provide job progress status during these operations, to reassure the user that the operation is proceeding normally.

For example, in accordance with an embodiment, if the user has defined a large cluster it may take a significant amount of time to process admin task over the entire cluster, including, for example, starting the instances which are associated with the cluster.

Similarly, deploying a large application can take a significant amount of time. Providing on-going progress updates during these operations reassures the user that the operation is proceeding normally.

Figure 23:
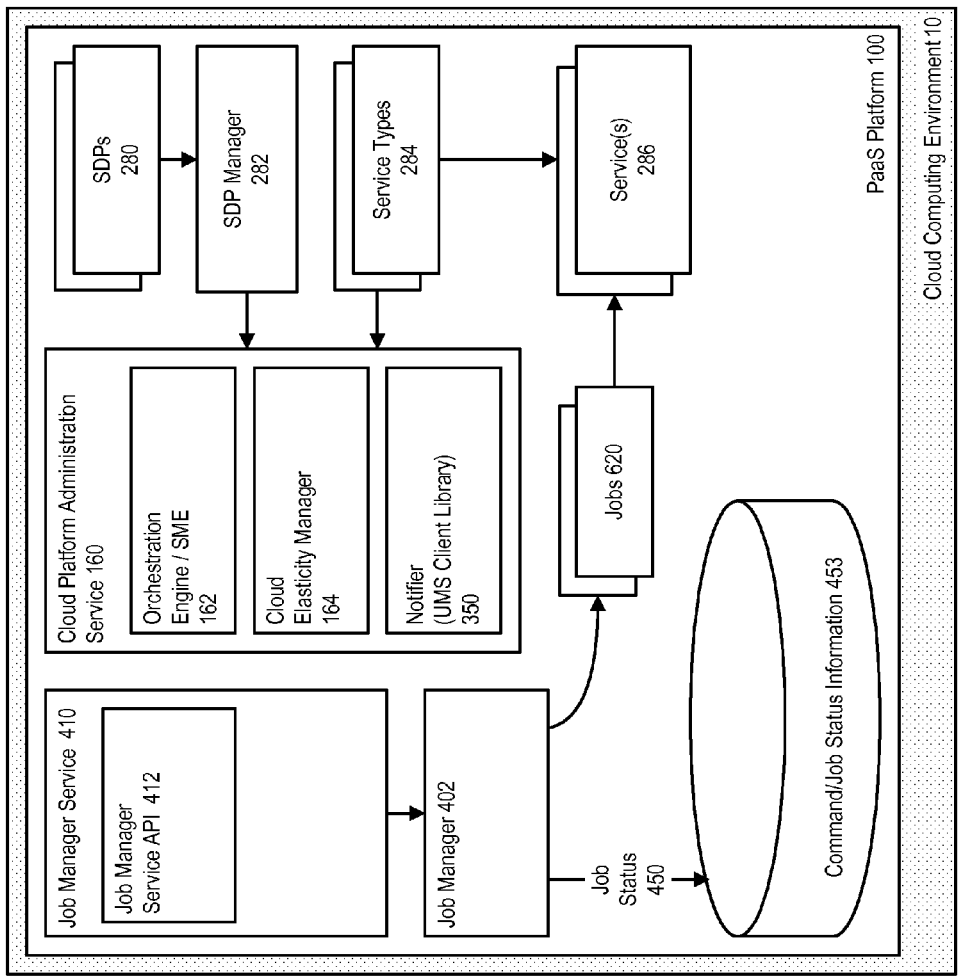
FIG. 23 illustrates a system for providing job progress status, in a cloud environment, in accordance with an embodiment.
Figure 23:
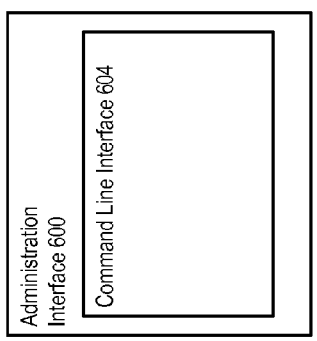
Figure 23:
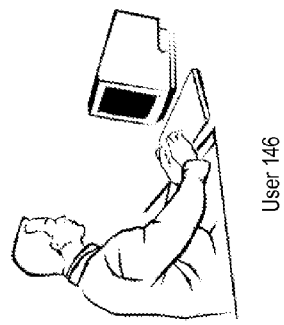

FIG. 23 illustrates a system for providing job progress status, in a cloud environment, in accordance with an embodiment.

As shown in FIG. 23, in accordance with an embodiment, an administration interface is provided 600, which supports the use of a command line interface 604. The administrative interface allows administrative commands to be processed as jobs 620 within the cloud environment.

In accordance with an embodiment, the progress status of an Admin Command is considered as its state, and its change (progress) is considered an event. This means that the progress API has an analogy with walking, wherein making progress is equivalent to doing steps.

Calculated percentage of the trip is possible when the system can determine or otherwise knows the amount of finished steps, and the amount of remaining steps. Any trip can be finished before reaching a planned destination, for example due to unforeseen incident. The usual trip is simple but there are also more complicated cases. Progress must be calculated for whole trip of, e.g., all "walkers", but the provided API for each walker must be simple to use.

In accordance with an embodiment, progress status is composite, providing simple event support for Admin Framework developers as well as for Admin Command developers.

In accordance with an embodiment, the progress status can use Server Send Events (SSE) technology, to transfer relevant events to a remote client.

Figure 24:
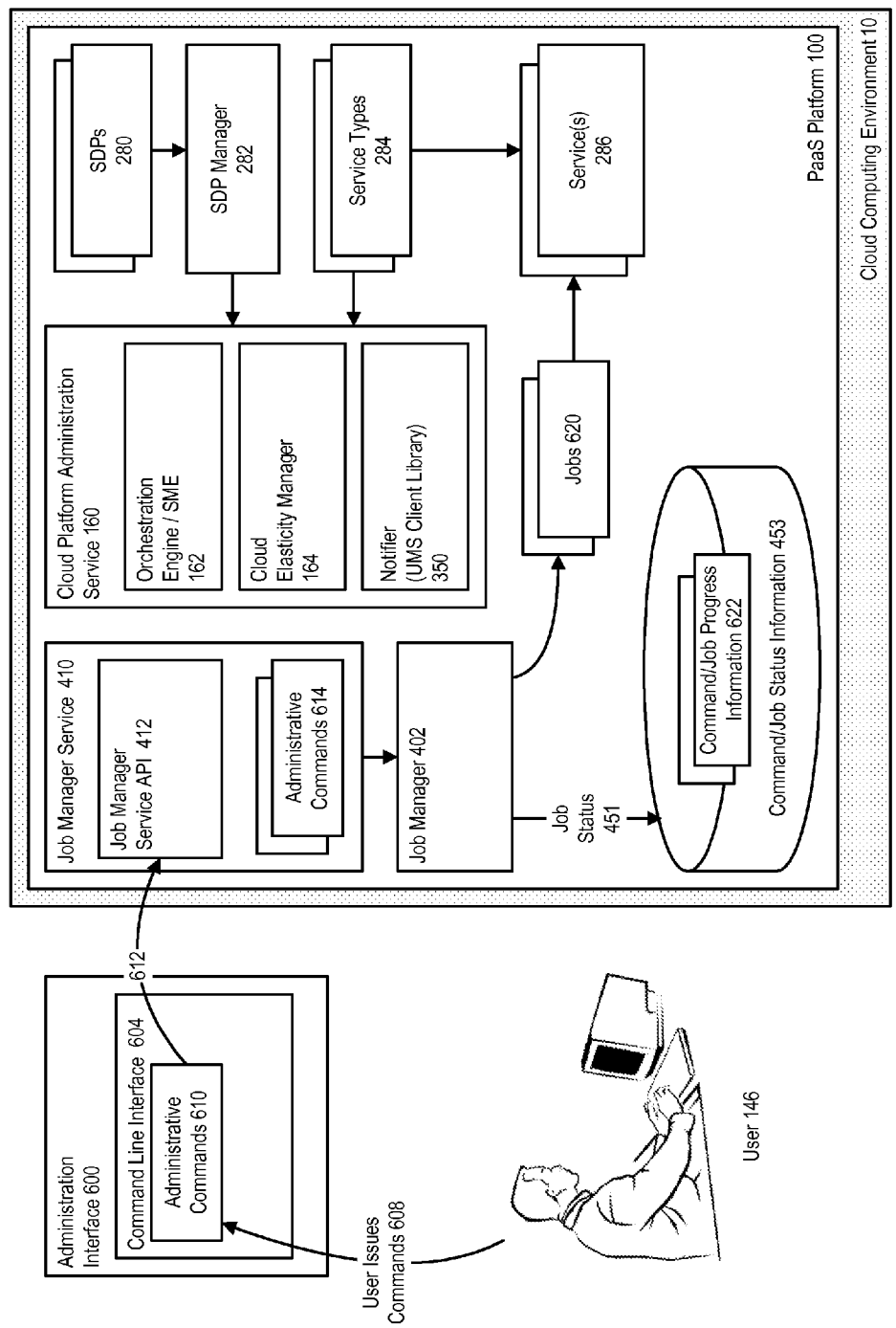
FIG. 24 further illustrates a system for providing job progress status, in a cloud environment, in accordance with an embodiment.

FIG. 24 further illustrates a system for providing job progress status, in a cloud environment, in accordance with an embodiment.

As shown in FIG. 24, a user can issue commands 608, including administrative commands 610, which are communicate by the administration interface 612 to the job manager service, to be executed as jobs 614, 620.

Information about the job status can be stored as command/job progress information 622 in the command/job status information database.

Figure 25:
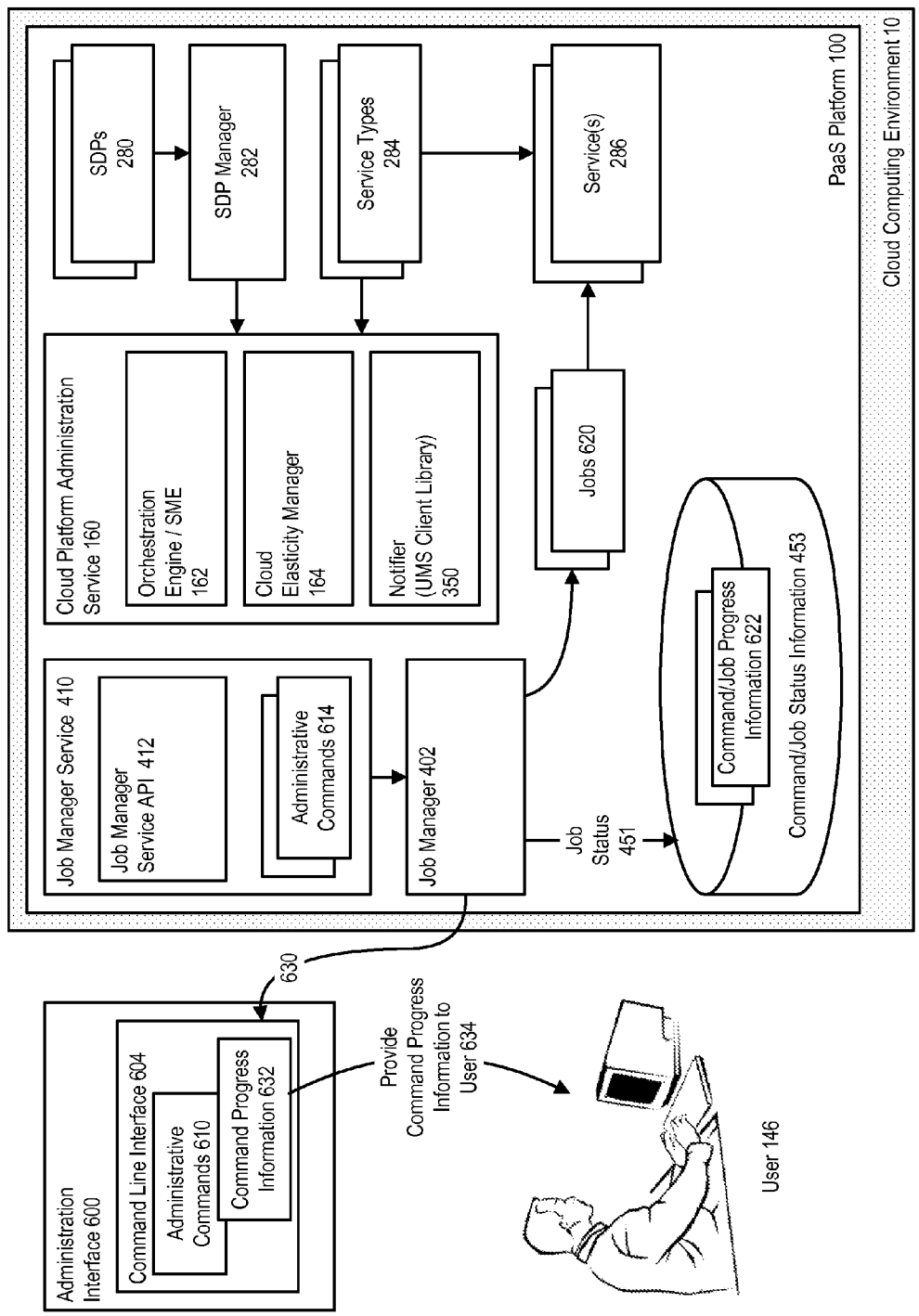
FIG. 25 further illustrates a system for providing job progress status, in a cloud environment, in accordance with an embodiment.

FIG. 25 further illustrates a system for providing job progress status, in a cloud environment, in accordance with an embodiment.

As shown in FIG. 25, as the commands are processed, the job manager can provide job status information 630, to the command line interface where it can be displayed as command progress information 632, or otherwise provided 634 to the user.

CLI User Perspective

In accordance with an embodiment, the user can use a CLI (asadmin or cadmin) in usual way. If the user does not use a—terse option, and if the executed command is designed for providing progress status, then progress status messages will be printed to the stdout until command will be finished. Then the system will display the last progress status message replaced by the command result.

In accordance with an embodiment, progress status messaged include a description of the percentage of finished work (if possible to calculate) or by increasing number of steps. This output can be followed by progress message if provided, for example: {{PORTION [[message_context_chain:] message]}}, wherein PORTION includes the number of steps or percentage (xxx %) of finished progress or number of steps of finished logic; a message_context_chain: a colon separated list of ProgressStatus components names defines source/context of the message; a message: and/or a last progress message.

EXAMPLE

```
% cadmin deploy foo.war
13% extracting war file contents.
```

In accordance with an embodiment, messages will replace each other using a carriage return (CR) on beginning, and spaces at the end of message if shorter then previous one. When a command is finished, the last message will be replaced with white spaces and then again replaced by the command result.

Admin Command Developer Perspective

In accordance with an embodiment, progress status API has two parts: @Progress annotation and instance of ProgressStatus class.

@Progress Annotation

In accordance with an embodiment, each AdminCommand instance which supports progress status must be annotated with @Progress annotation, which has two optional parameters:

totalStepCount: in which case progress is represented by amount of steps. As soon as the system knows an expected total steps count it can print progress in percentage format. The value can be also provided (or updated) using an API, but it is recommended to provide it in annotation if possible to ensure best user experience.

name: in which the default value is null. Name can be used when a progress message is printed to identify from where was message send. For example, a progress message can help a user to be oriented in what kind of command logic is currently done (parsing, loading, copying, . . . ). Messages are an optional part when progress status API is used.

ProgressStatus

In accordance with an embodiment, an instance of ProgressStatus API can be accessed from the CommandContext. If the AdminCommand is not annotated with @Progress annotation then a ProgressStatus API will throw exception when is used.

Usage Example 1

```
// The expected number of steps for this command is 8.
@Progress(totalStepCount=8)
public class ExampleCommand implements AdminCommand {
    public void execute(AdminCommandContext context) {
        ProgressStatus ps = context.getProgressStatus( );
        ActionReport report = context.getActionReport( );
        // Generate an initial progress messages but don't
        // advance the progress (e.g. stay at 0%)
        ps.progress("verifying war file.");
        // Do command work
        // Generate a new progress message and advance one step.
        ps.progress("extracting war file contents.", 1);
        // Do command work
        ps.progress("deploying application.", 1);
        // Do command work
        // Reuse the last progress message and advance the progress one
step.
        ps.progress(1);
        // Do command work
        // Generate a new progress message and advance two steps.
        ps.progress("verifying application.", 2);
        // Do command work
        ps.progress("updating domain configuration.", 2);
        // Do command work
        // Generate the final progress message. Advance the progress to the
        // totalStepCount (8) == 100%
        ps.complete("Application has been deployed.");
        report.setActionExitCode(ActionReport.ExitCode.SUCCESS);
    }
}
```

Usage Example 2

```
public void execute(AdminCommandContext context) {
    ProgressStatus ps = context.getProgressStatus( );
    // First somehow compute, how many "steps" take this command to its end.
    // For example based on file count or just some fixed count.
    // If we can not guess expected count of steps, we will not call this
method
    // and progress portion (percentage) will be computed as unknown
    // until finished or set the value.
    // When progress reach totalStepCount this progressStatus isCompleted.
    ps.setTotalStepCount(42);
    ...
    ps.progress(1); //One step
    ...
    for (File f : files) {
    ps.progress("Copy: " + f.getName( ), 1); //Step with status message.
    }
    ...
    ps.progress("Input verified", 3); //Go faster
    ...
    ps.progress("About to do some staff"); //Just new message no exact progress
    ProgressStatus subStatus = ps.createChild(
       "Some complex staff", // optional named child can be shown on user
info
       5 // covering progress how many our progress steps will be "walked"
       // when substatus will be completed
       );
    // it is usual status.
    // Called implementation can set its totalStepsCount and do progress
    doSomeComplexStaff(subStatus);
    // Now, we realize that our expected totalStepCount was to small and we
    // have to add some more. If we do it directly, it can be shown to
    // user as a antiprogress. For example from 82% to 78% it is strange.
    // But we have other possibility. We can use child progress as follows
    ps = ps.createChild(null /* anonymous child no
```

```
    visible name for user*/,
    ps.getRemainingStepCount /* unfinished steps */);
// And here it is new
count of steps without antiprogress
ps.setTotalStepCount(100);
}
```

ReST Client Developer Perspective

In accordance with an embodiment, progress status can be provided on a ReST interface only if AdminCommand implementation supports it, and the ReST client will open SSE connection. The client has to execute command on public ReST management API with header Accept: text/event-stream. A simmilar approach is used also on management private/command ReST interface.

SSE Events

In accordance with an embodiment, progress status can bre provided in the form of SSE Events, as well as result (ActionReport), and other possible custom events. Data of events are in JSON format. In accordance with an embodiment, important events can include: ProgressStatus/state—Current state of ProgressStatus instance. ProgressStatus/change—Event in progress status. Some value was changed. AdminCommandInstance/stateChanged—Admin framework change state of executed command. In last change to state "COMPLETED" it will contain a result in the form of ActionReport.

SSE Example

```
event: ProgressStatus/state
data: {"progress-status":{"name":"progress-simple","id":"1",
"total-step-count":10,"current-step-count":0,"complete":false}}
event: ProgressStatus/change
data: {"progress-statusevent":{"changed":["TOTAL_STEPS"],"progress-status":
{"name":"progress-simple","id":"1","totalstepcount":0,"current-step-count":
0,"complete":false}}}
event: ProgressStatus/change
data: {"progress-statusevent":{"changed":["STEPS"],"message":"Working on
main part...","progress-status":{"name":"progress-simple,"id":"1","total-step-
count":
10,"current-step-count":1,"complete":false}}}
event: AdminCommandInstance/stateChanged
data: {"state":"COMPLETED","id":"1","empty-payload":true,"action-report":
{"command":"progress-simple AdminCommand","exit code":"SUCCESS"}}
```

JAX-RS 2.0 and Java Clients

In accordance with an embodiment, if a JAX-RS 2.0 client is used than it is recommended to use Providers from Nucleus admin-util module for converting events into object representation. Other Java clients can use these providers directly from own code. A ProgressStatusClient located in a same module can be used to reconstruct ProgressStatus from these events.

ActionReport (Result of Command) in SSE Communication

In accordance with an embodiment, because SSE provides data in form of Events, an action report (result from the command) is provided also in event. It is part of Admin-CommandInstance/stateChanged event. This event generally inform about change of command state in perspective of admin framework. In accordance with an embodiment, attributes can include:

state—if the state is COMPLETED then ActionReport is provided.

id—ID of the command instance in JobManager. Can be used in combination with some commands to retrieve related data from job manager.

empty-payload—if the command result contains outbound payload (there are files to download) this attribute is set to false. Because it is not effective to transfer large data using SSE this attribute is provided. If there are some payload then client can retrieve it using_get-payload command in combination with ID. (Note that_get_payload command is ready for be used just ones per command execution.

action-report—the ActionReport Server will close SSE connection after COMPLETED event is send.

Java Client Developer Perspective

In accordance with an embodiment, Java clients can use RemoteRestAdminCommand to execute any command. This implementation automatically recognizes commands which supports event sending (including ProgressStatus), and uses SSE for the execution. A user of RemoteRestAdminCommand can register a listener in it before execution to listen on any SSE event.

Event-Based Integration with Admin Commands

In accordance with an embodiment, an API can be provided for local event based integration with command instance. It can be used for several use cases like Realize call back from admin command to admin command framework or to admin command invoker (any business logic which starts admin command); or to realize communication between concurrently running command instances on a same, for example: SSE Connection from remote client was closed/New observer (listener) attached/Another instance of same command executed.

Class Role

In accordance with an embodiment, an AdminCommandEventBroker provides a Central point of basic event integration, including providing an API for registering AdminCommandEventListers and for event firing. Each command instance has its own instance of AdminCommandEventBroker. An AdminCommandEventListener can be registered in AdminCommandEventBroker to listen for particular events. All events which names are valid within given regular expression are forwarded to the listener instance.

Events

In accordance with an embodiment, an event is a pair of name and data. Name can be a not-null String value which is used primary for event identification and listeners are connected to events by regular expression of this names. Data can be any Object or null.

In accordance with an embodiment, event names can be constructed hierarchically based on its semantics from most general to most specific sub-name. It can help to connect listener to as specific events as needed. More exactly it can help to create proper and shorter regular expression, for example something/start or something/end. Special event names with name prefixed by local/are not transferred to the client using SSE (see Server Sent Events (SSE) on remote command execution).

@ManagedJob

In accordance with an embodiment, any admin command annotated with @ManagedJob OR with annotation which is annotated with @ManagedJob OR started by the client using—detach option is a command which is managed by the Job Manager. Such commands are processed with several added features: the commands will have job ids generated; the commands will be registered with the JobManager and their lifecycle managed by the Job Manager; the results, payload for these commands can be persisted to disk; and the CLI will use SSE for remote execution.

Server Sent Events (SSE) on Remote Command Execution

In accordance with an embodiment, remote execution can support SSE events when the client uses a standard Accept: text/event-stream header. The command will be executed in thread from dedicated pool (managed by JobManager), as a managed command. The response will not be closed, but will be connected to AdminCommandEventBroker and all events with data will be possible to marshal. The response is closed by server side when command is finished and ActionReport is transferred. A Client can close it in any time without any effect to the running command instance.

Payload.Outbound and_Get-Payload Remote Command

In accordance with an embodiment, a command's result can contain files (Payload.Outbound). These files are not transferred using SSE but info of existing payload is part of AdminCommandState together with ActionReport and id. Client can ask for payload with follow-up request using_get-payload command. Hidden_get-payload command is based on Job Manager Service. The Payload.Outbound will not be saved on disk and will be removed after first download, which helps to keep memory footprint and performance impact as light as possible.

RemoteRestAdminCommand with Listeners

In accordance with an embodiment, a RemoteRestAdminCommand represents an API for remote command execution. A User can tag command to be executed using SSE (automatic for commands annotated with @ManagedJob). All events from SSE connection fires event here with original name and SseInboundEvent instance as data.

CLI and Managed Commands

In accordance with an embodiment, user executes command (example: asadmin deploy foo.ear)

The CLI checks CommandModel to determine if it is managed command—If not, nothing is changed and the command is executed as it does today.

The CLI calls ReST interface on the server with the Accept: text/event-stream header to execute command.

The CLI listen for command state events: this will contain id of command instance as soon as command is executed and ActionReport together with attribute if there is any Payload.Outbound (files) in result when ends.

The CLI forwards particular events to registered listeners.

On the server, the command is executed in a separate thread and SSE response is connected as a listener to the AdminCommandEventBroker instance.

The CLI will close connection after ActionReport is received. State event containing Action Report also contains attribute to determine if there is any Payload.Outbound (files to transfer) in result. If there is Payload.Outbound in result, CLI will try to download it using hidden_get-payload command.

Progress Status

In accordance with an embodiment, progress status can be represented by a state composite object. The components of this composite will represent branches of command replication, command sub-logic (any business logic with separate life cycle), commands executed from command and complementary commands.

A current progress represents portion of finished work, not necessarily a portion of time. Current progress is represented primarily by steps: if the total number of steps to complete the command is not declared by the command implementation then the progress status will be represented as an increasing number (of steps). If/when the command establishes the total step count the progress status can be represented to the user as a percentage.

Progress also hold message with current state. This message is an optional parameter within each progress change. Each progress status component can be also named. A source/context of each message can be identified to the user by a chain of these names. If admin command is finished but progress status is not completed it will be completed by admin framework. Command progress state changes are events in AdminCommandEventBroker and are transferred using SSE to client.

Local Commands

In accordance with an embodiment, local commands (CLICommand) execution is not affected by progress status solution. However CLICommands can use client ProgressStatus API to print own progress status in same format.

Compute Percentage

```
float computeCompletePortion ( ) {
  if (isComplete ( ) ) {
  return 1;
}
float realSteps = computeCompleteSteps ( ) ;
  if (realSteps < 0) {
  return 1;
  }
  if (realSteps == 0) {
  return 0;
  }
  if (totalStepCount < 0) {
  return 1;
    } else if (totalStepCount > 0) {
    return realSteps / ((float) totalStepCount) ;
    } else {
    return 1;
  }
}
float computeCompleteSteps ( ) {
  if (isComplete ( ) ) {
  return totalStepCount;
  }
```

-continued

```
    float realStepCount = currentStepCount;
    for (ChildProgressStatus child : children) {
        float                    childPortion              =
    child.progressStatus.computeCompletePortion ( ) ;
        if (childPortion < 0) {
        return 1;
        }
        realStepCount += ((float) child.getAllocatedSteps ( ) ) * childPortion;
    }
    return realStepCount;
}
```

Cluster Replication

In accordance with an embodiment, AdminCommands executed on DAS can be replicated to the cluster('s) servers. The source of replication can be either CommandRunner or AdminCommand implementation. In both cases the progress on remote servers will be replicated back to CommandProgress as child objects of the composite. Remote AdminCommands are executed from DAS to servers using RemoteAdminCommand which is also used from CLI to DAS. Client logic can be shared.

```
        10%: deploy: Some message
        40%: deploy: instance1: Some message
```

Supplementary Commands

In accordance with an embodiment, the platform or cloud environments admin framework has the feature to define Supplementary Commands. It is possible to define AdminCommand which will be executed before or after or after replication of another standard command. Any command logic can be enhanced by this method. Semantics of this enhanced method is that added logic is part of original command. Progress status will reflect it by using the following rules:

If supplementary command supports ProgressStatus but original command not then ProgressStatus NOT supported.

If original command supports ProgressStatus but supplementary command not then ProgressStatus is supported and portion of steps "dedicated" to supplementary command is 0.

If ProgressStatus is supported in original command and in some supplementary command, then its percentage form can be printed after all commands in the chain will define totalStepCount. However, it is recommended to define it directly in annotation of supplementary command.

All commands in chain (original and supplementary) will have their own standard ProgressStatus instance. Admin framework will connect them to correct composite.

CLI Output Example

```
        10%: prepareSomething:   Some message
        20%: something:          Other message
```

Figure 26:
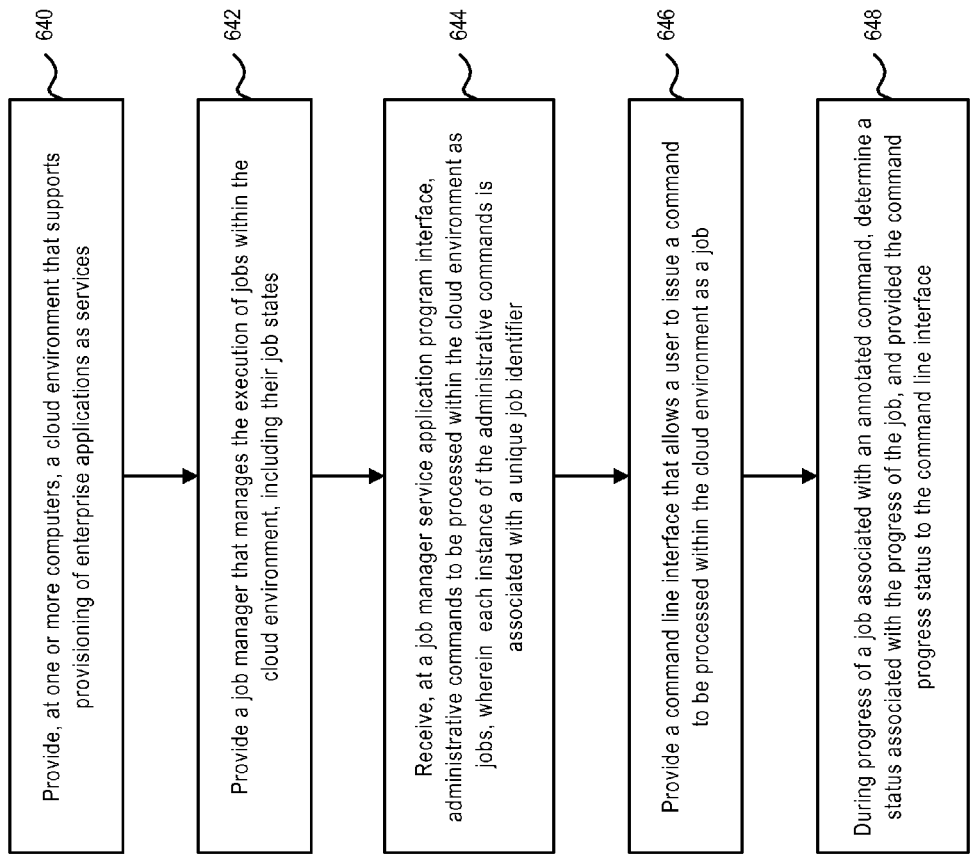
FIG. 26 is a flowchart of a method of providing job progress status, in a cloud environment, in accordance with an embodiment.

FIG. 26 is a flowchart of a method of providing job progress status, in a cloud environment, in accordance with an embodiment.

As shown in FIG. 26, at step 640, a cloud environment that supports provisioning of enterprise applications as services is provided at one or more computers.

At step 642, a job manager is provided that manages the execution of jobs within the cloud environment, including their job states.

At step 644, administrative commands are received, at a job manager service application program interface, to be processed within the cloud environment as jobs, wherein each instance of the administrative commands is associated with a unique job identifier.

At step 646, a command line interface is provided that allows a user to issue a command to be processed within the cloud environment as a job.

At step 648, during progress of a job associated with an annotated command, the system can determine a status associated with the progress of the job, and provide the command progress status to the command line interface.

Detachable Administration Commands

In accordance with an embodiment, the system can include a means for supporting detachable administration commands in a cloud environment. A user can issue commands and perform operations to manage the environment, which can be executed by a job manager. The system allows administration commands to be detachable, so that several independent parallel commands can be executed together from one console or one script, and so users can check result or wait for result of some task.

In accordance with an embodiment, CLI functionality can be provided for executing AdminCommands in detached mode. It means that CLI will exit immediately after command is executed on DAS and also provides mechanism how check status of executed command or its result.

For example, in accordance with an embodiment, some commands can take significant time to complete especially on large clusters. To address this, a detacahabe command feature can be used by users to execute several independent parallel commands together from one console or one script. Then users can check result or wait for result of some task. This provides a better user experience, and reduces overall time for a user's complicated tasks.

Figure 27:
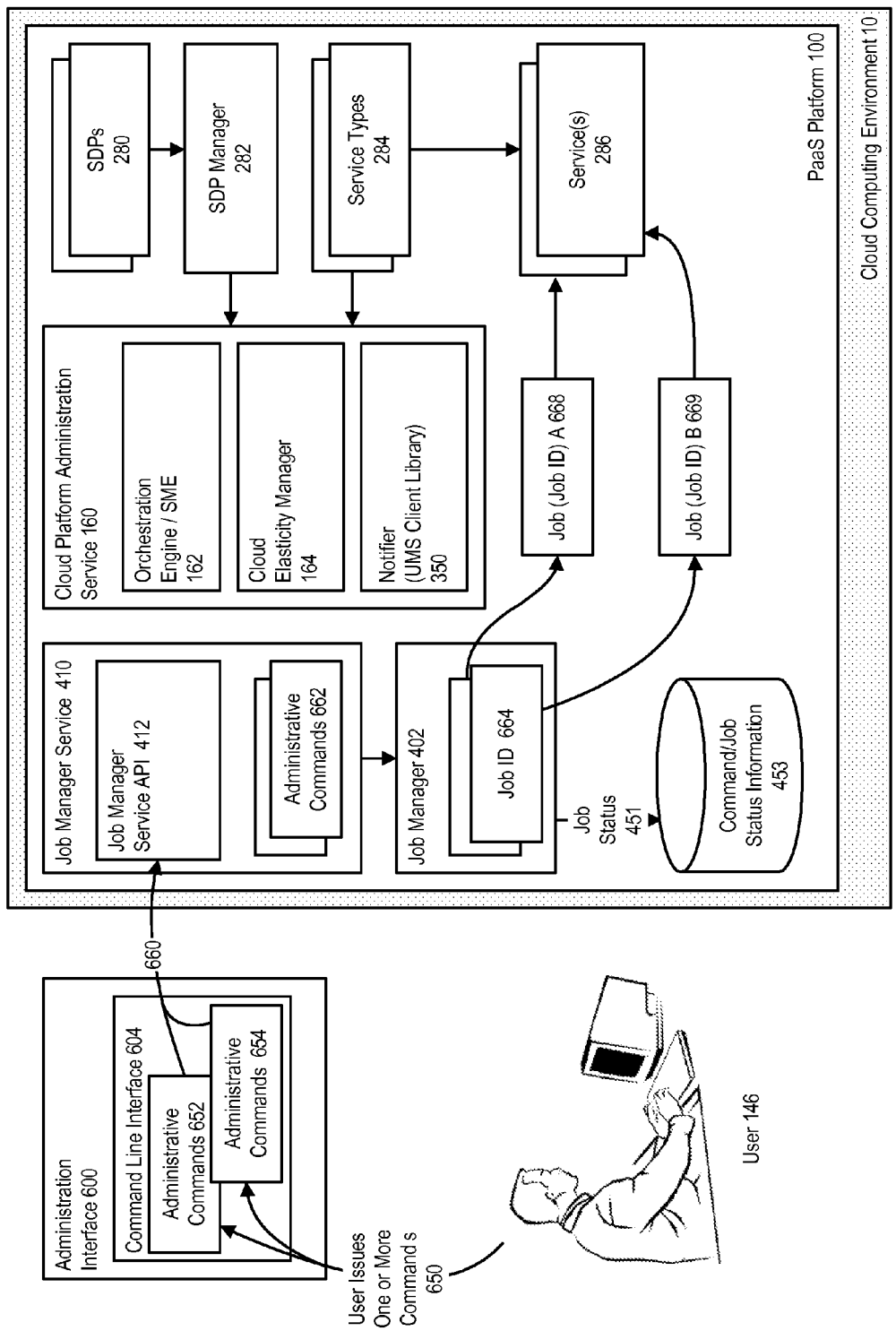
FIG. 27 illustrates a system which supports the use of detachable administration commands, in a cloud environment, in accordance with an embodiment.

FIG. 27 illustrates a system which supports the use of detachable administration commands, in a cloud environment, in accordance with an embodiment.

As shown in FIG. 27, in accordance with an embodiment, a user can use the administration interface and command line interface to issue 650 one or more administrative commands 652, 654, which are communicated 660 via the job manager service API to the job manager service to be processed as jobs 662.

In accordance with an embodiment, each administrative command can be associated with a job id 664, for example job id A 668 and job id B 669.

Figure 28:
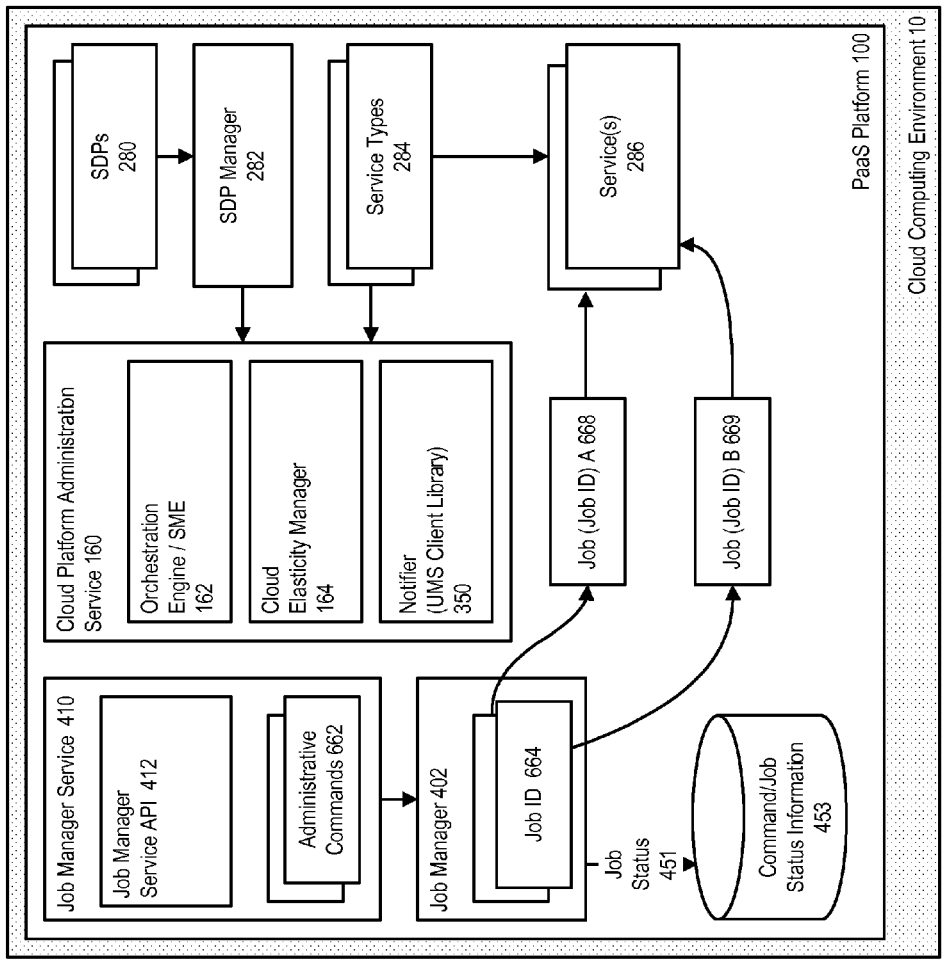
FIG. 28 further illustrates the use of detachable administration commands, in a cloud environment, in accordance with an embodiment.
Figure 28:
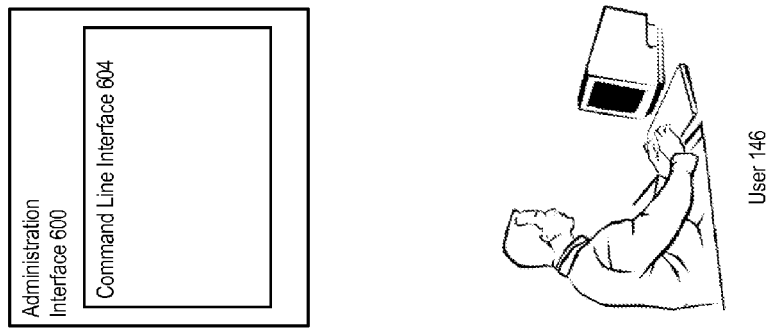

FIG. 28 further illustrates the use of detachable administration commands, in a cloud environment, in accordance with an embodiment.

As shown in FIG. 28, in accordance with an embodiment, the user can then detach their command line interface from the administrative command, which continue to run as jobs within the platform or cloud environment.

Figure 29:
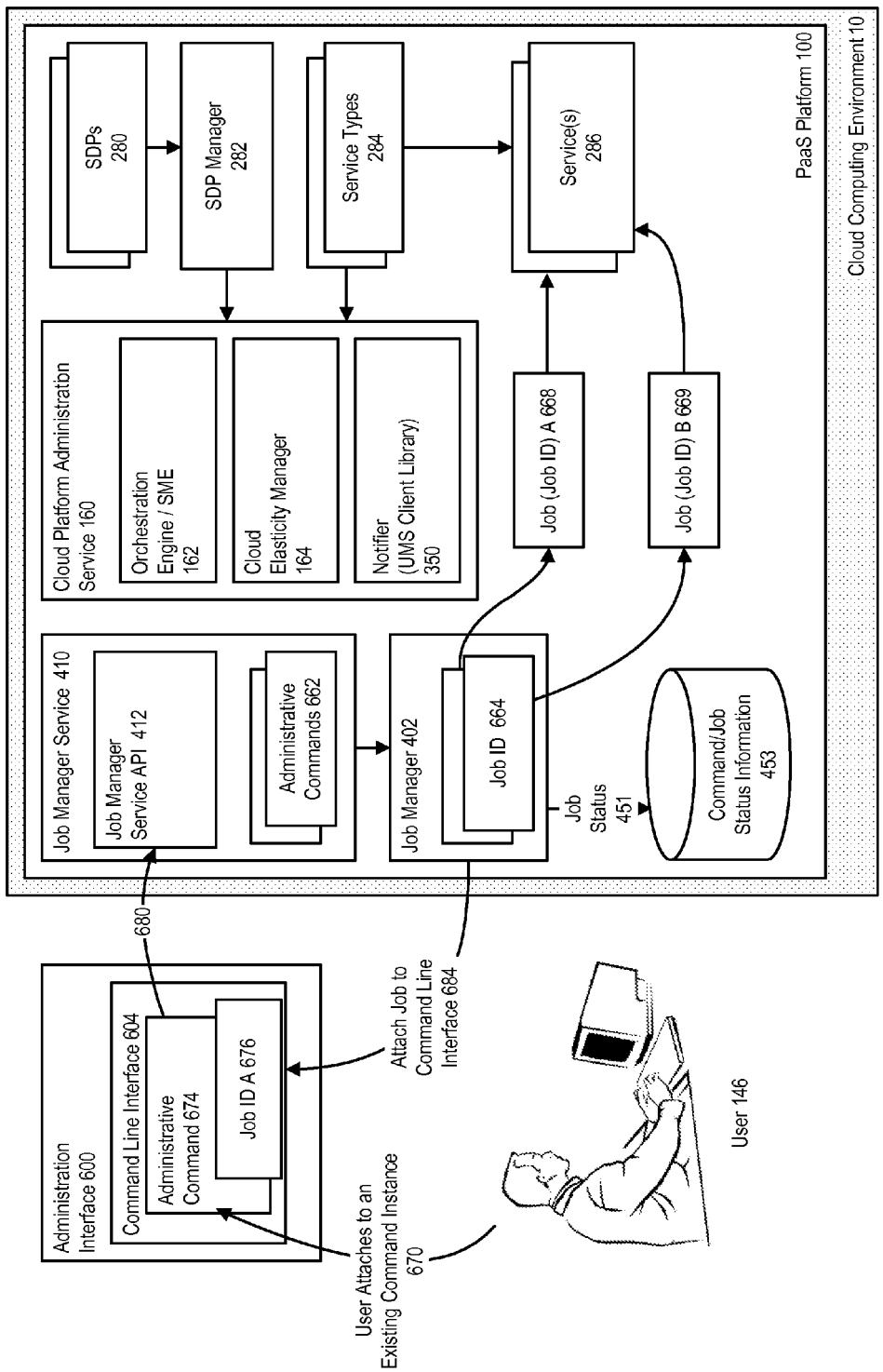
FIG. 29 further illustrates the use of detachable administration commands, in a cloud environment, in accordance with an embodiment.

FIG. 29 further illustrates the use of detachable administration commands, in a cloud environment, in accordance with an embodiment.

As shown in FIG. 29, in accordance with an embodiment, at a later point in time, a user can attach 670 their command line interface an existing command instance, and issue administrative command 674 by including a particular job id 676.

In accordance with an embodiment, the information is communicated 680 to the job manager, which locates the corresponding job, and attaches it 684 to the user's command line interface, for viewing or other use by the user.

In accordance with an embodiment, functionality is based on event integration support including Server Sent Events (SSE) support:

Any AdminCommand can be executed remotely using SSE.

Any AdminCommand which is executed using SSE is on server side processed as managed command.

Managed commands are registered in JobManager and can be identified by id.ID is part of state event which is transferred using SSE (as well as other events).

JobManager covers security—for example, only a user who executed a command can retrieve its AdminCommand Instance.

JobManager covers livecycle of AdminCommandInstance including ActionReport and result Payload, and defines its retention period.

Detach Mode Workflow from CLI

In accordance with an embodiment, the CLI allows a user to execute command in the background (example: ./asadmin.sh—detach deploy foo.ear).

CLI register event listener for state events in RemoteAdminCommand.

CLI tags command as managed in RemoteAdminCommand to trigger SSE and execute command.

RemoteAdminCommand calls ReST interface on DAS with Accept: text/event-stream header.

In accordance with an embodiment, command is executed in a separate thread, and the response SSE listens to events. Execution of managed command also registers AdminCommandInstance in JobManagerService (id is created) and change state to executed. (fires state event).

CLI's listener receives state event containing id and close connection.

CLI prints ID and exits (example: Command is executed with id 1234, use (asadmin attach 1234) to watch progress status or result)

Attach Command asadmin attach XXX

In accordance with an embodiment, the command to attach is a local CLICommand which calls remote hidden_attach_attach; the command is defined as managed and will forward all events from AdminCommandInstance retrieved from JobManager.

Attach Command and Commands which Retrieve File Payloads

In accordance with an embodiment, the deploy command has a retrieve option to get client stubs. Generally the system does not support obtaining file payloads when a user tries to attach to the deploy command with—retrieve or or when a user tries to attach to get-client-stubs. If someone attaches to a long running deploy command with—retrieve, the attach command can show progress status, but attach will not get the payload. In accordance with an embodiment, other commands called get-client-stubs can be used to retrieve the payload which the user can run.

Local Commands

In accordance with an embodiment, the described detach functionality will have no effect on existing CLI Commands. But any existing CLI Command can check for presence of a—detach asadmin switch and provide some support for it. If—detach is used with a CLICommand, and the CLICommand does not declare the detach @Param, it will generate an error.

CLICommand: Attach

In accordance with an embodiment, the attach command provides information about current status of particular command in progress. If the command is finished and its result is still registered, it returns a result payload.

In accordance with an embodiment, switches can include:

Exit code: If attach works, the exit code will be same as finished command. If not possible to attach or command does not finish exit code will be between 250-255 detach switch: executes any remote command in background mode. It means use SSE connection and quits immediately after command instance id is received in status event.

terse and progress status: Progress status will not be printed in case of—terse execution.

The attach command can be asadmin or cadmin command. The following snippet shows how the sample output will look for a running command which supports progress status:

```
asadmin sample-command
64%: Uploading bits . . .
```

In accordance with an embodiment, the following snippet shows how the sample output will look for a completed command which supports progress status:

```
asadmin sample-command
Finished execution of sample-command
Command sample-command executed successfully.
```

The following snippet shows how the sample output will look for detach:

```
asadmin --detach sample-command
Job Id: 20
Command sample-command detached successfully.
```

The following snippet shows how the sample output will look for detach with—echo:

```
asadmin --detach --echo sample-command
asadmin --host localhost --port 4848 --user admin interactive=true
  --echo=true
  --terse=false sample-command
Job Id: 21
Command sample-command detached successfully.
```

The following snippet shows how the sample output will look like for attach for a completed command:

```
asadmin attach 20
Finished execution of sample-command
Command attach executed successfully.
```

The following snippet shows how the sample output will look for attach for a running command:

```
asadmin attach 123
64%: Uploading bits . . .
```

The following snippet shows how the sample output will look like for attach with—long:

```
asadmin attach --long 20
Job:sample-command
State: COMPLETED
ExitCode: SUCCESS
Message: Finished execution of sample-command
Command attach executed successfully.
```

In accordance with an embodiment, the following snippet shows how the sample output will look like for a command which has a warning:

```
asadmin attach --long 21
Job: sample-command
State: COMPLETED
ExitCode: WARNING
Message: Finished execution of sample-command
Command attach executed successfully.
```

The following snippet shows how the sample output will look like for attach with—terse (Note no progress is shown and once the command is completed the final message is provided):

```
asadmin attach --terse 20
Finished execution of sample-command.
```

The following snippet shows how the sample output will look like for attach with—echo for a completed command:

```
asadmin attach --echo 123
asadmin --host localhost --port 4848 --user admin --interactive=true
--echo=true
   --terse=false attach 123
Job:sample-command
State: COMPLETED
ExitCode: SUCCESS
Command attach executed successfully.
```

The following snippet shows how the sample output will look for attach with—echo for a running command:

```
asadmin --echo attach 123
asadmin --host localhost --port 4848 --user admin --interactive=true
--echo=true
   --terse=false attach 123
64%: Starting
```

The following snippet shows how the sample output will look like for attach with—interactive:

```
asadmin --interactive attach
Enter the value for the jobID operand> 16
96%: Completing . .
```

Job Progress Status Process

Figure 30:
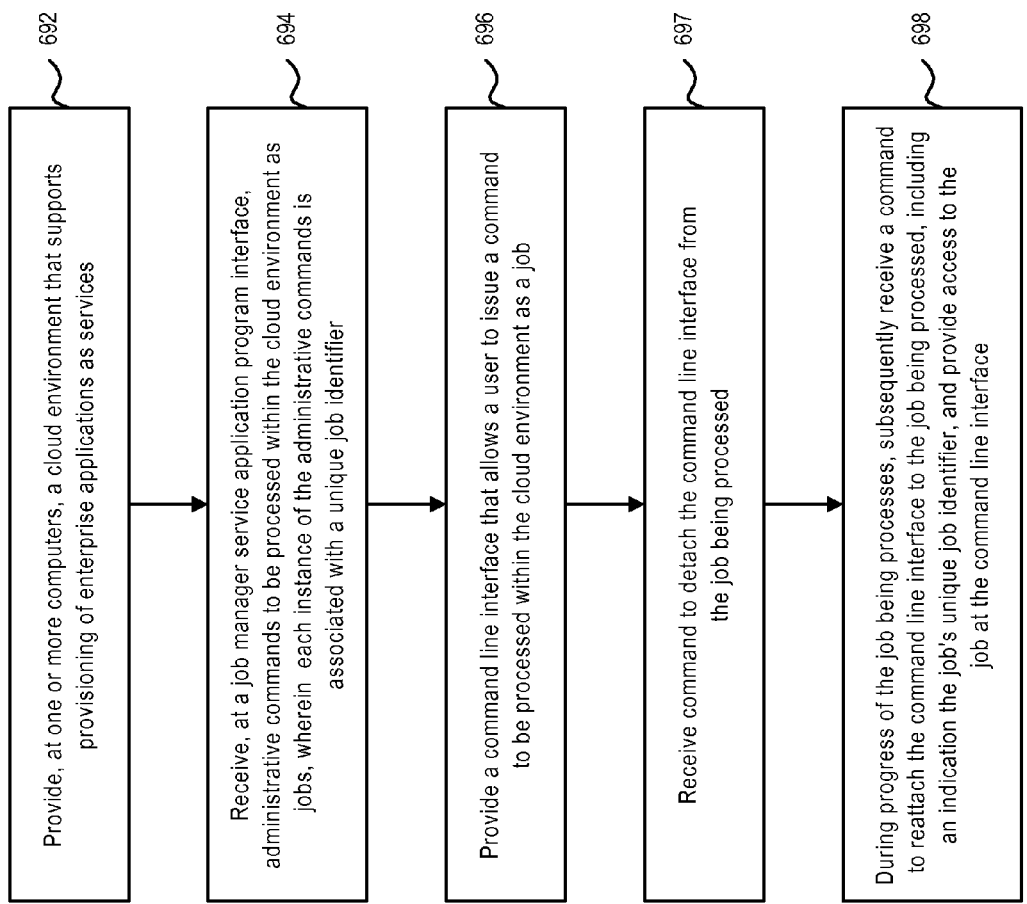
FIG. 30 is a flowchart of a method of supporting detachable administration commands, in a cloud environment, in accordance with an embodiment.

FIG. 30 is a flowchart of a method of supporting detachable administration commands, in a cloud environment, in accordance with an embodiment.

As shown in FIG. 30, at step 692, a cloud environment that supports provisioning of enterprise applications as services is provided at one or more computers.

At step 694, administrative commands are received, at a job manager service application program interface, to be processed within the cloud environment as jobs, wherein each instance of the administrative commands is associated with a unique job identifier.

At step 696, a command line interface is provided that allows a user to issue a command to be processed within the cloud environment as a job.

At step 697, a command is received to detach the command line interface from the job being processed.

At step 698, during progress of the job being processes, the system can subsequently receive a command to reattach the command line interface to the job being processed, including an indication the job's unique job identifier, and provide access to the job at the command line interface.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for providing administrative command progress status for use with a cloud computing environment, comprising:

a computer, including a cloud environment executing thereon that supports provisioning of enterprise applications;

a job manager that manages the execution of jobs within the cloud environment, including associating job states with the jobs;

a job manager service that provides an application program interface which receives administrative commands to be processed within the cloud environment as jobs, to at least one of provision or manage services within the cloud environment, wherein each instance of the administrative commands is associated with a job identifier; and a user interface that receives an administrative command to be processed within the cloud environment as a job;

wherein an administrative command instance is associated with a progress annotation indicative that a progress status associated with the administrative command being processed as the job, is to be reported;

wherein a job identifier associated with the administrative command instance is registered with the job manager; and wherein during processing of the job associated with the administrative command, by the job manager, wherein notifiable events for the job include one or more state change events, the progress status associated with processing of the administrative command is determined, using the job identifier associated with the administrative command instance, for display at the user interface.

2. The system of claim 1, wherein the progress status associated with the administrative command being processed as the job is provided on a REST interface using server sent events.

3. The system of claim 1, wherein the progress status associated with processing the administrative command is displayed at the user interface.

4. The system of claim 1, wherein the progress status associated with processing the administrative command is associated with a message and indicates the source context of the message within the cloud environment.

5. A method for providing administrative command progress status for use with a cloud computing environment, comprising:

providing, at a computer including a processor, a cloud environment that supports provisioning of enterprise applications;

providing a job manager that manages the execution of jobs within the cloud environment, including associating job states with the jobs;

providing a job manager service that provides an application program interface which receives administrative commands to be processed within the cloud environment as jobs, to at least one of provision or manage services within the cloud environment, wherein each instance of the administrative commands is associated with a job identifier; and providing a user interface that receives an administrative command to be processed within the cloud environment as a job;

wherein an administrative command instance is associated with a progress annotation indicative that a progress status associated with the administrative command being processed as the job, is to be reported;

wherein a job identifier associated with the administrative command instance is registered with the job manager; and wherein during processing of the job associated with the administrative command, by the job manager wherein notifiable events for the job include one or more state change events, the progress status associated with processing of the administrative command is determined, using the job identifier associated with the administrative command instance, for display at the user interface.

6. The method of claim 5, wherein the progress status associated with the administrative command being processed as the job is provided on a REST interface using server sent events.

7. The method of claim 5, wherein the progress status associated with processing the administrative command is displayed at the user interface.

8. The method of claim 5, wherein the progress status associated with processing the administrative command is associated with a message and indicates the source context of the message within the cloud environment.

9. A non-transitory computer readable storage medium, including instructions stored thereon which when read and executed by one or more computers cause the one or more computers to perform the steps comprising:

providing, at a computer, a cloud environment that supports provisioning of enterprise applications;

providing a job manager that manages the execution of jobs within the cloud environment, including associating job states with the jobs;

providing a job manager service that provides an application program interface which receives administrative commands to be processed within the cloud environment as jobs, to at least one of provision or manage services within the cloud environment, wherein each instance of the administrative commands is associated with a job identifier; and providing a user interface that receives an administrative command to be processed within the cloud environment as a job;

wherein an administrative command instance is associated with a progress annotation indicative that a progress status associated with the administrative command being processed as the job, is to be reported;

wherein a job identifier associated with the administrative command instance is registered with the job manager; and wherein during processing of the job associated with the administrative command, by the job manager wherein notifiable events for the job include one or more state change events, the progress status associated with processing of the administrative command is determined, using the job identifier associated with the administrative command instance, for display at the user interface.

10. The non-transitory computer readable storage medium of claim 9, wherein the progress status associated with the administrative command being processed as the job is provided on a REST interface using server sent events.

11. The non-transitory computer readable storage medium of claim 9, wherein the progress status associated with processing the administrative command is displayed at the user interface.

12. The non-transitory computer readable storage medium of claim 9, wherein the progress status associated with processing the administrative command is associated with a message and indicates the source context of the message within the cloud environment.

13. The system of claim 1, wherein the job identifier is used to fetch administrative command instance information, including the progress status associated with the administrative command.

14. The system of claim 1, wherein the progress status associated with the administrative command instance, is represented by one or more steps associated with the administrative command.

15. The method of claim 5, wherein the job identifier is used to fetch administrative command instance information, including the progress status associated with the administrative command.

16. The method of claim 5, wherein the progress status associated with the administrative command instance, is represented by one or more steps associated with the administrative command.

17. The non-transitory computer readable storage medium of claim 9, wherein the job identifier is used to fetch administrative command instance information, including the progress status associated with the administrative command.

* * * * *

UNITED STATES PATENT AND TRADEMARK OFFICE
CERTIFICATE OF CORRECTION

| | | |
|---|---|---|
| PATENT NO. | : 9,973,451 B2 | |
| APPLICATION NO. | : 14/476553 | |
| DATED | : May 15, 2018 | |
| INVENTOR(S) | : Mehta et al. | |

It is certified that error appears in the above-identified patent and that said Letters Patent is hereby corrected as shown below:

In the Drawings

On sheet 27 of 30, in FIG. 27, under Reference Numeral 650, Line 3, delete "command s" and insert -- commands --, therefor.

In the Specification

In Column 2, Line 6, after "embodiment" insert -- . --.

In Column 2, Line 9, after "embodiment" insert -- . --.

In Column 2, Line 13, after "embodiment" insert -- . --.

In Column 17, Line 32, delete "-notifcation-" and insert -- -notification- --, therefor.

In Column 18, Line 52, delete "=Sucess" and insert -- =Success --, therefor.

In Column 21, Line 15, delete "varioustypes," and insert -- various types, --, therefor.

In Column 21, Line 22, delete "maintanence" and insert -- maintenance --, therefor.

In Column 25, Line 4, delete "prroviding" and insert -- providing --, therefor.

In Column 25, Lines 54-55, delete "addional" and insert -- additional --, therefor.

In Column 26, Line 14, after "warning" insert -- . --.

In Column 31, Line 50, delete "supportcan" and insert -- support can --, therefor.

Signed and Sealed this
Thirteenth Day of November, 2018

Andrei Iancu
*Director of the United States Patent and Trademark Office*

CERTIFICATE OF CORRECTION (continued)
U.S. Pat. No. 9,973,451 B2

In Column 34, Line 52, delete "a2nd" and insert -- a 2nd --, therefor.

In Column 35, Line 3, after "()" insert -- ; --.

In Column 36, Line 45, delete "//Rewert" and insert -- //Revert --, therefor.

In Column 40, Line 45, delete "call rever" and insert -- call revert --, therefor.

In Column 40, Line 45, delete "rever 123"." and insert -- revert 123". --, therefor.

In Column 41, Line 1, delete "-FAILD" and insert -- -FAILED --, therefor.

In Column 41, Line 16, delete "valuescan" and insert -- values can --, therefor.

In Column 42, Line 13, delete "parmeters" and insert -- parameters --, therefor.

In Column 42, Line 35, delete "overal" and insert -- overall --, therefor.

In Column 43, Line 1, delete "annotataed" and insert -- annotated --, therefor.

In Column 43, Line 51, delete "enodiment," and insert -- embodiment, --, therefor.

In Column 45, Line 10, delete "then" and insert -- than --, therefor.

In Column 47, Line 16, delete "simmilar" and insert -- similar --, therefor.

In Column 47, Line 20, delete "bre" and insert -- be --, therefor.

In Column 52, Line 33, delete "detacahabe" and insert -- detachable --, therefor.

In Column 53, Line 53, delete "or or" and insert -- or --, therefor.

In the Claims

In Column 57, Line 61, in Claim 5, after "manager" insert -- , --.

In Column 58, Line 40, in Claim 9, after "manager" insert -- , --.